(12) United States Patent
Itokawa et al.

(10) Patent No.: US 7,162,101 B2
(45) Date of Patent: Jan. 9, 2007

(54) IMAGE PROCESSING APPARATUS AND METHOD

(75) Inventors: Osamu Itokawa, Tokyo (JP); Mitsuru Maeda, Tokyo (JP); Ryotaro Wakae, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 10/293,432

(22) Filed: Nov. 14, 2002

(65) Prior Publication Data
US 2003/0090751 A1 May 15, 2003

(30) Foreign Application Priority Data

| Nov. 15, 2001 | (JP) | ............................. 2001-350610 |
| Dec. 3, 2001 | (JP) | ............................. 2001-368995 |
| Dec. 27, 2001 | (JP) | ............................. 2001-397872 |

(51) Int. Cl.
*G06K 9/20* (2006.01)
*G06K 9/00* (2006.01)
*G06K 9/38* (2006.01)
*H04N 5/225* (2006.01)
*H04N 5/228* (2006.01)
*G06T 11/00* (2006.01)

(52) U.S. Cl. ...................... 382/282; 382/103; 382/168; 382/180; 382/199; 382/203; 382/210; 382/254; 382/264; 382/266; 382/270; 348/169; 348/208.14; 348/231.2; 345/472

(58) Field of Classification Search ................ 382/103, 382/131, 164–165, 168–174, 180, 199, 203, 382/210–211, 254–255, 260–262, 264–266, 382/268–270, 282–283; 348/169, 231.2, 348/208.13, 208.14, 231.3; 345/472
See application file for complete search history.

(56) References Cited

U.S. PATENT DOCUMENTS 4,584,704 A * 4/1986 Ferren ......................... 382/255
4,809,349 A * 2/1989 Herby et al. ................. 382/270

(Continued)

FOREIGN PATENT DOCUMENTS

JP        5-334441        12/1993

OTHER PUBLICATIONS

PROJECT 1101—ISO/IEC 14496-2:2001, Information technology-Coding of audio-visual objects—Part 2: Visual.

(Continued)

*Primary Examiner*—Bhavesh M. Mehta
*Assistant Examiner*—Manav Seth
(74) *Attorney, Agent, or Firm*—Fitzpatrick, Cella, Harper & Scinto

(57) ABSTRACT

An image processing apparatus and method, which can appropriately extract an object even when the focus of a camera having an automatic focus adjustment function shifts from the background to the object. To this end, frame images which are sensed by an image sensing unit and are sequential in the time axis direction are input from an input unit. The input frame images are smoothed by a filter unit. A background image generation unit generates an average image of a predetermined number of smoothed frame images as a background image. An image differential unit generates a differential image between the predetermined smoothed frame image and the background image. An object extraction unit extracts an object region where a predetermined object is sensed, on the basis of the differential image.

37 Claims, 45 Drawing Sheets

U.S. PATENT DOCUMENTS

| | | | | |
|---|---|---|---|---|
| 4,974,071 | A | | 11/1990 | Maeda ......................... 358/80 |
| 5,164,835 | A | * | 11/1992 | Yamada et al. ............. 348/352 |
| 5,359,438 | A | | 10/1994 | Maeda ....................... 358/539 |
| 5,721,692 | A | * | 2/1998 | Nagaya et al. .............. 382/206 |
| 6,088,468 | A | * | 7/2000 | Ito et al. ..................... 382/103 |
| 6,141,435 | A | * | 10/2000 | Naoi et al. .................. 382/104 |
| 6,188,726 | B1 | * | 2/2001 | Hirabayashi ........... 375/240.03 |

OTHER PUBLICATIONS

International Journal of Computer Vision; Michael Kass, Andrew Witkin, and Demetri Terzopoulos; Snakes: Active Contour Models; vol. 1, No. 4, 1987; pp. 321-331.

* cited by examiner

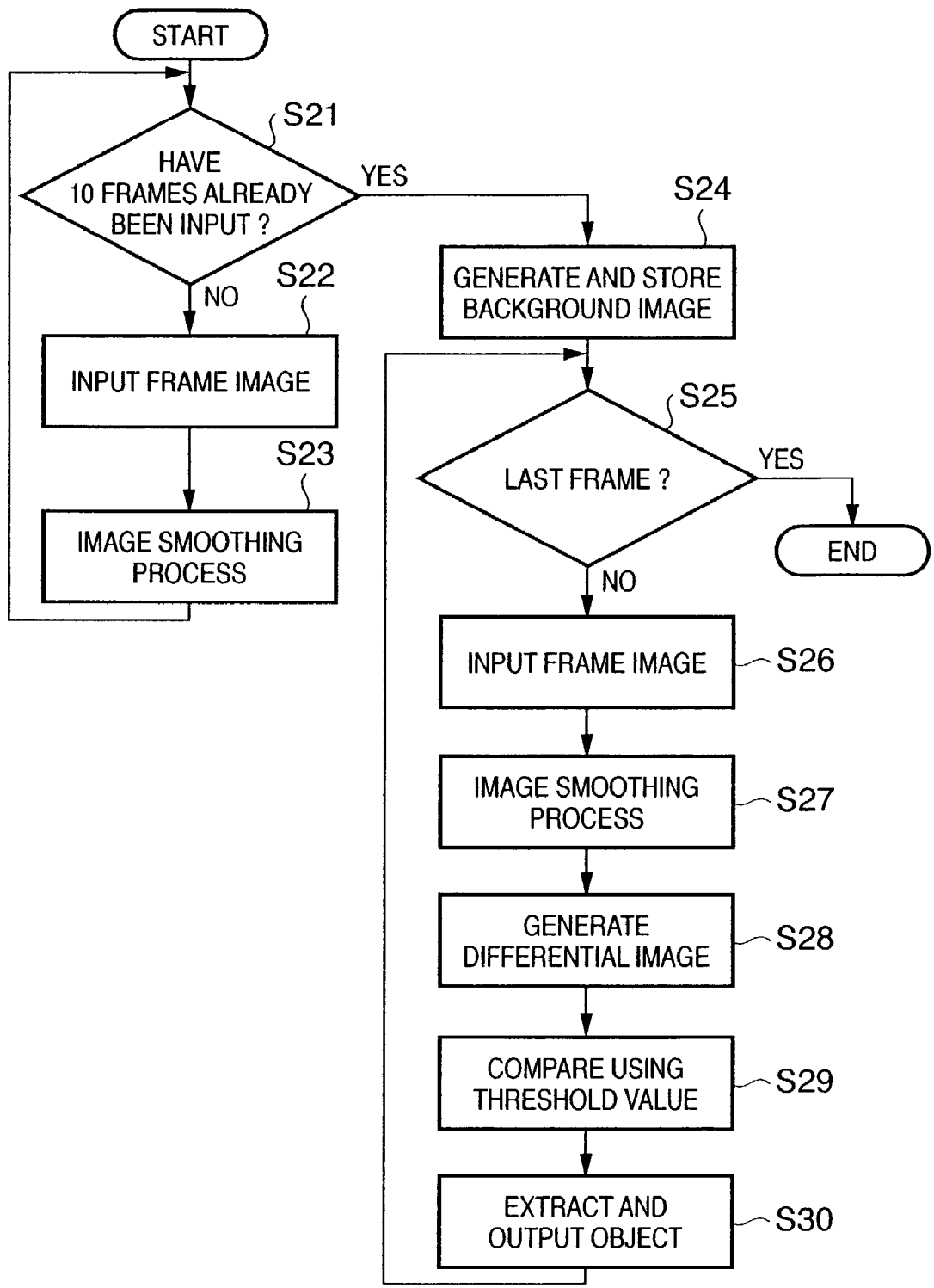

PRIOR ART
PRIOR ART
FIG. 11A
FIG. 11B

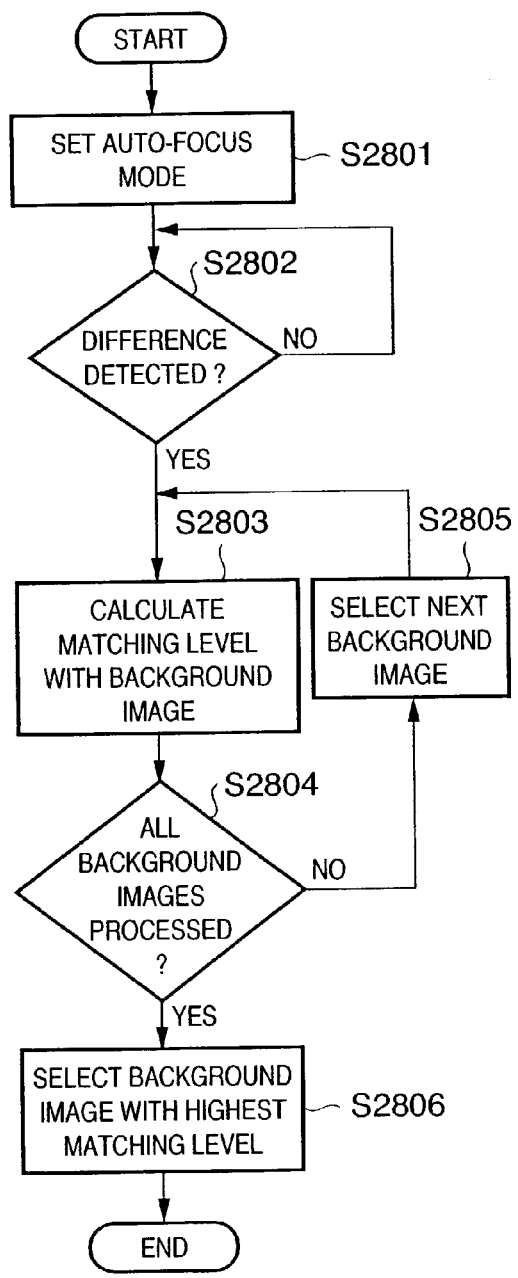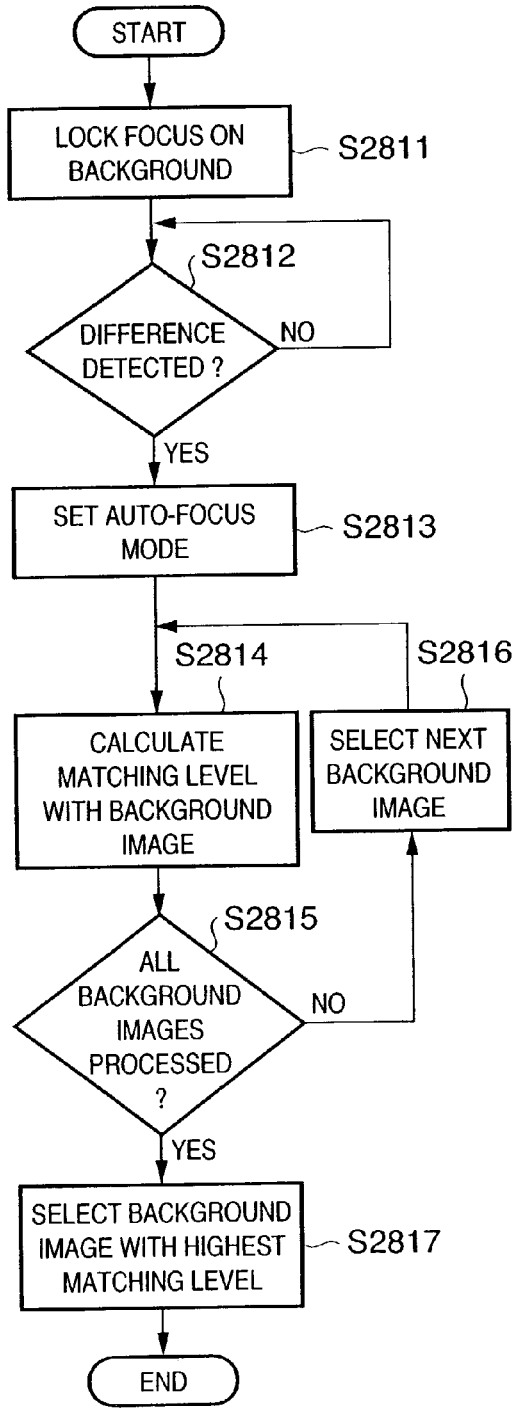

F I G. 28A
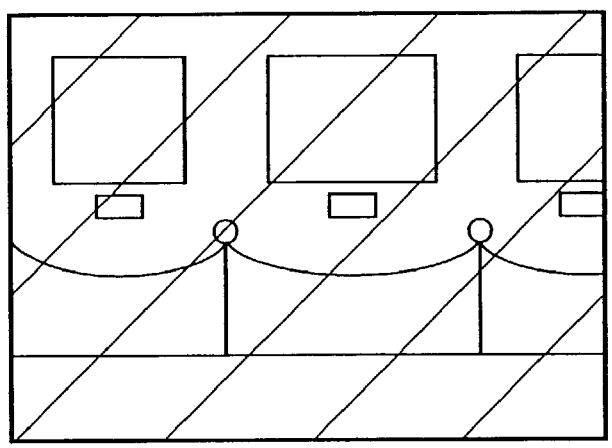
F I G. 28B
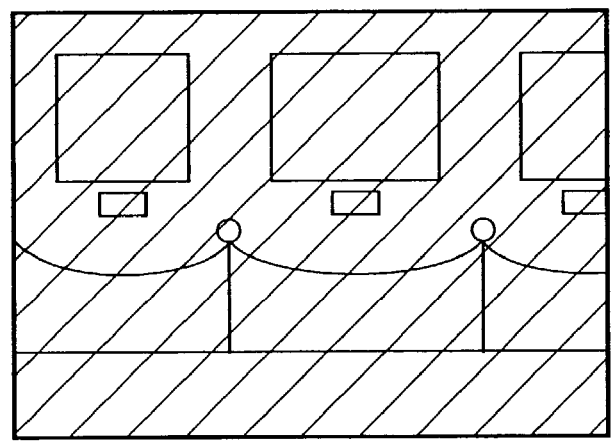
F I G. 28C
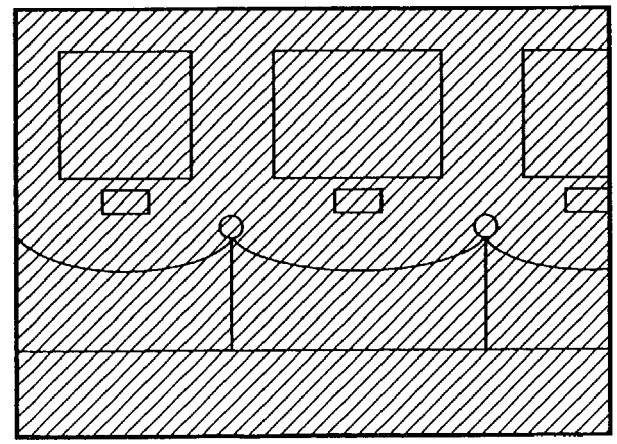

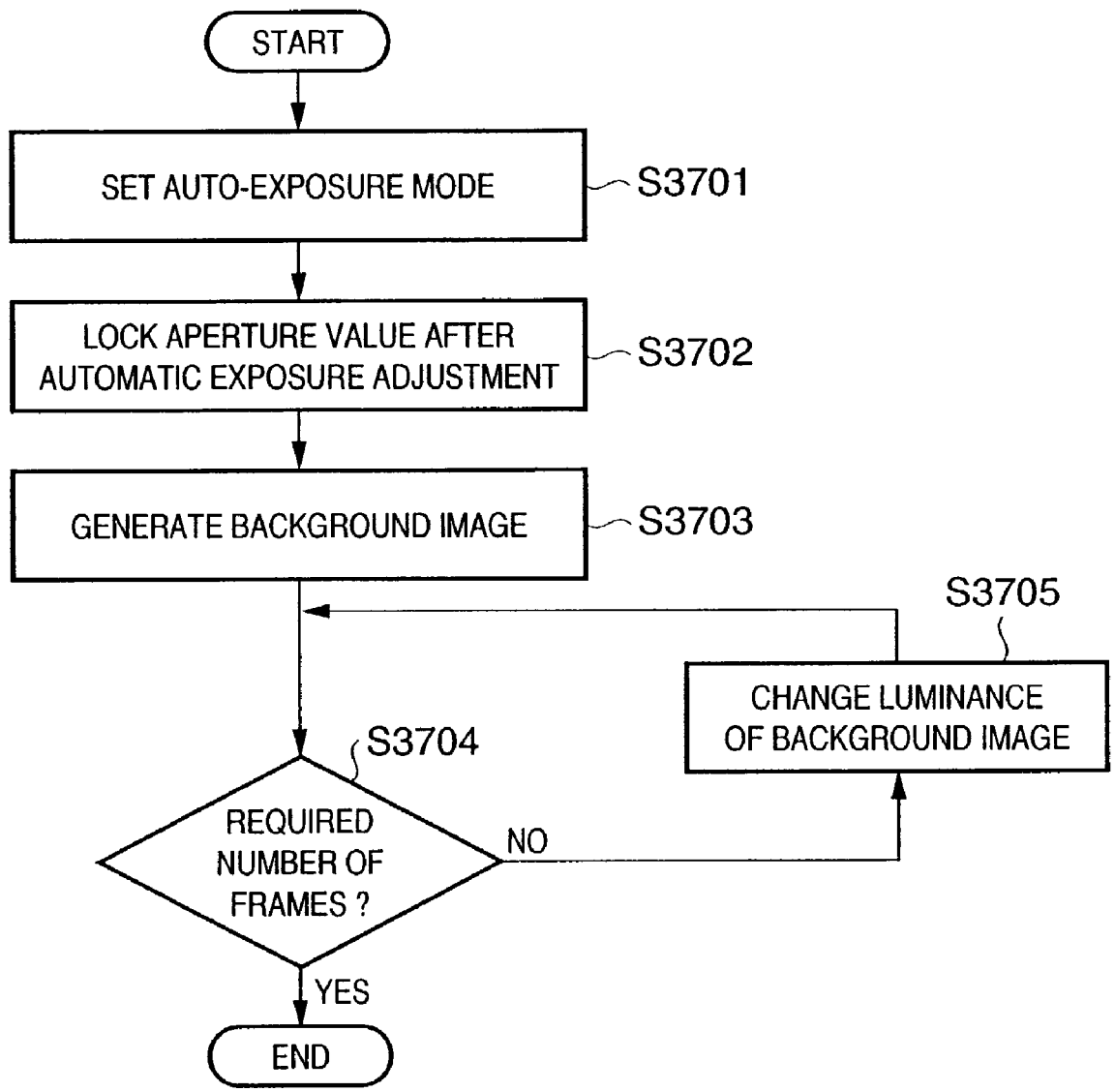

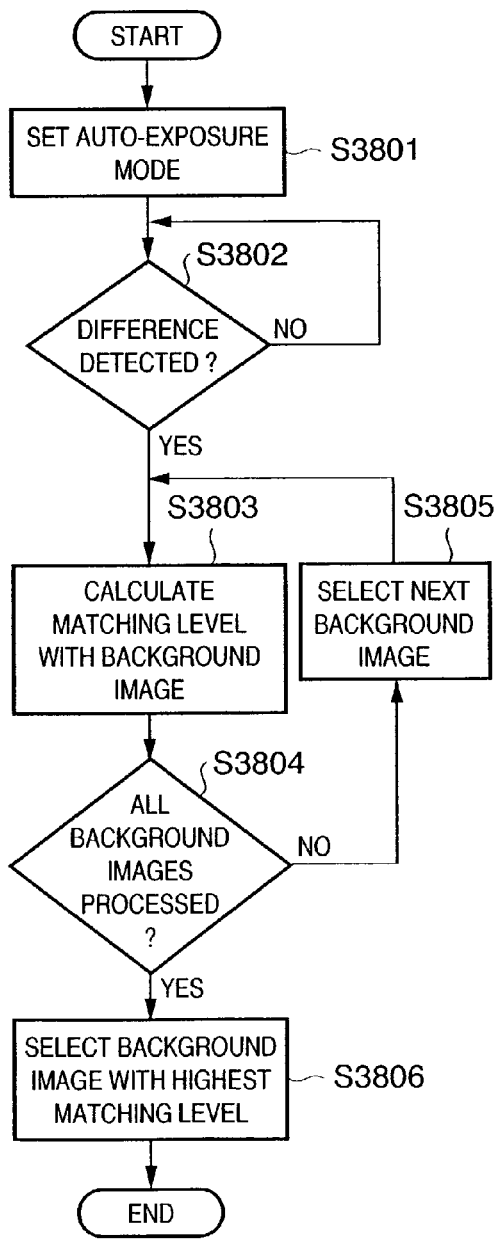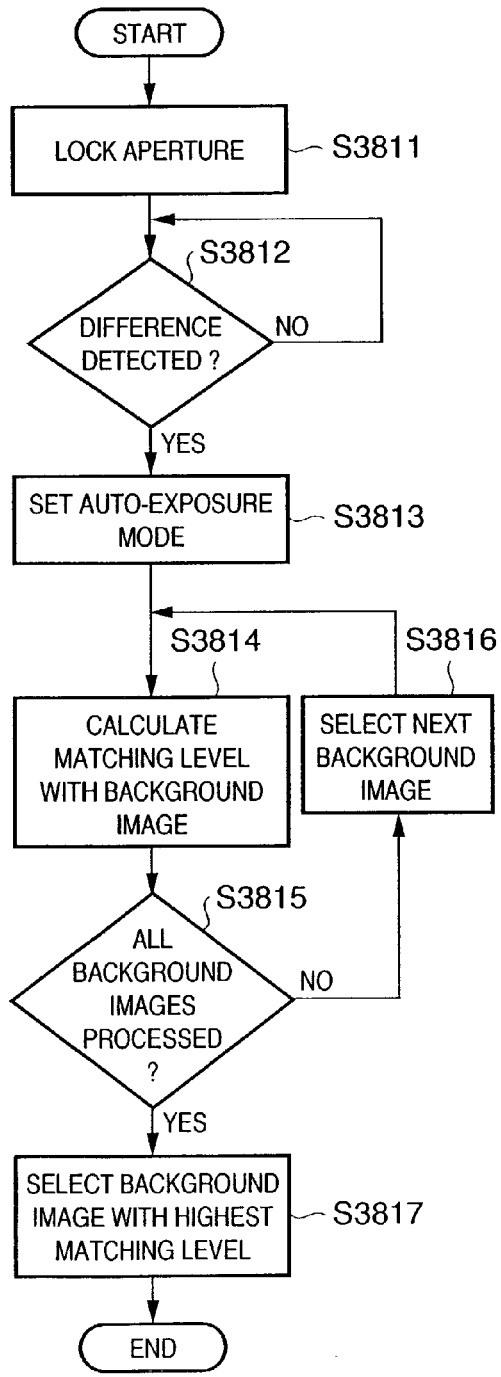
FIG. 32A
FIG. 32B

IMAGE PROCESSING APPARATUS AND METHOD

FIELD OF THE INVENTION

The present invention relates to an image processing apparatus and method for extracting a specific region from a differential image between frame images that form a moving image.

BACKGROUND OF THE INVENTION

In recent years, MPEG-4 has been internationally standardized as an encoding scheme of a moving image. In a conventional moving image encoding scheme represented by MPEG-2, encoding is done for respective rectangular frames or fields. By contrast, MPEG-4 can encode using image data with an arbitrary shape as an object. Details of MPEG-4 are described in Sukeichi Miki, "All About MPEG-4", Kogyo Chosakai Publishing Co., Ltd., the International standard ISO/IEC14496-2, and the like.

That is, a technique for extracting an objective region with an arbitrary shape is indispensable for recent moving image encoding.

As an extraction method of an objective region, a method of extracting an objective region from the difference between a stored background image and input image is known. For example, an example of such method is described in, e.g., Japanese Patent Laid-Open No. 5-334441 "Moving Object Extraction Apparatus", and the like. FIG. 10 is a block diagram showing the arrangement of a conventional image processing apparatus for extracting an objective region from the difference between the stored background image and input image.

Referring to FIG. 10, an input unit 1001 is an image sensing device such as a camera or the like, which senses a scene or the like that includes a target object. A moving image sensed without any object is input from the input unit 1001 to a background image generation unit 1002, which generates a background image by calculating the average of a plurality of frame images that forms the moving image. The generated background image is stored in a background image storage unit 1003.

An image difference unit 1004 calculates differences between an image sensed by the input unit 1001 and the background image stored in the background image storage unit 1003 for respective pixels. Respective pixel values of the generated differential image are compared with an arbitrary threshold value T. If the absolute value of a given pixel value of the differential image is larger than the threshold value T, that pixel is set to be "1"; otherwise, it is set to be "0". In this manner, a region with pixel values=1 in the generated image serves as mask information indicating the objective region. An object extraction unit 1005 extracts an object from the sensed image in accordance with this mask information.

The principle of object extraction will be described in detail below. Let $Pc(x, y)$ be the pixel value of an input image at a point of a coordinate position $(x, y)$ on an image plane, and $Pb(x, y)$ be the pixel value of the background image at that point. At this time, the difference between $Pc(x, y)$ and $Pb(x, y)$ is calculated, and its absolute value is compared with a given threshold value Th.

For example, a discrimination formula is described by:

$$|Pc(x, y) - Pb(x, y)| \leq Th \quad (1)$$

If the difference absolute value is equal to or smaller than the threshold value Th in formula (2) above, since this means that the difference between Pc and Pb is small, Pc is determined to be a background pixel. On the other hand, if the difference absolute value is larger than the threshold value Th, Pc is determined to be a pixel of an object to be detected. By making the aforementioned discrimination at all points on a frame, detection for one frame is completed.

This process will be described using an example of display images. FIG. 23A shows an example of the background image, and FIG. 23B shows a sensed image which is being monitored. When the value at a given point $P1b$ on the background image is compared with that at a point $P1c$ on the monitor frame at the same position, the difference absolute value is equal or nearly equal to zero, formula (1) holds, and it is determined that the pixel at the position $P1c$ is a background pixel.

On the other hand, if the value of another point $P2b$ is compared with that of a point $P2c$, since the difference absolute value becomes large, it is determined that the pixel at that position is not a background pixel, i.e., it is an object pixel.

FIG. 23C shows a result obtained after the aforementioned process is executed for all points on the sensed image, while a pixel which is determined to be an object pixel is defined as "1", and a pixel which is determined to be a background pixel is defined to be "0". In FIG. 23C, a black portion indicates the background, and a white portion indicates an object.

However, when the input unit 1001 has an automatic focus adjustment function for the purpose of improving, e.g., the image quality of a moving image, if an object is located near the camera, the focal point position upon sensing only the background is different from that upon sensing an image including the object. Therefore, the conventional image processing apparatus shown in FIG. 10 cannot normally extract the object.

FIGS. 11A and 11B show an example of an image taken upon sensing the background and that taken upon sensing an object using a camera with the automatic focus adjustment function. FIG. 11A shows an image generated as a background image by sensing only the background. In this case, the focal point of the camera matches an instrument at the center of the frame. On the other hand, FIG. 11B shows a scene in which a person stands near the camera in the state in which the image shown in FIG. 11A is sensed. In this case, since the focal point of the camera matches the person, the background is out of focus.

FIG. 12 shows a differential image generated from the two images shown in FIGS. 11A and 11B. In FIG. 12, each black component indicates that the difference between the two images is zero, and a component closer to a white component indicates that a larger difference is generated between the two images. In the differential image shown in FIG. 12, since the background other than the person is out of focus, a difference is generated on the entire image. Hence, it is difficult to extract only an object from that image.

On the other hand, when the input unit 1001 has an automatic exposure adjustment function for the purpose of improving the image quality of a moving image, the aperture value changes in correspondence with the brightness of an object, and the conventional image processing apparatus shown in FIG. 10 cannot normally extract an object.

FIG. 34A shows the brightness when the background image undergoes automatic exposure correction. FIG. 34B shows an example wherein an incoming object is darker than the background. In order to increase the brightness of the incoming object, that of the background portion also increases. FIG. 34C shows an example wherein an incoming object is brighter than the background. In order to decrease the brightness of the incoming object, that of the background portion also decreases.

In this manner, an actual background image is different from that which has been explained using FIG. 34B, and even when difference absolute values between background portions are calculated, large differences are generated, resulting in a determination error indicating that the image of interest is not a background. In other words, it becomes difficult to extract a specific object from image data that has undergone the automatic exposure adjustment process.

SUMMARY OF THE INVENTION

The present invention has been made in consideration of such situation, and has as its object to provide an image processing apparatus and method, which can accurately extract an object in time-sequential frame images sensed by a camera with an automatic adjustment function of an image sensing parameter (e.g., focus, aperture).

In order to achieve the above object, an image processing apparatus in one preferred embodiment of the present invention is directed to an image processing apparatus for making predetermined image sensing means sense a scene in a fixed image sensing direction, and extracting an object from an image obtained by the image sensing means, comprising: image input means for inputting frame images which are sensed by the image sensing means and are sequential in a time axis direction in turn, smoothing means for smoothing the input frame images, background image determination means for determining the smoothed frame image as a background image, differential image generation means for generating a differential image between a predetermined smoothed frame image and the background image, and object region extraction means for extracting an object region where a predetermined object is sensed, on the basis of the differential image.

An image processing method in one preferred embodiment of the present invention is directed to a method, wherein the object region extraction step comprises: the comparison step of comparing a pixel value of the differential image with a predetermined threshold value; and the extraction step of extracting, as the object region, a region in the predetermined frame image corresponding to a set object region, on the basis of the comparison result with the threshold value.

An image processing method in one preferred embodiment of the present invention is directed to a method, wherein the selection step includes the calculation step of calculating a matching level between the image data obtained by the image sensing means, and the plurality of background image data stored in the storage means, and includes the step of selecting background image data which has a maximum matching level calculated in the calculation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a flow chart for explaining the operation sequence of the image processing apparatus shown in FIG. 1;

FIGS. 11A and 11B show an example of an image sensed upon sensing the background and that sensed upon sensing an object by a camera with an automatic focus adjustment function;

FIGS. 20A and 20B are flow charts showing the background image select processing sequence in the sixth embodiment;

FIGS. 28A to 28C are views for explaining a plurality of background images in the eighth embodiment;

FIG. 31 is a flow chart of the background image generation process in the ninth embodiment;

FIGS. 32A and 32B are flow charts of the background image select process in the ninth embodiment;

DETAILED DESCRIPTION OF THE PREFERRED EMBODIMENTS

The preferred embodiments of the present invention will be described hereinafter with reference to the accompanying drawings.

<First Embodiment>

Figure 1:
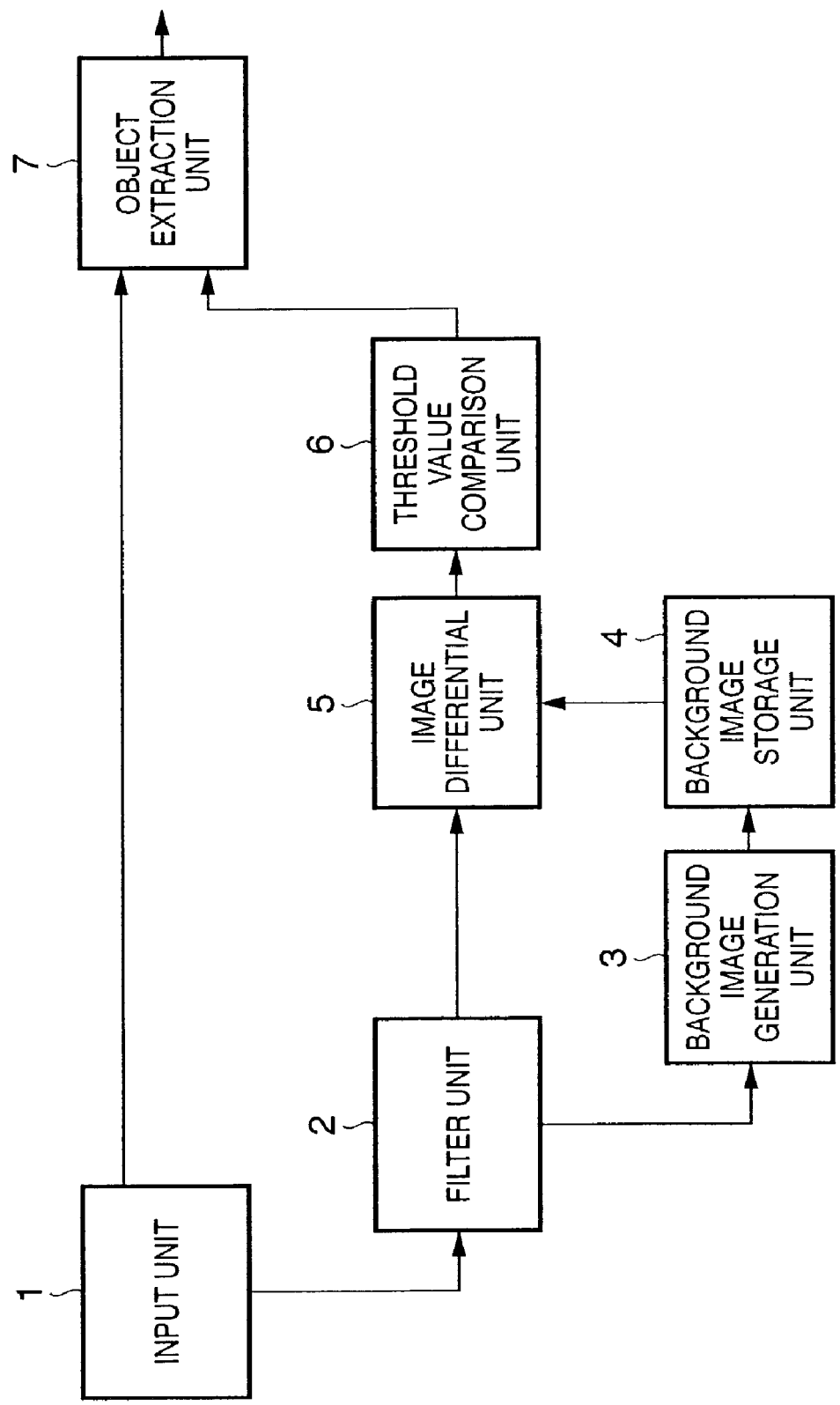
FIG. 1 is a block diagram showing the arrangement of an image processing apparatus according to the first embodiment of the present invention.

FIG. 1 is a block diagram showing the arrangement of an image processing apparatus according to an embodiment of the present invention. Referring to FIG. 1, an input unit 1 is a device for sequentially inputting frame images, which are obtained by an image sensing device such as a camera or the like that senses a scene in a fixed image sensing direction, and are sequential in the time axis direction. Note that the image sensing device has an automatic focus adjustment function. That is, when the image sensing device senses a scene without any specific object, it focuses on the entire scene. However, when the image sensing device senses a scene including a specific object, it focuses on that object, and the background goes out of focus. The input unit 1 is connected to a filter unit 2 and object extraction unit 7. The filter unit 2 executes a smoothing process of respective frame images of an input moving image using a smoothing filter. The filter unit 2 is connected to a background image generation unit 3 and image differential unit 5.

The background image generation unit 3 generates an average image of a plurality of frame images as a background image. The background image generation unit 3 is connected to a background image storage unit 4. The background image storage unit 4 stores the generated background image. The background image storage unit 4 is connected to the image differential unit 5. The image differential unit 5 generates a differential image obtained by calculating differences between an image obtained by executing the smoothing process for a frame image from which an object is to be extracted, and the background image stored in the background image storage unit 4 for respective pixels.

The image differential unit 5 is connected to a threshold value comparison unit 6. The threshold value comparison unit 6 compares respective pixel values of the generated differential image with an arbitrary threshold value to generate mask information of the object. The threshold value comparison unit 6 is connected to the object extraction unit 7. The object extraction unit extracts the object from the frame image from which the object is to be extracted, on the basis of the generated mark information of the object.

That is, this embodiment is directed to an image processing apparatus for making predetermined image sensing means sense a scene in a fixed image sensing direction, and extracting an object in an image obtained by the image sensing means, characterized by comprising image input means (input unit 1) for inputting frame images which are sequential in the time axis direction, smoothing means (filter unit 2) for smoothing the input frame image, background image determination means (background image generation unit 3) for determining the smoothed frame images as a background image, differential image generation means (image differential unit 5) for generating a differential image between a smoothed predetermined frame image and the background image, and object region extraction means (object extraction unit 7) for extracting an object region where a predetermined object was sensed on the basis of the differential image.

This embodiment is characterized in that the background image determination means (background image generation unit 3) generates an average image of a predetermined number of smoothed frame images as the background image.

Furthermore, this embodiment is characterized in that the image sensing means has an automatic focus adjustment function, the background image determination means (background image generation unit 3) generates the background image using a predetermined number of smoothed frame images obtained by sensing a scene without any object, and the predetermined frame image used to generate the differential image from the background image in the differential image generation means (image differential unit 5) is a frame image obtained by sensing a scene including an object.

Moreover, this embodiment is characterized in that the object region extraction means comprises comparison means (threshold value comparison unit 6) for comparing the pixel values of the differential image with a predetermined threshold value, and extraction unit (object extraction unit 7) for extracting, as an object region, a region in the predetermined frame image corresponding to an object region set based on the comparison results with the threshold value.

The operation sequence of the image processing apparatus with the above arrangement will be explained below with reference to the accompanying drawings. FIG. 2 is a flow chart for explaining the operation sequence of the image processing apparatus shown in FIG. 1. In this embodiment, the first to 10th frames of an input moving image are those which do not include any object, and a background image is generated using these 10 frames. The 11th and subsequent frame images are those which include an object.

It is checked if a frame finally input from the input unit 1 is the 10th frame (step S21). If the finally input frame is the 10th frame (Yes), the flow advances to step S24. At the beginning of this process, since no frame image is input from the input unit 1 yet, No is determined, and the flow advances to step S22.

Figure 3A:
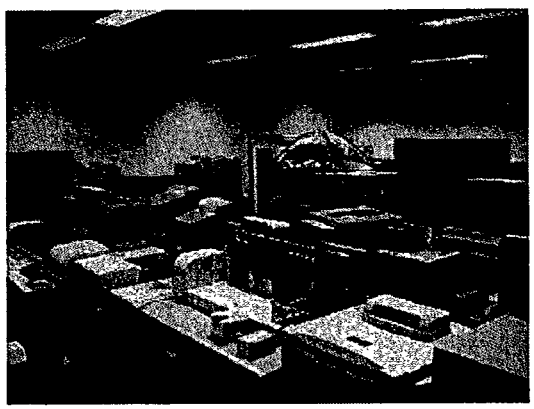
FIGS. 3A to 3F show an example of images which are to undergo an object extraction process in the first embodiment.

An image (first frame) of a scene without any object is input from the input unit 1 (step S22). FIGS. 3A to 3F show an example of images which are to undergo an object extraction process in this embodiment. Assume that an image shown in FIG. 3A is input as the first frame from the input unit 1.

The input frame image undergoes the smoothing process in the filter unit 2 (step S23). An example of the smoothing process in the filter unit 2 will be explained below. If x(0, 0) represents the pixel of interest, the filter unit 2 calculates a smoothed value x'(0, 0) using the pixel values of eight pixels around the pixel of interest by:

$$x'(0, 0) = (x(-1, -1) + x(1, -1) + x(-1, 1) + x(1, 1) + 2 \times (x(0, -1), +x(-1, 0) + x(1, 0) + x(0, 1)) + 4 \times x(0, 0))/16 \quad (2)$$

The input and smoothing processes of frame images are repeated according to the aforementioned sequence until the processes for 10 frames are complete. Upon completion of the smoothing processes for 10 frames, since the 10th frame has already been input, Yes is determined in step S21, and the 10 smoothed frame images are input to the background image generation unit 3. The background image generation unit 3 calculates the averages of the 10 input, smoothed frame images for respective pixels, thus generating a single background image. The generated background image is stored in the background image storage unit 4 (step S24).

If the finally input frame is the last frame of the moving image (Yes), the object extraction process ends. On the other hand, if the finally input frame is not the last frame (No), the flow advances to step S26.

Figure 3B:

Instep S26, the next frame image (11th frame) is input from the camera (input unit 1). Since the input 11th frame includes an image of a person within the frame, and the focus adjustment function automatically works to focus on the person, the background goes out of focus. FIG. 3B shows an example of an input image of the 11th frame, in which the person is in focus, but the background is out of focus. Note that the image of the input 11th frame is also input to the object extraction unit 7.

Figure 3C:
Figure 3D:
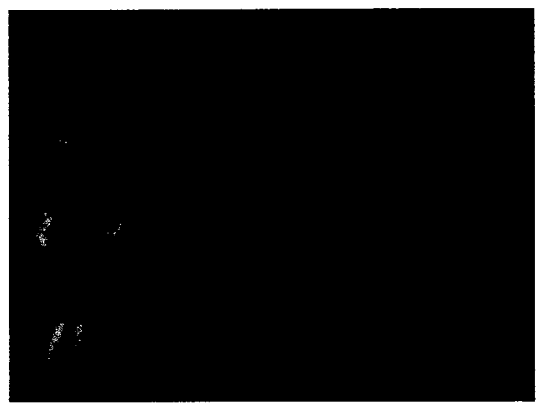

The input image undergoes the smoothing process in the filter unit 2 according to equation (2) as in the first to 10th frames (step S27). FIG. 3C shows the image of the 11th frame after the smoothing process. The image smoothed by the filter unit 2 is input to the image differential unit 5. The image differential unit 5 calculates the absolute values of the differences from the pixel values of the stored background image, and outputs them as a differential image (step S28). FIG. 3D shows an example of the differential image. In FIG. 3D, pixels closer to white components indicate larger difference values.

Figure 3E:

The output differential image is input to the threshold value comparison unit 6, and its pixel values are compared with a predetermined threshold value T. If each pixel value of the differential image is larger than the threshold value T, "1" is given to that pixel; if it is smaller than the threshold value T, "0" is given to the pixel, thus generating an image (step S29). FIG. 3E shows an example of the generated image. In the image shown in FIG. 3E, pixel values in a white portion are determined to be larger than the threshold value T. In this image, an image region represented by "1" (white) serves as mask information that represents the shape of the object. Hence, if this image does not include any object, since all "0"s (black) are output, no object is extracted.

Figure 3F:

The generated mask information is input to the object extraction unit 7. The object extraction unit 7 extracts and outputs an object portion from the image of the 11th frame shown in FIG. 3B, which is input from the input unit 1, in accordance with the mask information (step S30). FIG. 3F shows an example of the object region extracted from the 11th frame.

After the object is extracted in step S30, the flow returns to step S25 to check again if the frame of interest (11th frame) is the last frame of the moving image. Likewise, an object region can be extracted from frame images of the 12th and subsequent frames.

With the series of processes mentioned above, even when the background image goes out of focus in a moving image input by the image sensing device with the automatic focus adjustment function, an object region can be optimally extracted from the differential image.

In the above embodiment, the background image is generated by calculating the average of the plurality of frame images. However, the present invention is not limited to this. For example, the average of images obtained by changing focus to a plurality of levels may be used, or one frame image may be used as a background image.

In the above embodiment, the filter process for the smoothing process is implemented by the method given by equation (2). However, the present invention is not limited to such specific smoothing processing method. For example, smoothing may be done based on data obtained from measurement results of an optical system, or other smoothing filters such as a median filter and the like may be used.

Furthermore, in the above embodiment, the background image is calculated using the first to 10th frames, and an object region is extracted from the 11th and subsequent frames. Alternatively, a smoothed image of a frame image immediately before a frame from which an object is to be extracted, or an average image of smoothed images of a plurality of frame images immediately before that frame may be used as the background image.

<Second Embodiment>

Figure 4:
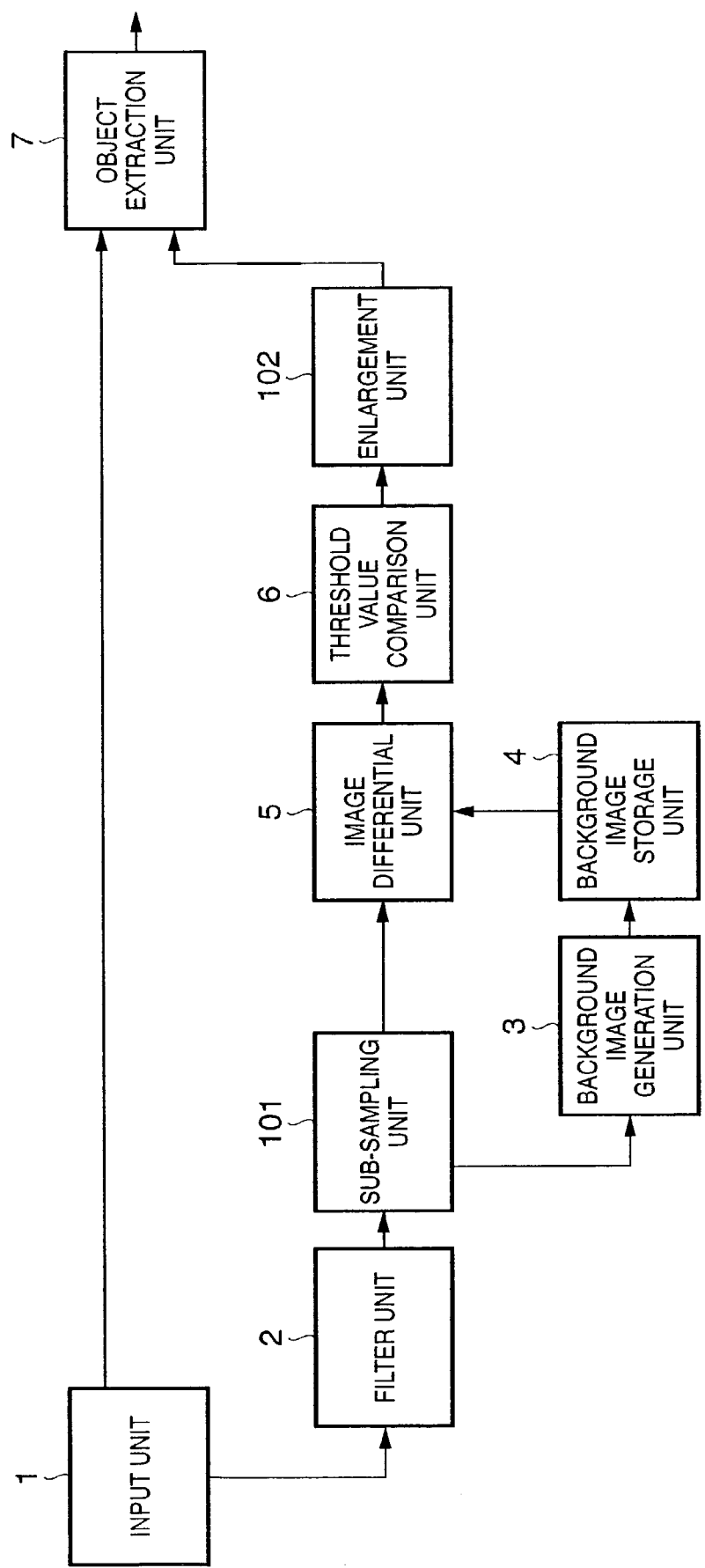
FIG. 4 is a block diagram showing the arrangement of an image processing apparatus according to the second embodiment of the present invention.

FIG. 4 is a block diagram showing the arrangement of an image processing apparatus according to the second embodiment of the present invention. Note that the same reference numerals in FIG. 4 denote building components having the same functions as those in the first embodiment shown in FIG. 1, and a detailed description thereof will be omitted.

Referring to FIG. 4, a sub-sampling unit 101 is connected to the filter unit 2 to sub-sample the smoothed frame image so as to reduce its size to ½ in both the vertical and horizontal directions. The sub-sampling unit 101 is connected to the background image generation unit 3 and image differential unit 5. This sub-sampling unit 101 may be implemented as an independent device or some functions of the filter unit 2 or background image generation unit 3. An enlargement unit 102 is connected to the threshold value comparison unit 6 to double the size of an image in both the vertical and horizontal directions, so as to restore an original size. The enlargement unit 102 is also connected to the object extraction unit 7.

That is, this embodiment is characterized by further comprising sub-sampling means (sub-sampling unit 101) for decimating the number of pixels of the smoothed frame image to a predetermined value, and enlargement means (enlargement unit 102) for enlarging an object region set on the frame image, the number of pixels of which has been decimated, to an original size.

Or this embodiment is characterized in that the background image determination means (background image generation unit 3) comprises sub-sampling means (sub-sampling unit 101) for decimating the number of pixels of the smoothed frame image to a predetermined value.

Or this embodiment is characterized in that the smoothing means (filter unit 2) comprises sub-sampling means (sub-sampling unit 101) for decimating the number of pixels of the smoothed frame image to a predetermined value.

Figure 5:
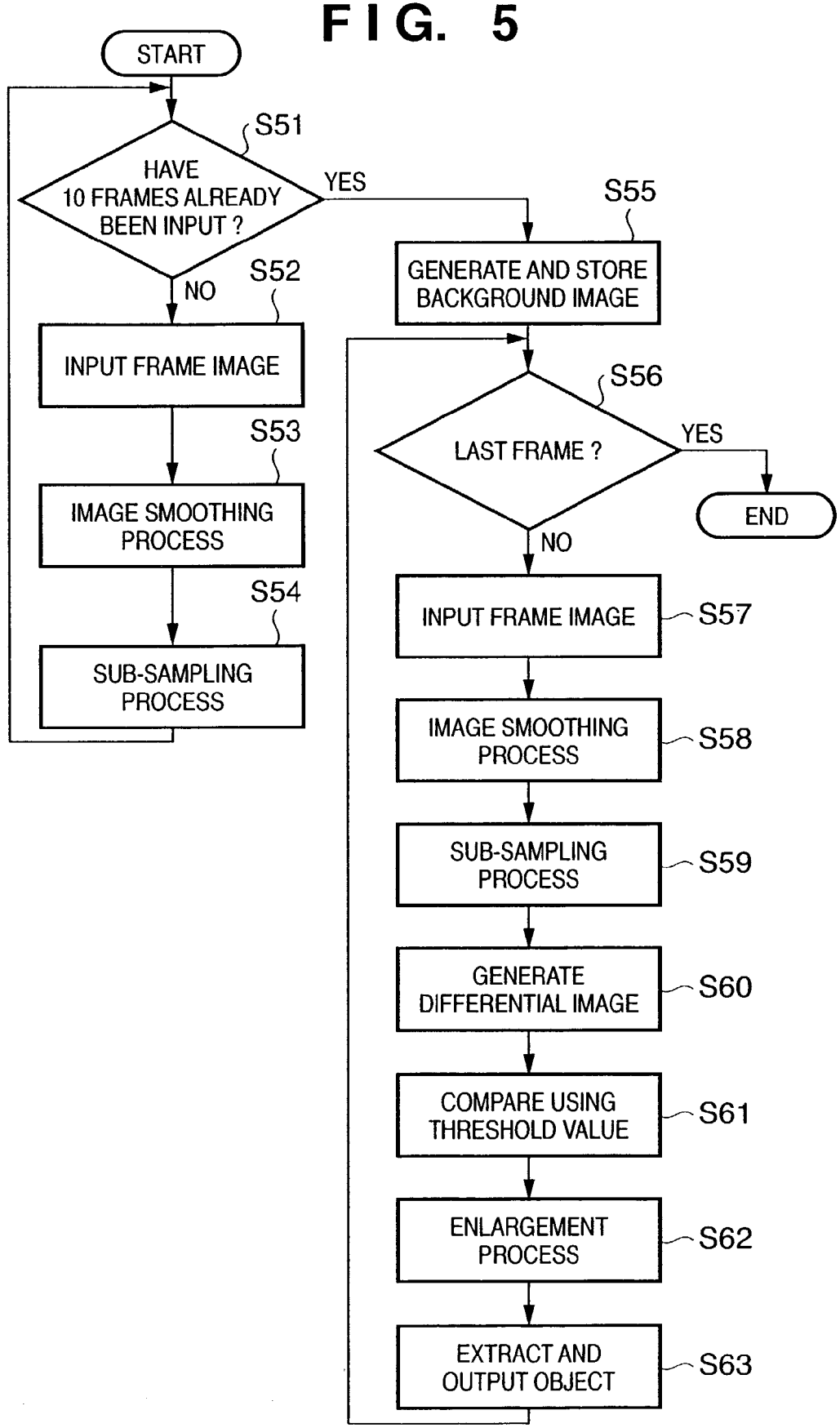
FIG. 5 is a flow chart for explaining the operation sequence of the image processing apparatus according to the second embodiment of the present invention.

The operation sequence of the image processing apparatus according to the second embodiment with the above arrangement will be described below with reference to the accompanying drawings. FIG. 5 is a flow chart for explaining the operation sequence of the image processing apparatus according to the second embodiment of the present invention. Note that the background image is generated from 10 frame images of the first to 10th frames in this embodiment as well.

It is checked if the 10th frame of a moving image is input from the input unit 1 (step S51). As a result, if images up to the 10th frame are input (Yes), the flow advances to step S55. On the other hand, if images up to the 10th frame are not input yet (No), the flow advances to step S52. In this manner, an image of the first frame is input from the input unit 1 (step S52). The input frame image undergoes the smoothing processing using equation (2) as in the first embodiment in the filter unit 2 (step S53) The frame image that has undergone the smoothing process in the filter unit 2 is input to the sub-sampling unit 101 to calculate an average value of four pixels so as to determine one pixel value, thus reducing the number of pixels to ½ in both the vertical and horizontal directions (step S54). The flow returns to step S51 to check if images up to the 10th frame are input.

When 10 frame images up to the 10th frame have been similarly processed in the sequence in steps S51 to S54, it is determined in step S51 that 10 images have been input, and the flow advances to step S55.

The background image generation unit 3 calculates the averages for respective pixels of the 10 sub-sampled images that have undergone the smoothing process to generate a background image as in the first embodiment. The background image is stored in the background image storage unit 4 (step S55).

It is then checked if the frame of interest (10th frame) is the last frame (step S56). As a result, if it is determined that the frame of interest is the last frame (Yes), the extraction process ends. On the other hand, if it is determined that the frame of interest is not the last frame (No), the next frame image (11th frame) is input from the input unit 1 (step S57). Note that the image of the 11th frame input from the input unit 1 is input to the object extraction unit 7 in addition to the filter unit 2. The input 11th frame image undergoes the smoothing process in the same manner as the aforementioned smoothing method in the filter unit 2 (step S58).

Furthermore, the sub-sampling unit 101 sub-samples the smoothed 11th frame image to a ½ size in both the vertical and horizontal directions as in the 10th frame described above (step S59). The image differential unit 5 generates a differential image between the sub-sampled 11th frame image and the background image stored in the background image storage unit 4 (step S60).

Respective pixels of the generated differential image are input to the threshold value comparison unit 6 and are compared with a predetermined threshold value T (step S61). If each pixel value of the differential image is larger than the threshold value T, "1" is given to that pixel; if the pixel value is smaller than the threshold value T, "0" is given to that pixel, thus generating an image. This image is used as mask information that represents the shape of an object.

The image indicating the mask information is input to the enlargement unit 102, which doubles the image size in both the vertical and horizontal directions (step S62) In this case, as an example of enlargement, a method of doubling the number of pixels in both the vertical and horizontal directions, contrary to the process in the sub-sampling unit 101, may be used. The object extraction unit compares the enlarged image indicating the mask information with the 11th frame image input from the input unit 1 to extract an image region corresponding to a portion indicating the mask information (portion given with pixel values "1") from the 11th frame, and to output the extracted image region as an object (step S63). The flow returns to step S56 to check if the finally input 11th frame is the last frame, and an object can be extracted similarly.

With the series of processes, since the number of pixels is limited, even when the background image has changed due to focus adjustment, an object can be extracted optimally and quickly.

In the second embodiment, the sub-sampling ratios in the vertical and horizontal directions are ½. However, the present invention is not limited to such specific ratios, and other ratios may be used. In the second embodiment, the sub-sampling process and filter process are independently executed. However, the present invention is not limited to such specific processes, and the filter process and sub-sampling process may be simultaneously executed.

<Third Embodiment>

Figure 6:
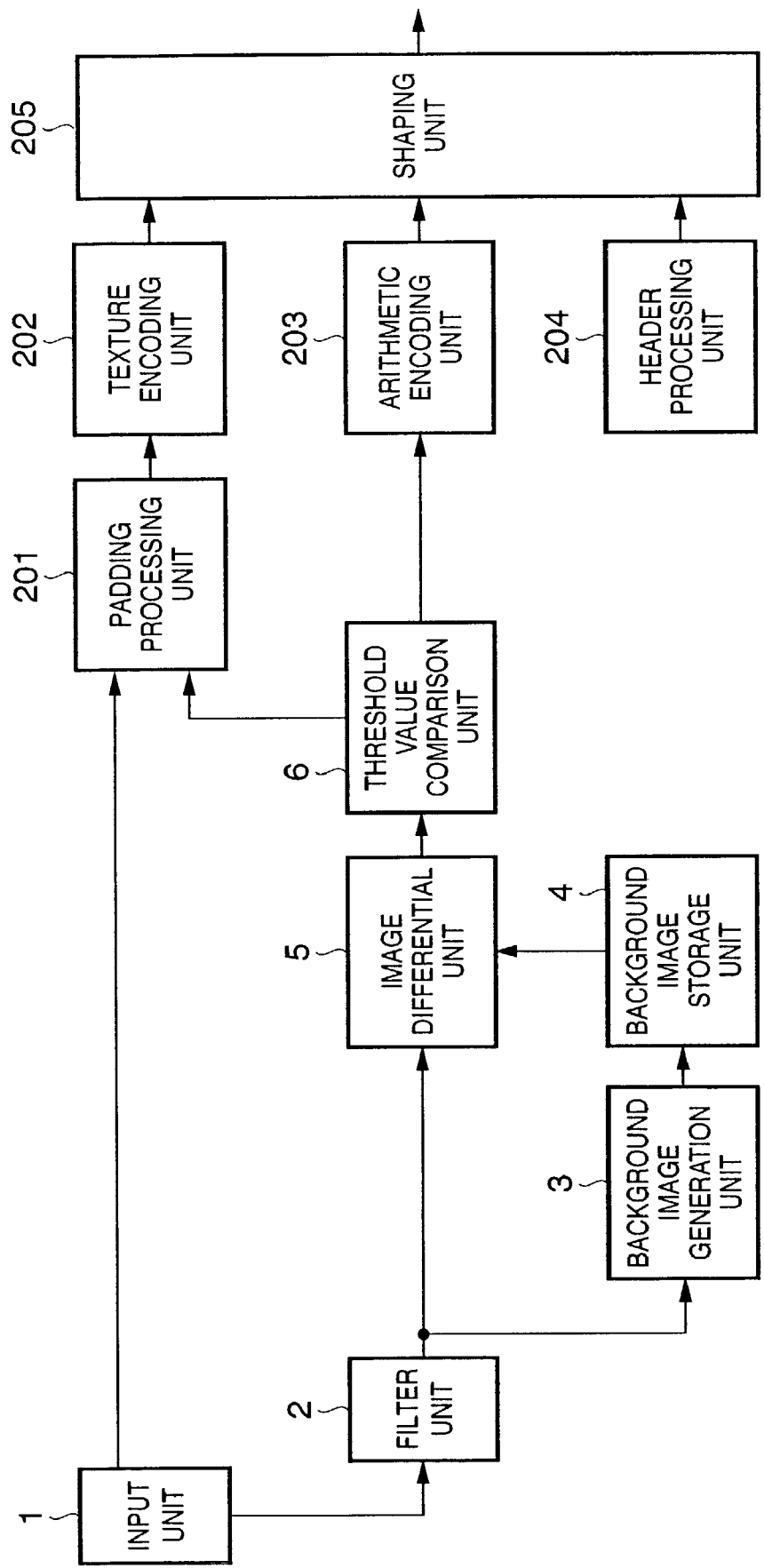
FIG. 6 is a block diagram showing the arrangement of an image processing apparatus according to the third embodiment of the present invention.

FIG. 6 is a block diagram showing the arrangement of an image processing apparatus according to the third embodiment of the present invention. In this embodiment, a case will be explained wherein an extraction result extracted from a moving image is encoded and output. Note that MPEG-4 encoding will be exemplified. Also, the same reference numerals in FIG. 6 denote building components having the same functions as those in the first embodiment shown in FIG. 1, and a detailed description thereof will be omitted.

Referring to FIG. 6, a padding processing unit 201 is connected to the input unit 1 and threshold value comparison unit 6, and executes a padding process of an image input from the input unit 1 using mask information generated by the threshold value comparison unit 6 as shape information. As a result, a process for padding pixel values outside the boundary at an object boundary portion is done. The padding processing unit 201 is also connected to a texture encoding unit 202.

The texture encoding unit 202 entropy-encodes the output from the padding processing unit 201 by DCT transformation and quantization according to MPEG-4, thus outputting the encoded data to a shaping unit 205.

An arithmetic encoding unit 203 is connected to the threshold value comparison unit 6, and arithmetically encodes generated mask information. The arithmetic encoding unit 203 is also connected to the shaping unit 205. A header processing unit 204 generates header information of each layer of MPEG-4, and outputs it to the shaping unit 205. The header processing unit 204 generates pieces of header information of respective layers, e.g., those of visual object sequence layer, visual object layer, video object layer, and visual object plane layer, and outputs them to the shaping unit 205. Assume that information required to form these headers are determined in advance. In this embodiment, a case will be exemplified wherein all frames are encoded in I-VOP mode, but motion compensation may be done.

The shaping unit 205 shapes the outputs from the header processing unit 204, texture encoding unit 202, and arithmetic encoding unit 203 in accordance with MPEG-4.

As for the operation of the image processing apparatus of this embodiment, as in the first embodiment, the filter unit 2 smoothes a frame image input from the input unit 1, the image differential unit 5 generates a differential image with the background image, and the threshold value comparison unit 6 generates mask information that represents the shape of the object using a predetermined threshold value. The generated mask information is input to the padding processing unit 201 and arithmetic encoding unit 203. The padding processing unit 201 executes a padding process specified by MPEG-4 for macroblocks corresponding to the boundary of the shape information, and those outside the region.

The image data that has undergone the padding process is input to the texture encoding unit 202, which entropy-encodes the image data by DCT transformation and quantization, and outputs obtained encoded data to the shaping unit 205.

The mask information input to the arithmetic encoding unit 203 undergoes arithmetic encoding specified by MPEG-4, and is output to the shaping unit 205. In this manner, the shaping unit 205 shapes and outputs data in accordance with the MPEG-4 format using the mask information input from the texture encoding unit 202 and arithmetic encoding unit 203, and the header information input from the header processing unit 204.

That is, this embodiment is characterized by further comprising arithmetic encoding means (arithmetic encoding unit 203) for arithmetically encoding data of an extracted object region, padding processing means (padding processing unit 201) for executing a padding process of the extracted object region, texture encoding means (texture encoding unit 202) for entropy-encoding the data of the object region that has undergone the padding process, header input means (header processing unit 204) for inputting predetermined header information, and shaping means (shaping unit 205) for encoding the data of the extracted object region by a predetermined encoding method using the arithmetically encoded data of the object region, the entropy-encoded data of the object region, and the header information.

With the series of processes, an object can be optimally and quickly extracted from a background image, which is out of focus due to focus adjustment, and the extracted object can be encoded.

Note that the third embodiment adopts MPEG-4, but the present invention is not limited to such specific encoding method. Other encoding methods, e.g., a method of encoding an object as a region of interest using ROI of JPEG2000, may be used.

<Fourth Embodiment>

Figure 7:
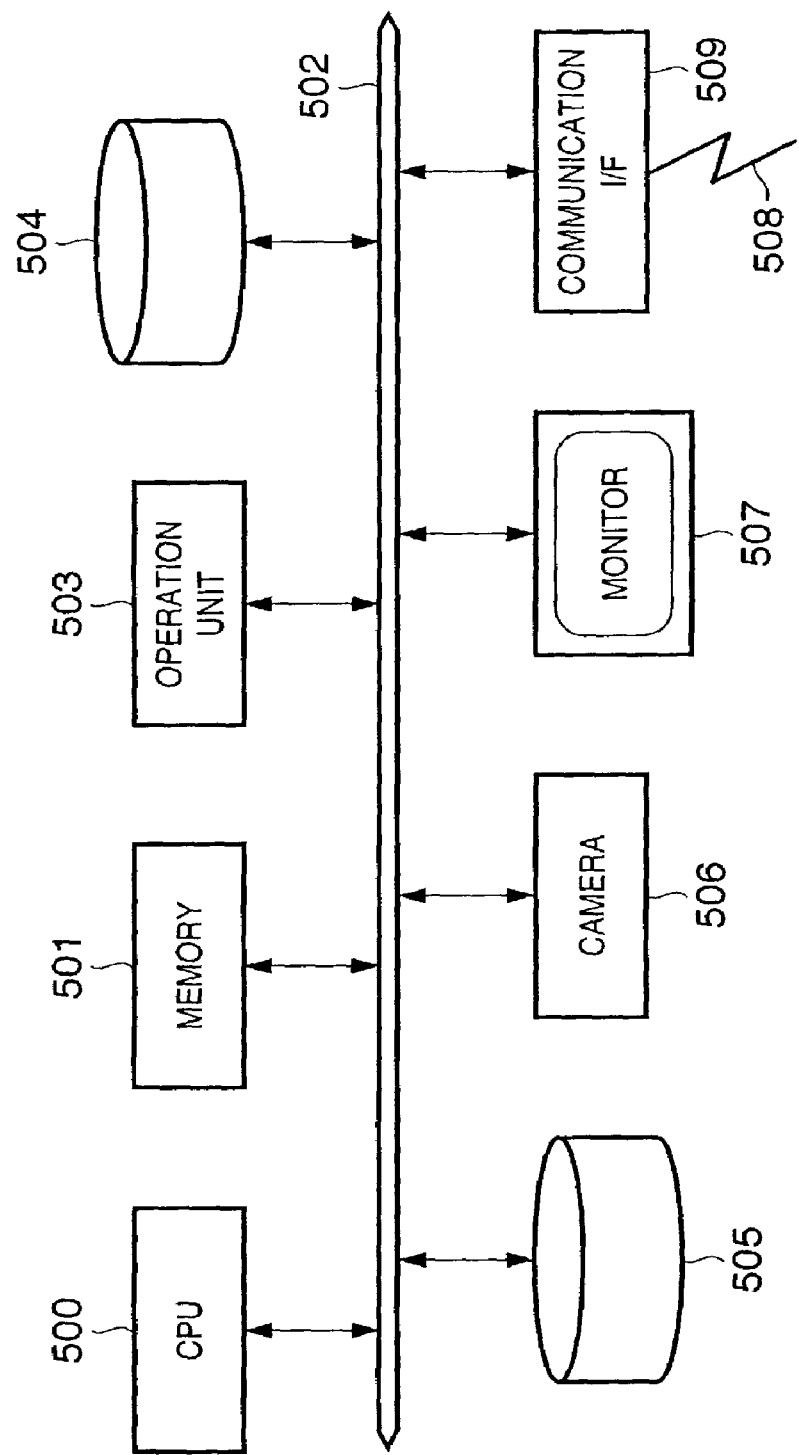
FIG. 7 is a block diagram showing an electrical arrangement that implements an image processing apparatus according to the fourth embodiment of the present invention.

FIG. 7 is a block diagram showing the electrical arrangement for implementing an image processing apparatus according to the fourth embodiment. Referring to FIG. 7, a central processing unit (CPU) 500 controls the overall image processing apparatus that extracts an object from a differential image between frame images that form a moving image, and controls various processes. A memory 501 includes an area for storing an operating system (OS) required to control the image processing apparatus, and software which is to run, an image area for storing image data, a background image area for storing the generated background image, and a working area for storing parameters and the like of various arithmetic operations.

An operation unit 503 serves as an interface with an operator so as to start up the image processing apparatus, and to set various conditions. A storage device 504 stores software. A storage device 505 stores image data. A camera 506 senses a moving image to be processed by the image processing apparatus. A monitor 507 displays the sensed moving image and the like. The aforementioned devices are connected to a bus 502 to exchange data and control signals. A communication circuit 508 comprises a LAN, public line, wireless line, broadcast wave, or the like, and is used to exchange image data and the like with another image processing apparatus via a communication I/F 509 connected to the bus 502.

In the image processing apparatus with the aforementioned electrical arrangement, when a start instruction is input from the operation unit 503 to the entire apparatus, the respective units are initialized prior to an object region extraction process. With this process, software stored in the storage device 504 is mapped on the memory 501 via the bus 502, and is launched.

Figure 8:
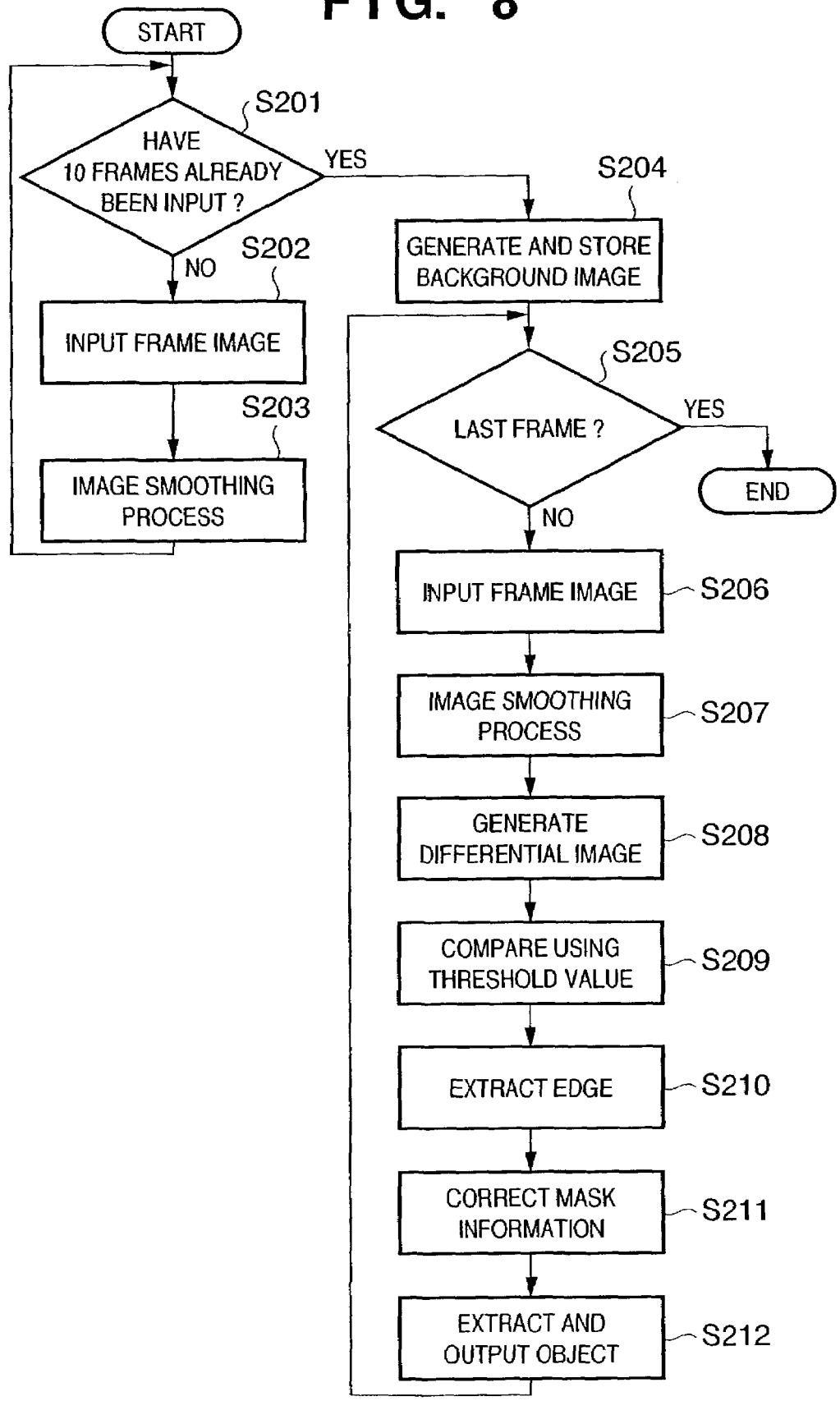
FIG. 8 is a flow chart for explaining the processing operation for extracting an object from a moving image input from a camera 506, storing the extracted object image in a storage device 505, and displaying that object image on a monitor 507 at the same time under the control of a CPU 500 in the image processing apparatus according to the fourth embodiment shown in FIG. 7.

FIG. 8 is a flow chart for explaining the processing operation for extracting an object from a moving image input from the camera 506, storing the extracted object image in the storage device 505, and displaying that object image on the monitor 507 at the same time under the control of the CPU 500 in the image processing apparatus according to the fourth embodiment shown in FIG. 7.

In this embodiment, a background image is generated from 10 images as in the aforementioned embodiments. It is checked if 10 frame images have already been input and smoothed (step S201). As a result, if the 10 frame images have already been smoothed (Yes), the flow advances to step S204. On the other hand, if the 10 frame images have not been smoothed yet (No), the flow advances to step S202. In step S202, an image of each frame is input from the camera 506, and is stored in the image area of the memory 501.

Respective pixels of the input image stored in the image area of the memory 501 undergo a smoothing process given by equation (2) in the first embodiment. The smoothed image is stored in the image area of the memory 501, and the image before the smoothing process is discarded (step S203). The flow returns to step S201. Such processing sequence is repeated until 10 frame images are smoothed, and if it is determined in step S201 that 10 images have been input and smoothed (Yes), the flow advances to step S204.

In step S204, averages of the 10 smoothed images stored in the image area of the memory 501 for respective pixels are calculated to generate one background image, which is stored in the background image area of the memory 501. After the background image is stored, the 10 smoothed frame images are discarded. It is then checked if the finally input frame image is the last frame of the moving image (step S205) As a result, if it is determined that the finally input frame image is the last frame (Yes), the object region extraction process ends. On the other hand, if it is determined that the finally input frame image is not the last frame (No), the next frame image is input from the camera 506 (step S206), and is stored in the image area of the memory 501.

Respective pixels of the input frame image stored in the image area of the memory 501 undergo the smoothing process given by equation (2) above, and are stored in the image area of the memory 501 (step S207). Furthermore, the absolute values of the differences between the smoothed frame image and the generated background image are calculated for respective pixels to generate a differential image, which is stored in the image area of the memory 501 (step S208).

Respective pixel values of the differential image stored in the image area of the memory 501 are compared with a predetermined threshold value T, a portion defined by pixel values equal to or larger than the threshold value is generated as mask information, which corresponds to a region to be extracted, and the mask information is then stored in the image area of the memory 501 (step S209). For the frame image which is input from the camera 506 and is stored in the image area of the memory 501, edge extraction is done for pixels, which fall within the range of several pixels inside the boundary line of the mask information stored in the image area of the memory 501, and the edge extraction result is stored in the working area of the memory 501 (step S210).

Figure 9:
FIG. 9 shows an example of an object image generated by the process based on the flow chart shown in FIG. 8.
Figure 10:
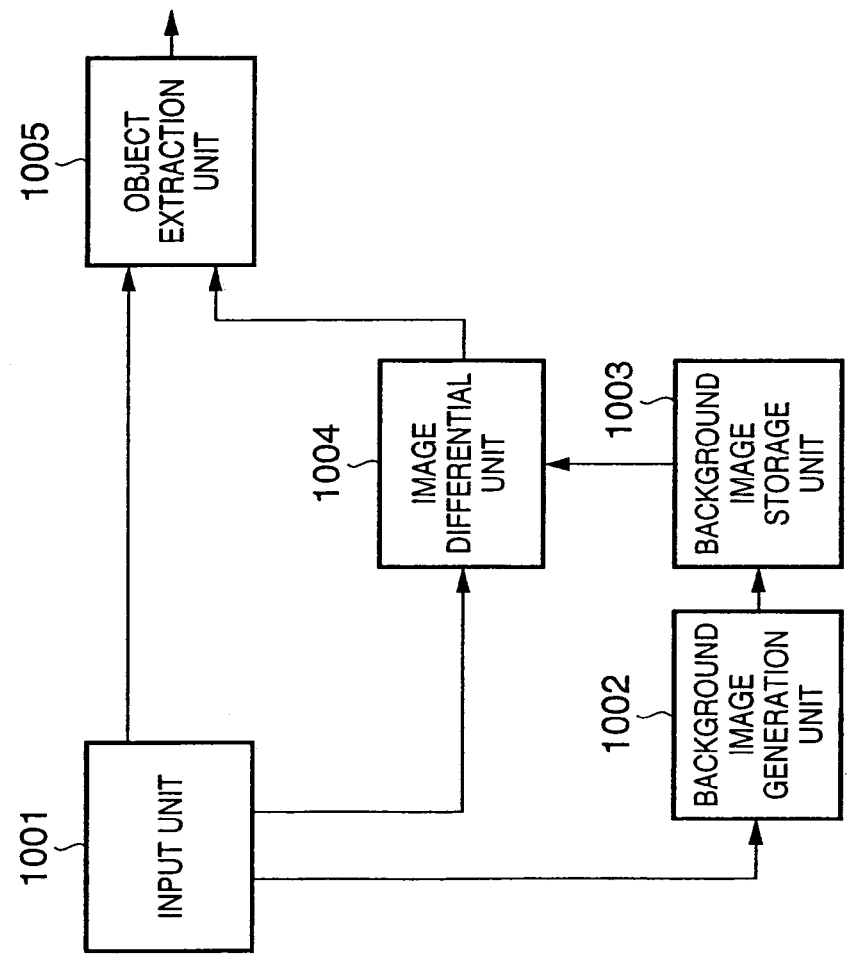
FIG. 10 is a block diagram showing the arrangement of a conventional image processing apparatus for extracting an object from the difference between the stored background image and input image.
Figure 12:
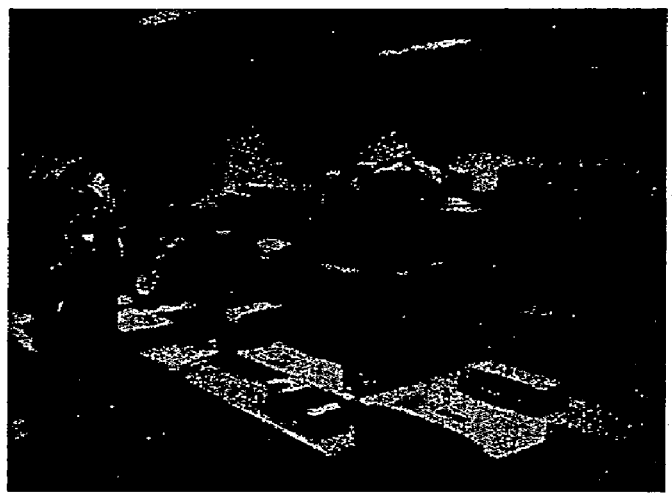
FIG. 12 shows a differential image generated from the two images shown in FIGS. 11A and 11B.

Mask information, which is obtained by correcting the mask information stored in the image area of the memory 501 by applying the boundary of the mask information to the edge in consideration of continuity of the edge stored in the working area of the memory 501, is stored in the image area of the memory 501 (step S211). An object is then extracted from the frame image stored in the image area of the memory 501 in accordance with the mask information stored in the image area of the memory 501 and is written in a predetermined area of the storage device 505, and that state is displayed on the monitor 507 at the same time (step S212). The frame image, region information, and mask information stored in the image area of the memory 501, and the edge information in the working area are discarded from the memory 501, and the flow then returns to step S204 to similarly process other frame images. FIG. 9 shows an example of an object image generated by the process based on the flow chart shown in FIG. 8. In FIG. 9, a region other than a black portion is considered as an object. As shown in FIG. 9, the boundary line of the object is naturally extracted.

That is, this embodiment is characterized in that the object extraction means (object extraction unit 7) in the above three embodiments comprises contour region setting means for setting a contour region of a predetermined width, which includes boundary pixels with a background region within a set object region, edge extraction means for extracting an edge contained in the contour region in a predetermined frame image, and contour correction means for correcting the contour of the object region on the basis of the shape of the extracted edge.

With the series of processes described above, even when the background image goes out of focus as a result of focus adjustment, an object can be optimally and accurately extracted from the differential image.

In the fourth embodiment, all processes are implemented by software. However, the present invention is not limited to this, and some or all processing functions may be implemented by hardware.

In the fourth embodiment, an object is extracted from the input from the camera 506. Also, image data which is stored in the storage device 504 or is input from the communication line 508 via the communication interface 509 may be processed.

In the fourth embodiment, edge extraction is done to correct mask information. However, the present invention is not limited to such specific method, and may use energy minimization of active contour models called Snakes (e.g., Michael Kass, Andrew Witkin, and Demetri Terzopoulos, "Snakes: Active Contour Models", *International Journal of Computer Vision*, Vol. 1, No. 3, pp. 321–331, 1988). "Snakes" defines an energy function which is minimized upon extraction of a contour line, and obtains its local minimum from an appropriate initial value by iteration. The energy function is defined by the linear sum of external energy as a constraint that passes through an edge point, and internal energy as a constraint of smoothness.

In the second to fourth embodiments described above, the average of a plurality of frame images is generated as the background image. However, as in the first embodiment, the present invention is not limited to this. For example, the average of images obtained by changing focus to a plurality of levels may be used, or one frame image may be used as a background image.

In the above embodiments, the filter process for the smoothing process is implemented by the method given by equation (2). However, the present invention is not limited to such specific smoothing processing method. For example, smoothing may be done based on data obtained from the measurement results of an optical system, or other smoothing filters such as a median filter and the like may be used.

Furthermore, in the above embodiments, the background image is calculated using the first to 10th frames, and an object region is extracted from the 11th and subsequent frames. Alternatively, a smoothed image of a frame image immediately before a frame from which an object is to be extracted, or an average image of smoothed images of a plurality of frame images immediately before that frame may be used as the background image. Moreover, the image processing apparatuses according to the first to third embodiments can be implemented by the same electrical arrangement as that explained in the fourth embodiment using FIG. 7.

As described above, according to the first to fourth embodiments, even when the focus upon sensing an image by a camera with an automatic focus adjustment function shifts from the background to an object, the object can be appropriately extracted.

<Fifth Embodiment>

The fifth embodiment provides an image processing method and apparatus, which can identify an incoming object within the image sensing range from the background with high precision while focusing on the object, a computer program which implements that method, and a computer readable storage medium for storing that program.

Figure 13:
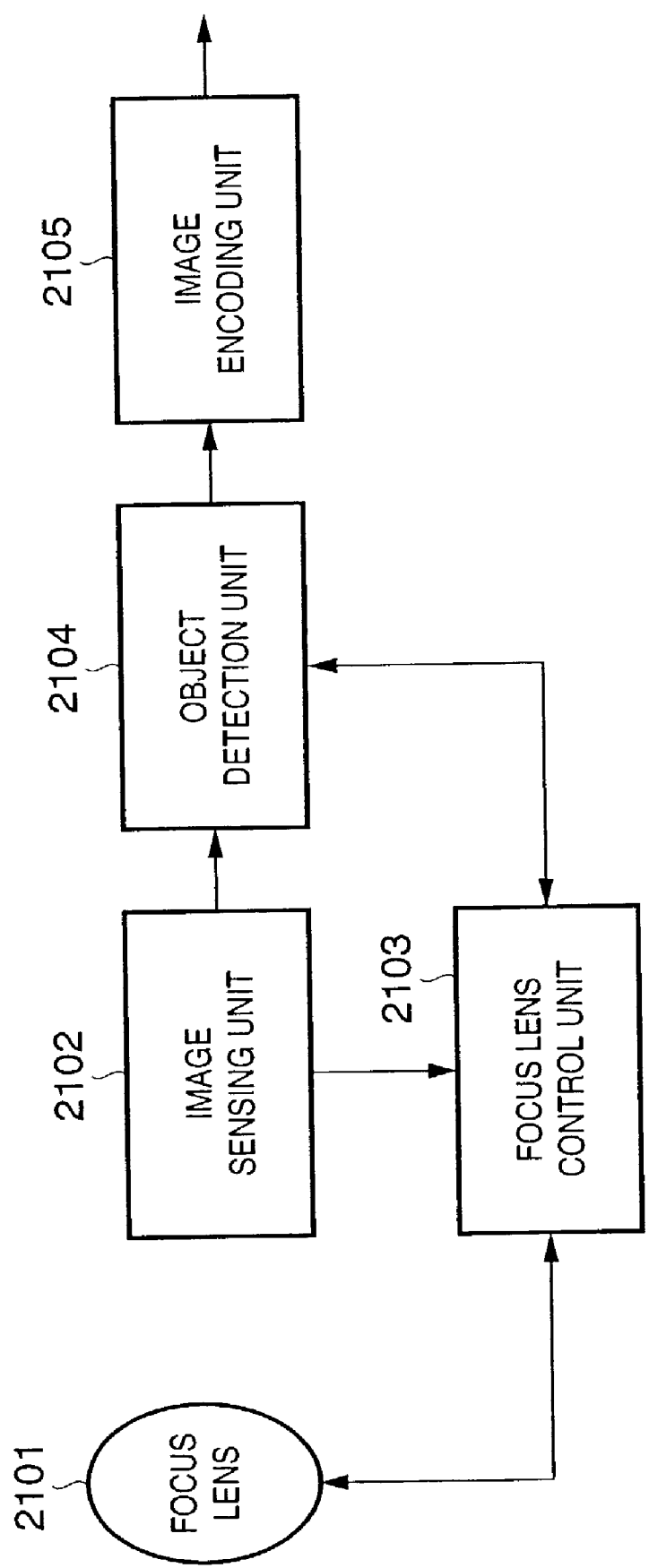
FIG. 13 is a block diagram showing the arrangement of an image processing apparatus according to the fifth embodiment of the present invention.

FIG. 13 is a block diagram showing the arrangement of an image processing apparatus in this embodiment. Referring to FIG. 13, an image sensing unit 2102 converts an optical image of an object into an electrical signal, and outputs it as a video signal of a predetermined format. A focus lens control unit 2103 controls a focus lens 2101 so that an image to be sensed is in focus (the focus lens 2101 and image sensing unit 2102 form image sensing means). Some other types of lenses are required to sense an image in addition to the focus lens, but a description thereof will be omitted. A video signal output from the image sensing unit 2102 is input to an object detection unit 2104. The object detection unit 2104 has functions of generation and selection of a background image, a differential process, and the like. The object detection unit 2104 also has a communication function with the focus lens control unit 2103, and uses the current image sensing condition received from the control unit 2103 in the detection process. The object detection unit 2104 outputs sensed image data, and binary detection result data (data indicating the background or object). Details of the object detection unit 2104 will be described later.

When these output data are encoded by an image encoding unit 2105, they can be communicated via a line with a narrow bandwidth, or can be recorded on a storage medium with a small capacity. As a method that can obtain high encoding efficiency as an encoding technique for a moving image, MPEG-4 visual encoding as the international standard is known.

Figure 22:
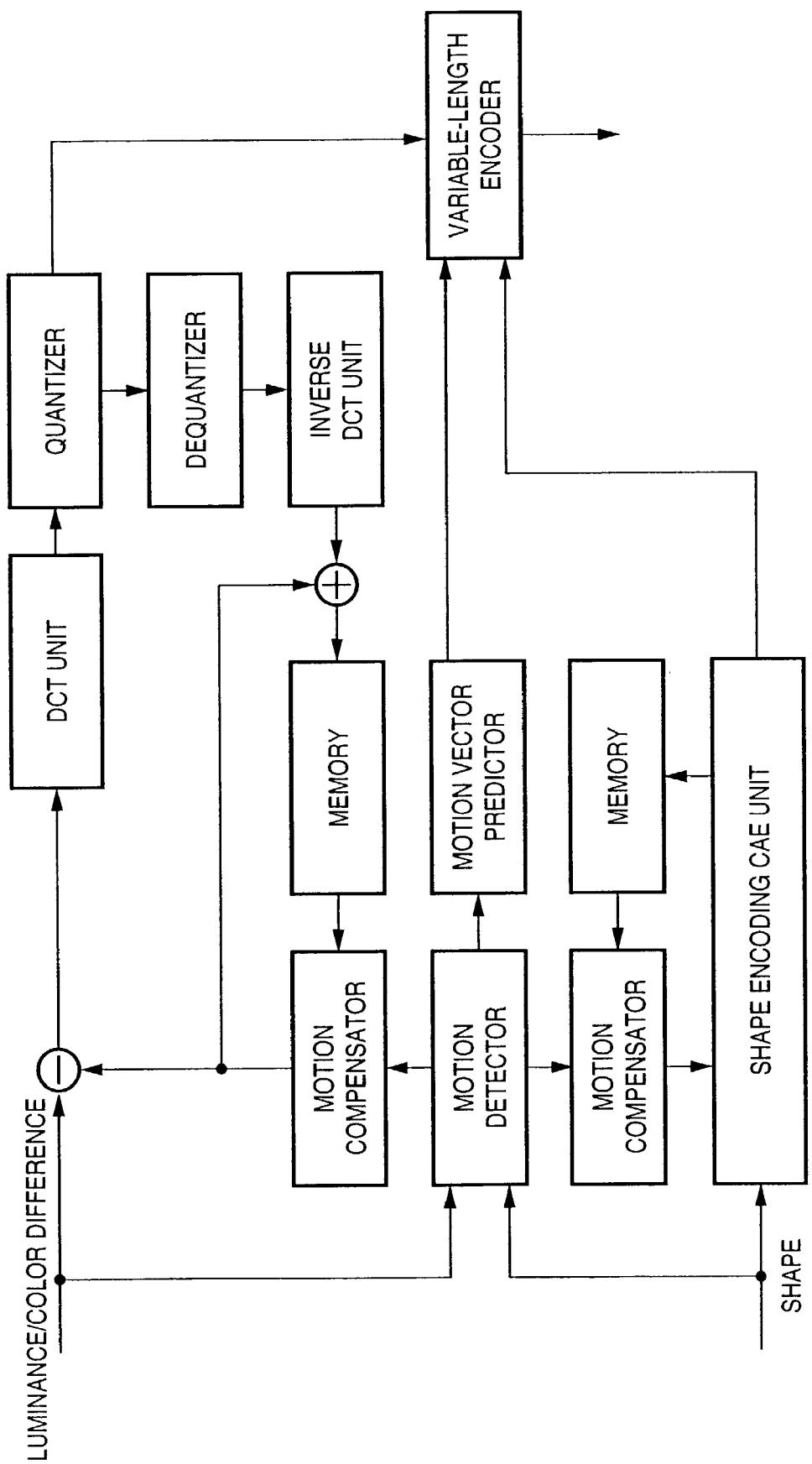
FIG. 22 is a block diagram of MPEG-4 visual encoding.

FIG. 22 is a block diagram of this encoding method. The circuit shown in FIG. 22 receives two types of signals, i.e., an image signal including luminance and color difference components, and a shape signal indicating the shape of an object to be encoded, and outputs a compressed bitstream. By combining the detection technique of the present invention and high-efficiency encoding technique, a monitor system that can assure high accuracy and high image quality can be realized.

Referring to FIG. 22, in an intra mode, a DCT unit computes the DCTs of respective blocks, and a quantizer quantizes DCT coefficients. The quantized DCT coefficients and quantization step undergo variable-length encoding by a variable-length encoder.

In an inter mode, a motion detector detects a motion from another temporally neighboring VOP by a motion detection method (e.g., block matching), and a motion vector predictor detects a predicted macroblock which has the smallest error from a macroblock of interest. A signal indicating the motion to the predicted macroblock with the smallest error is a motion vector. An image to be referred to for the purpose of generating the predicted macroblock is called a reference VOP. A motion compensator makes motion compensation of the reference VOP on the basis of the detected motion vector to acquire an optimal predicted macroblock. The difference between the macroblock of interest and the corresponding predicted macroblock is calculated, the DCT unit computes the DCTs of this difference, and the quantizer quantizes the DCT coefficients.

On the other hand, shape data is encoded by a shape encoding CAE (Content-based Arithmetic Encoding) unit. Note that only boundary blocks undergo CAE encoding in practice, and only header information of each of blocks inside and outside a VOP is sent to the variable-length encoder. The motion detector makes motion detection of the boundary blocks which are to undergo CAE encoding as in image data in the inter mode to predict a motion vector. The difference value between the motion-compensated shape data and shape data of the previous frame undergoes CAE encoding.

Details of the process in the object detection unit 2104 will be described below.

Figure 14:
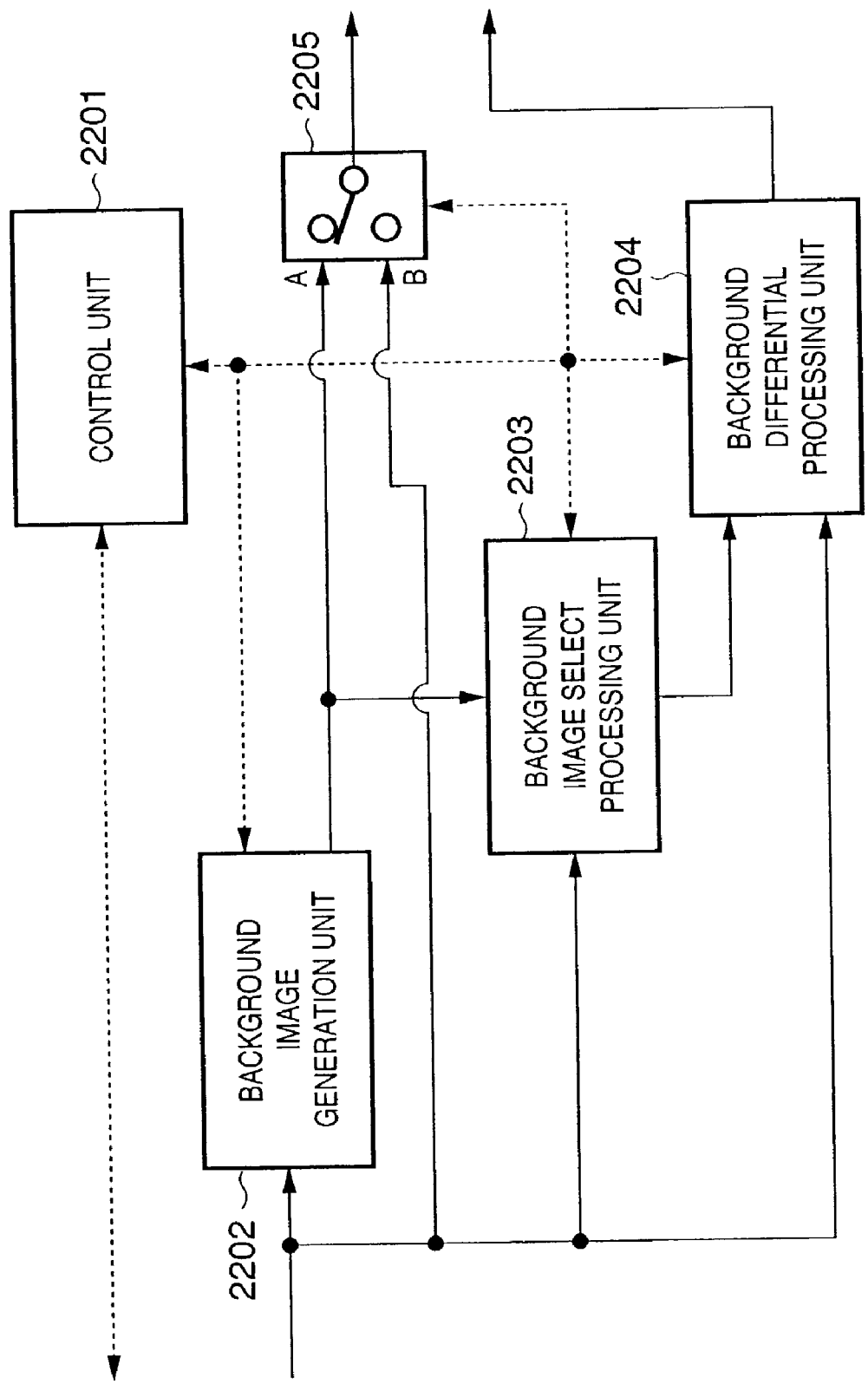
FIG. 14 is a block diagram showing the arrangement of an object detection unit in the fifth embodiment.
Figure 15:
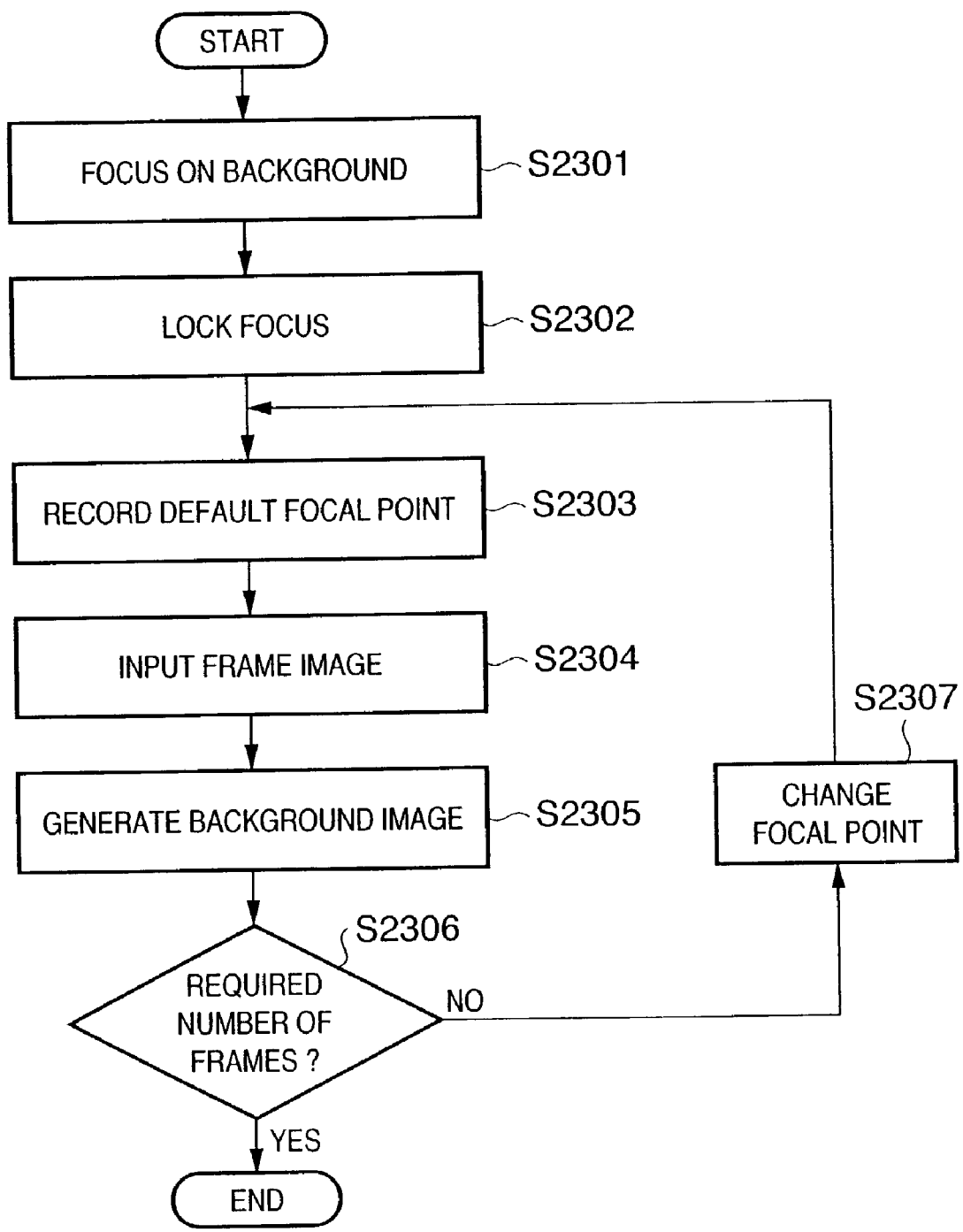
FIG. 15 is a flow chart showing the background image generation processing sequence in the fifth embodiment.

The fifth embodiment of the present invention will be described below using FIGS. 14 to 17. FIG. 14 is a block diagram of the object detection process in the fifth embodiment, FIG. 15 is a flow chart of the background image generation process, FIGS. 16A to 16C show examples of generated background images, and FIGS. 17A and 17B are flow charts of the background image select method.

The background generation process will be explained first. In step S2301 in FIG. 15, an auto-focus mode is set to adjust the focal point of a background image input from the image sensing unit 2102 to the background. When the background is in focus, the focus lens is fixed at that position (step S2302). The position of the focus lens (image sensing parameter) at that time is stored in a memory or the like (step S2303), and an image at that time is input (step S2304). In step S2305, a background image is generated for one frame from the input image. The input image at that time may be either only one frame or a frame generated by averaging a plurality of frames. In either case, data as a set of one focal point and one background image is generated.

Then, several data sets (sets of different focal points and corresponding background images) are prepared. For this purpose, a loop process is done in step S2306. If a required number of frames (background images) are not obtained yet, the auto-focus lock is released, and the focal point is fixed after it is deliberately shifted to the front side in step S2307. The flow returns to step S2303 to record the focus lens position at that time, and a new background image is generated in steps S2304 and S2305. In this manner, the lens positions and background image data are recorded while slightly shifting the focal point position. After a required number of frames are obtained, a series of background image generation processes end.

Figure 16A:
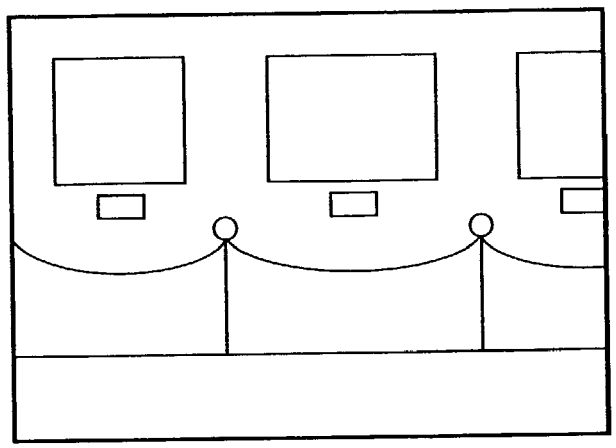
FIGS. 16A to 16C show a plurality of background images in the fifth embodiment.
Figure 16B:
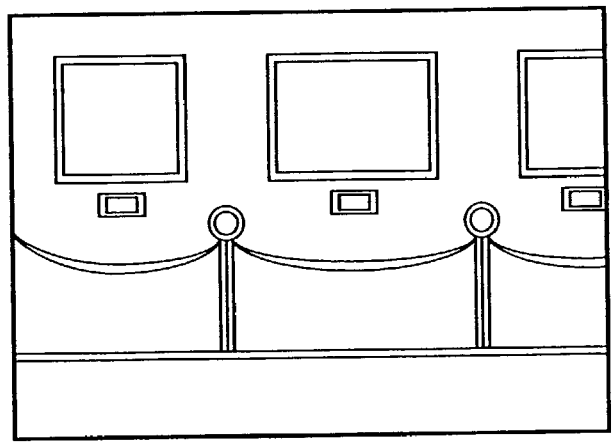
Figure 16C:
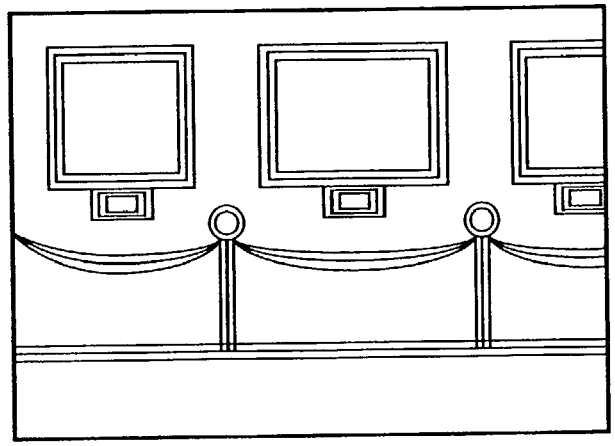
Figure 17A:
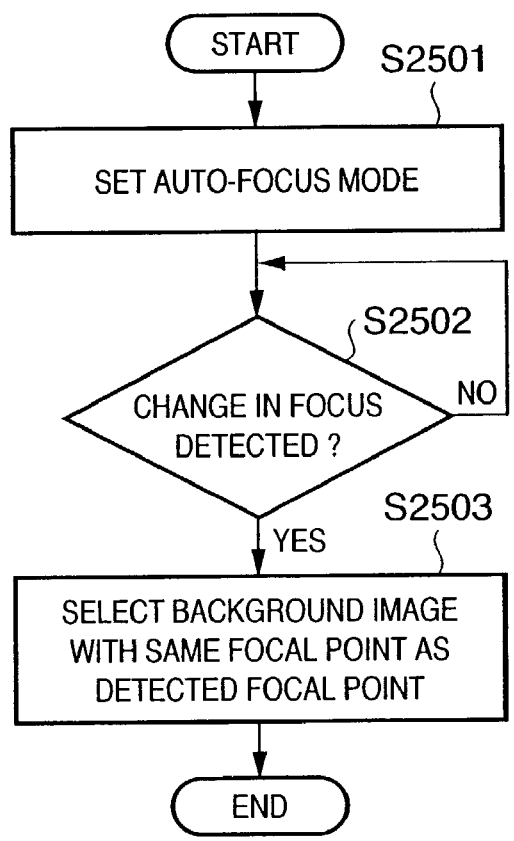
FIGS. 17A and 17B are flow charts showing the background image select processing sequence in the fifth embodiment.
Figure 17B:
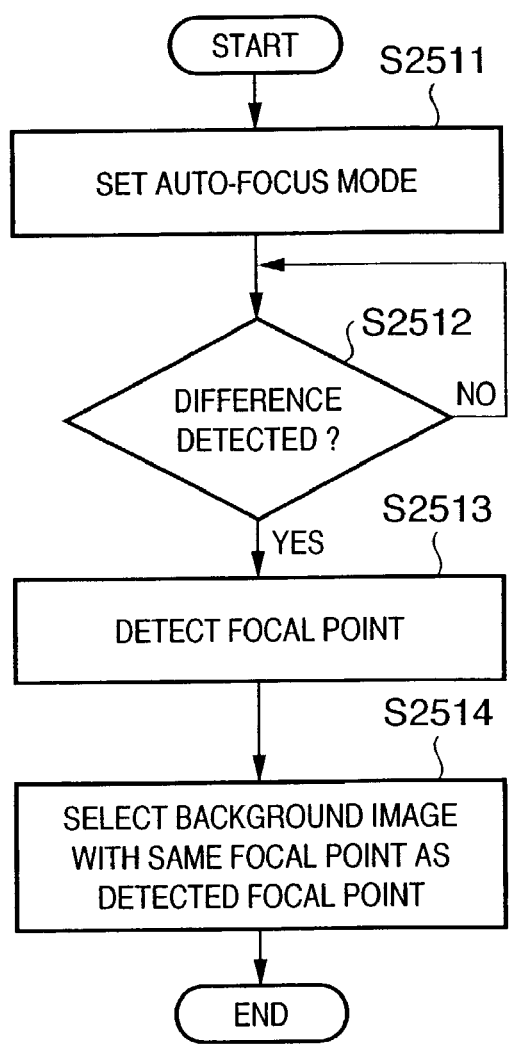

FIGS. 16A to 16C show examples of background images generated by the aforementioned method. FIG. 16A shows an image in which the background is in focus, FIG. 16B shows an image in which an object slightly in front of the background is in focus, and FIG. 16C shows an image in which an object further in front of that in FIG. 16B is in focus.

In the block diagram of FIG. 14, a control unit 2201 is a circuit for controlling respective blocks. Also, the control unit 2201 includes a communication function with the focus lens control unit 2103, and exchanges commands that pertain to focus. More specifically, auto-focus ON and OFF commands, focus lens position setup and acquisition commands, and the like are exchanged. An input signal is image data output from the image sensing unit 2102 and undergoes format conversion, a noise removal process, and the like as needed. Upon generating a background image, input data is input to a background image generation unit 2202, and is stored in a memory (not shown). The position information of the focus lens at that time is recorded (stored) in association with image data via the control unit 2201. Media that record such information are not particularly limited as long as they can store and save the information. For example, a memory, hard disk, and the like may be used. Since the correspondence between the background image and focus lens position information need only be specified, for example, the focus lens position may be used as a file name upon storing a background image.

Upon recording a background image, the output operations of a background image select processing unit 2203 and background differential processing unit 2204 are stopped in accordance with a signal from the control unit 2201. When a background image must be transmitted or recorded, a switch circuit 2205 on the output side is set at the side of contact A to output the image. Since an output image is image data for one frame, still image encoding such as JPEG may be used in place of MPEG-4 mentioned above. When only a detected object is to be recorded/transmitted, the need for sending the background image to the image encoding unit can be obviated.

Upon completion of the background image storage processes corresponding to a plurality of focus lens positions in the background image generation unit 2202, an object detection process is done in practice.

A process for determining a background image to be selected upon detecting an object will be described below using the flow chart in FIG. 17A. An auto-focus mode is set in step S2501, and a change in focus is repetitively detected in step S2502. Before an object is detected, the background remains in focus, and no change in focus is detected. When an object has entered the monitor region, that object is in focus, and a change in focus is detected. At this time, a background image having the same focal point position as the new focal point position detected is selected in step S2503. If a background image having the same focal point position is not found, a background image with the closest value is selected, and is output to the background differential processing unit 2204.

Another selection method of a background image will be explained below using the flow chart in FIG. 17B. The first step S2511 of setting the auto-focus mode is the same as that in the above example. In step S2512, the difference is detected between the input image and background image. The background image used in this case is an image which is generated first and in which the background is in focus. Therefore, nearly no difference value is generated before an object is detected. When an object has entered the monitoring region, since the object is in focus, a large difference value is detected. At this time, a focal point position is detected in step S2513, and a background image having the same focal point position as that focal point position is selected in step S2514. If a background image having the same focal point position is not found, a background image with the closest value is selected. In this method, since a change in focal point position is detected by an image process, a communication time required to acquire focus information can be reduced, and the performance of the whole system can be improved.

Figure 23A:
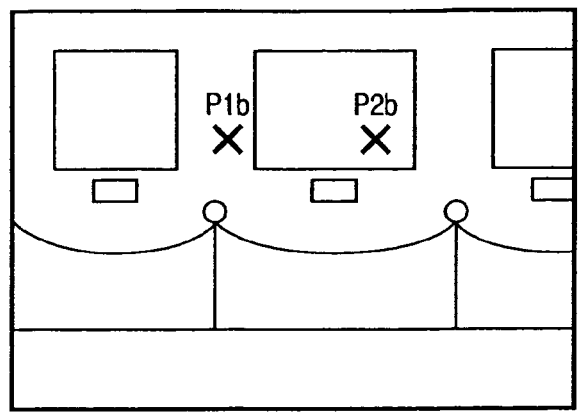
FIGS. 23A to 23C are views for explaining object detection based on a background differential process.
Figure 23B:
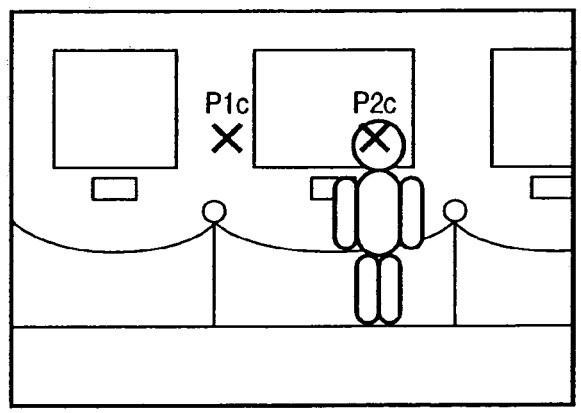
Figure 23C:
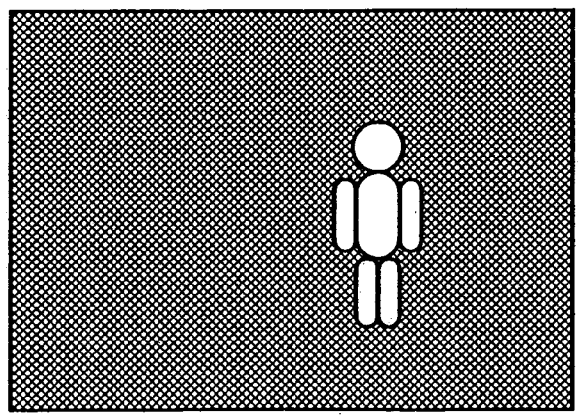
Figure 24:
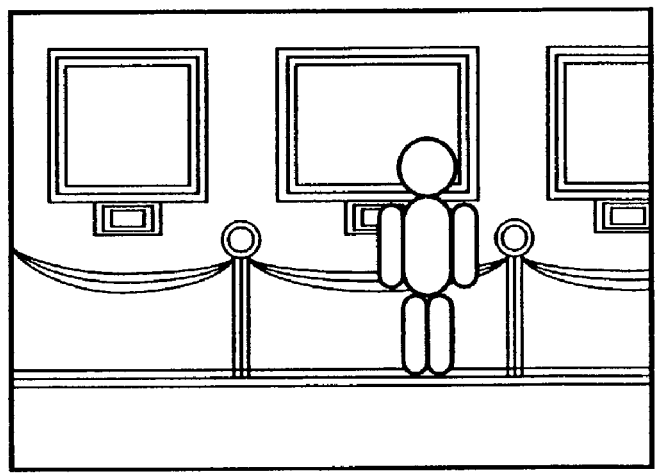
FIG. 24 is a view for explaining a problem in object detection based on a background differential process.

This process will be explained using examples of display images. Assume that the plurality of background images described using FIGS. 16A to 16C are prepared, and an image obtained when an object has entered is that shown in FIG. 24 (the object is in focus). At this time, the image shown in FIG. 16C is selected as a background image, which is to undergo difference comparison, on the basis of the value of the focal point position at that time. The comparison result between the pixel values of FIGS. 24 and 16C is the same as that between FIGS. 23A and 23B, as described above, and the result shown in FIG. 23C can be obtained.

The following explanation will be given using the block diagram of FIG. 14. Since the background image has already been generated, the output operation of the background image generation unit 2202 is stopped by the control unit 2201. The background image select processing unit 2203 obtains focal point information via the control unit 2201. If a change in focal point is detected, the unit 2203 selects a background image having the same focal point position as the detected focal point position from the background image generation unit 2202, and outputs it to the background differential processing unit 2204. If no input image is used upon detecting a change in focal point, the monitor image need not be input to the background image select processing unit 2203. This input is required when the process explained using the flow chart of FIG. 17B is done. The background differential processing unit 2204 executes comparison and determination processes between the selected new background image and input monitor image, and outputs the result as shape data. At this time, the switch circuit 2205 is set on the side of contact B, and a set of image data and shape data are sent to the image encoding unit 2105. Since MPEG-4 visual encoding encodes only an extracted portion of image data, data can be greatly compressed at a higher ratio than in a case wherein the entire image frame is encoded.

As described above, according to the fifth embodiment, since a background image having the same focal point position as that upon detecting an object is selected from a plurality of background images, and a differential process is executed, a high-precision detection process which is free from determination errors on a background portion and in which an incoming object is in focus can be done. Since the detected object is encoded using the high-precision detection process result, a high-efficiency monitoring system can be implemented.

<Sixth Embodiment>

The sixth embodiment of the present invention will be described below. In the fifth embodiment, sets of focus lens positions and background image data are held. In the sixth embodiment, a case will be explained wherein the focus lens position information cannot be obtained. Note that the overall arrangement of the image processing apparatus in the sixth embodiment is the same as that shown in FIG. 13.

Figure 18:
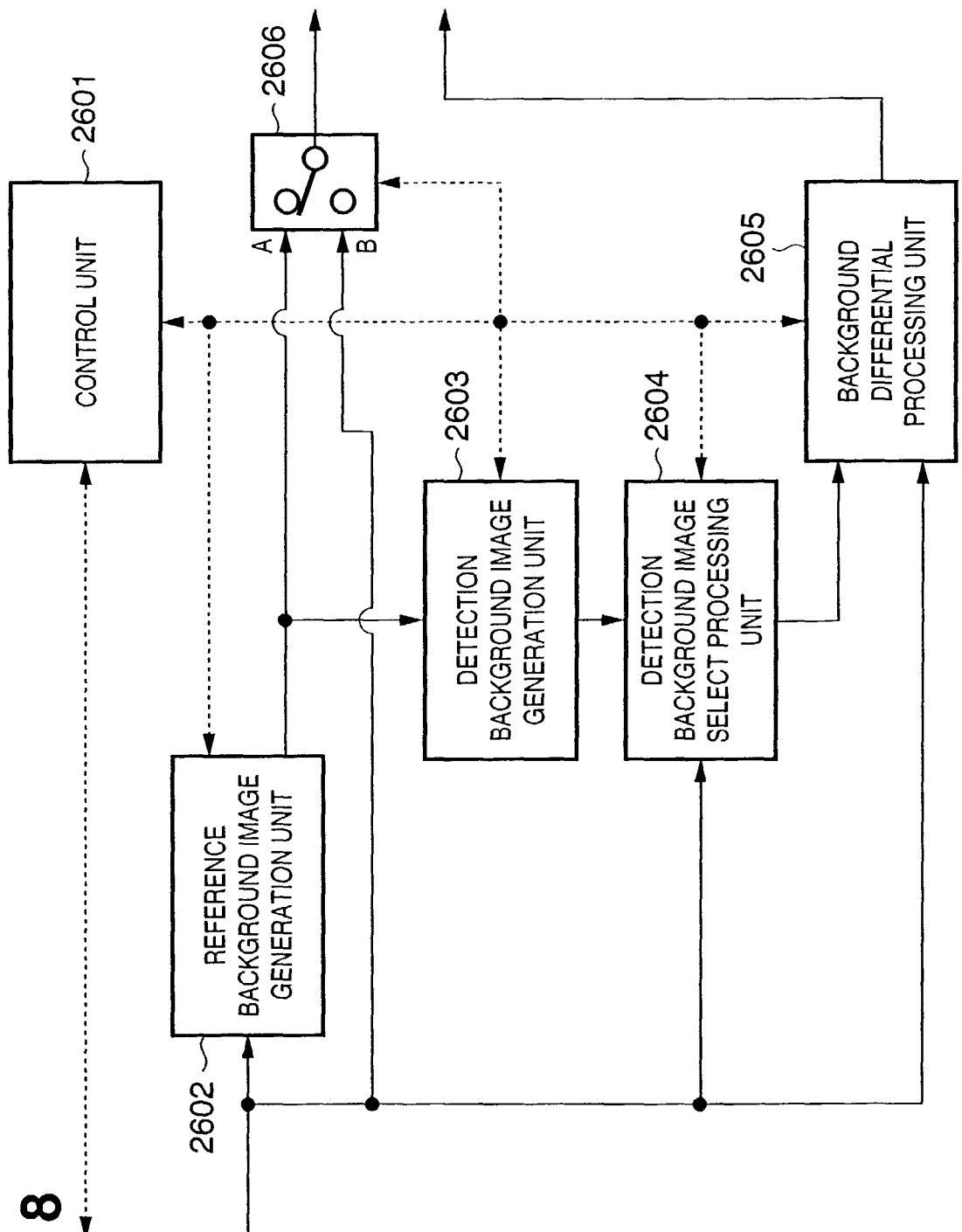
FIG. 18 is a block diagram showing the arrangement of an object detection unit in the sixth embodiment.
Figure 19:
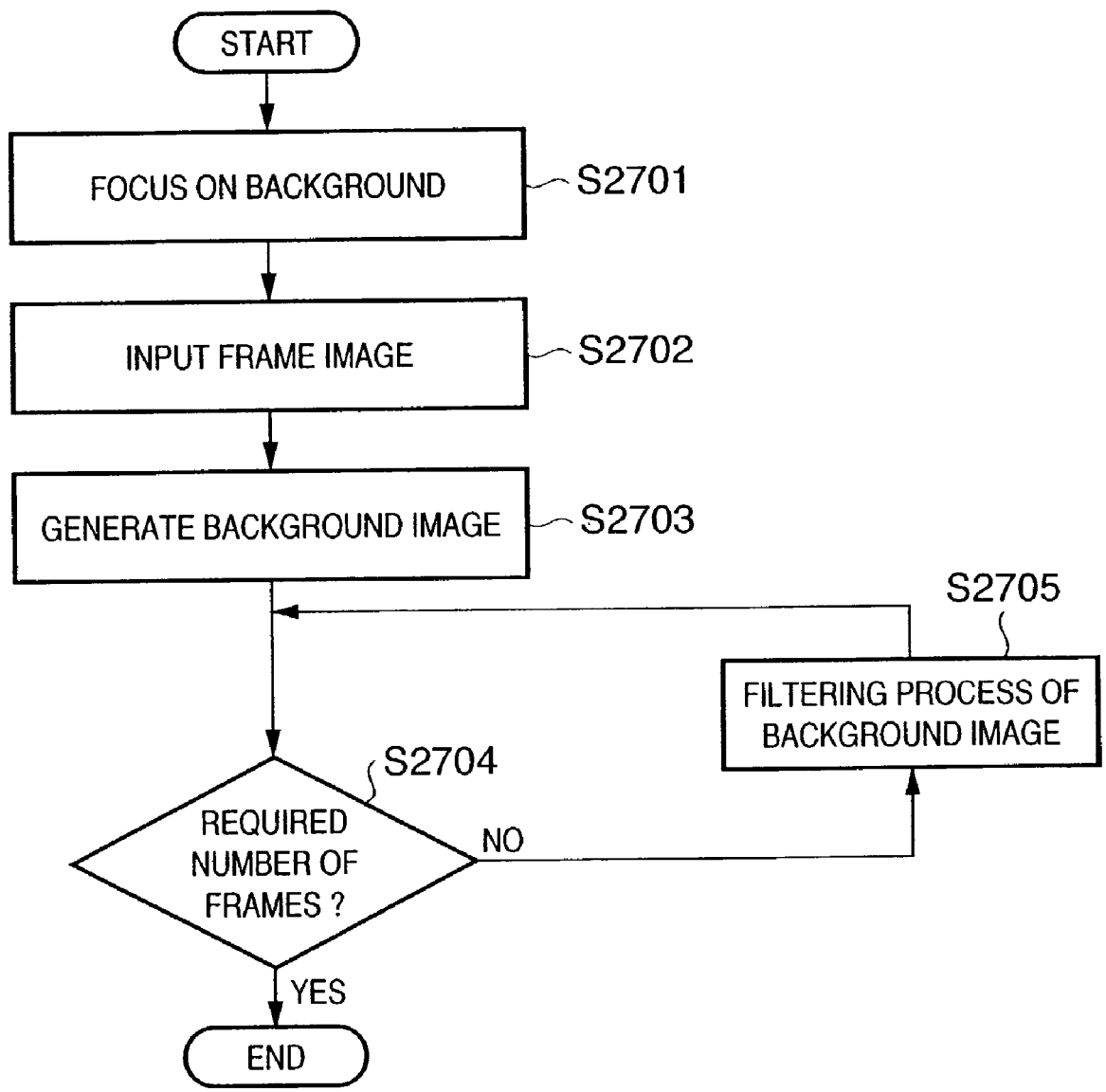
FIG. 19 is a flow chart showing the background image generation processing sequence in the sixth embodiment.

The sixth embodiment will be described in detail below using FIGS. 16A to 16C and FIGS. 18 to 20B. FIG. 18 is a block diagram of the object detection process in the sixth embodiment, FIG. 19 is a flow chart of the background image generation process, and FIGS. 20A and 20B are flow charts of the background image select method.

The background generation process will be explained first. In step S2701 in FIG. 19, an auto-focus mode is set to adjust the focal point position to a background portion of a background image input from the image sensing unit 2102. After the background portion is in focus, a frame image is input (step S2702). In step S2703, a background image for one frame is generated based on the input image. The input image at that time may be only one frame or one frame generated by an average process of a plurality of frames. In this way, generation of the first background image is complete. In step S2704, a loop process is done until a required number of frames (number of background images) are obtained. Second and subsequent background images are obtained by a filtering process in step S2705. Images with different focal point positions can be generated by dropping high-frequency components using a low-pass filter. That is, by gradually narrowing down a frequency range that can pass through a filter, images having larger defocus amounts from the background can be generated. After the background images for a required number of frames are generated in this way, the control leaves the loop in step S2704, thus ending a series of background image generation processes.

The background images generated by the above method are the same those in FIGS. 16A to 16C, i.e., those described in the fifth embodiment. FIG. 16A shows an image in which the background is in focus, FIG. 16B shows an image in which an object slightly in front of the background is in focus, and FIG. 16C shows an image in which an object further in front of that in FIG. 16B is in focus.

In the block diagram of FIG. 18, a control unit 2601 is a circuit for controlling respective blocks. Also, the control unit 2601 includes a communication function with the focus lens control unit 2103, and exchanges commands that pertain to focus. More specifically, auto-focus ON and OFF commands, and the like are exchanged.

Unlike in FIG. 14, focus lens position setup and acquisition data and the like are not obtained. An input signal is image data output from the image sensing unit 2102 and undergoes format conversion, a noise removal process, and the like as needed. Upon generating a background image, input data is input to a reference background image generation unit 2602. The output from the reference background image generation unit 2602 is an in-focus background image for one frame, and a detection background image generation unit 2603 generates a plurality of background images using this reference background image. The plurality of generated background images are stored in a detection background image select processing unit 2604. A memory, hard disk, or the like may be used as a storage medium. Upon generating a background image, the output operations of a detection background image select processing unit 2604 and background differential processing unit 2605 are stopped in accordance with a signal from the control unit 2601. When a background image must be transmitted or recorded, a switch circuit 2606 on the output side is set at the side of contact A to output the image. Since the background image is image data for one frame, still image encoding such as JPEG may be used in place of MPEG-4 mentioned above. When only a detected object is to be recorded/transmitted, the need for sending the background image to the image encoding unit can be obviated.

A process for determining a background image to be selected after these plurality of background images are prepared will be described below using the flow chart in FIG. 20A.

An auto-focus mode is set in step S2801, and a difference is detected in step S2802. A background image used in this case is an image which is generated first, and in which the background is in focus. Therefore, nearly no difference value is generated until an object is detected. When an object has entered the monitoring region, since the object is in focus, a large difference value is detected. At this time, the background image and monitor image are compared to calculate a matching level in step S2803. A method of calculating the matching level will be explained later. Instep S2805, the next background image is selected, and the flow returns to step S2803 to calculate the matching level with the input monitor image. It is checked by a loop process in step S2804 if matching levels with all the prepared background images have been calculated. Upon completion of calculation for all the background images, the flow advances to step S2806. In step S2806, a background image with the highest matching level is selected from all the background images for which the matching levels have been calculated. The selected background image is determined as an image for a differential process, thus ending a series of processes. In this method, since large difference values are generated on the entire first frame when an object has entered, a change in focal point position can be reliably detected even if focus lens position information is not available.

Another method of selecting a background image will be explained below using the flow chart of FIG. 20B.

In step S2811, the focal point position is fixed on the background. In step S2812, the difference between the input image and background image is detected. Since the background image is an image in which the background is in focus, nearly no difference value is generated until an object is detected. When an object has entered the monitoring region, a large difference value is detected in a portion where the object is present. At this time, an auto-focus mode is set in step S2813 to adjust the focal point of the input monitor image to the incoming object. In step S2814, the background image and monitor image are compared to calculate a matching level. In step S2816, the next background image is selected, and the flow returns to step S2814 to calculate a matching level with the input monitor image. It is checked by a loop process in step S2815 if matching levels with all the prepared background images have been calculated. Upon completion of calculation for all the background images, the flow advances to step S2817. In step S2817, a background image with the highest matching level is selected from all the background images for which the matching levels have been calculated, thus ending a series of processes. In this method, since a background image is in focus even in the first frame when the object has entered, high-precision shape data can be output.

This process will be explained using examples of display images. The following description is the same as that given in the fifth embodiment. Assume that the plurality of background images described using FIGS. 16A to 16C are prepared, and an image obtained when an object has entered is that shown in FIG. 24. At this time, the image shown in FIG. 16C is selected as a background image, which is to undergo difference comparison, on the basis of the matching level of the background at that time. The comparison result between the pixel values of FIGS. 24 and 16C is the same as that between FIGS. 23A and 23B, as described above, and the result shown in FIG. 23C can be obtained.

The process explained so far will be described using the block diagram of FIG. 18. Since the background image has already been generated, the output operations of the reference background image generation unit 2602 and detection background image generation unit 2603 are stopped by the control unit 2601. The detection background image select processing unit 2604 measures the matching levels between the input monitor image and a plurality of background images, selects a background image with the highest matching level, and outputs it to the background differential processing unit 2605. The background differential processing unit 2605 executes comparison and determination processes between the selected background image and input monitor image, and outputs the result as shape data. At this time, the switch circuit 2606 is set on the side of contact B, and a set of image data and shape data are sent to the image encoding unit 2105. Since MPEG-4 visual encoding encodes only an extracted portion of image data, data can be greatly compressed at a higher ratio than in a case wherein the entire image frame is encoded.

The matching level detection method will be described below. The simplest method of checking the matching level is to calculate the sum of differences between images. Equation (3) below is an example of such method:

$$ki = \Sigma |Pc(x, y) - Pbi(x, y)| \tag{3}$$

for i=1, ..., N (N is the number of background images.) where $Pc(x, y)$ is the pixel value of the input monitor image, and $Pbi$ is the pixel value of the i-th background image. $ki$ is the sum total of difference absolute values between these pixels. An image with the smallest one of $k1$ to $kN$ is determined to be a detection background image.

Figure 21A:
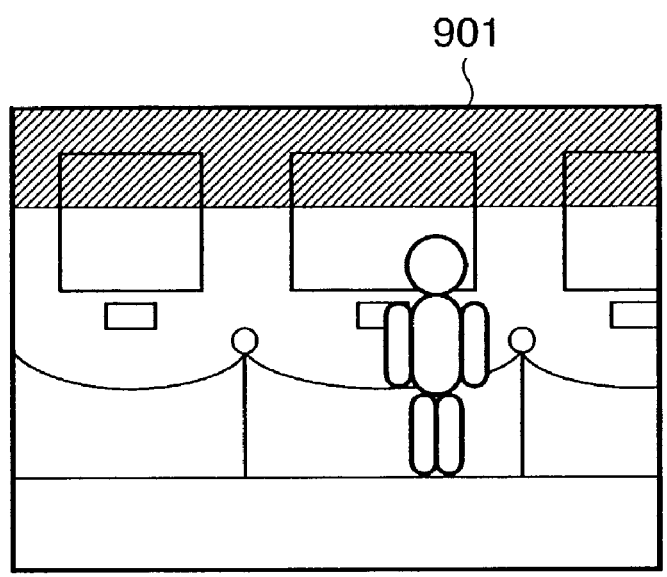
FIGS. 21A and 21B are views for explaining the background image select process in the sixth and seventh embodiments.

When all pixels undergo calculations, since an image includes pixels of an incoming object, the matching level between background portions does not become highest. In such case, a matching level may be detected using a portion of an image. When a region where no incoming object is displayed is known in advance, a matching level can be detected in that region. FIG. 21A shows this example, and since no object is displayed on a hatched region 901, this region is used to detect a matching level. When a region where no incoming object is displayed cannot be specified in advance, a plurality of small regions may be set, and a matching level can be obtained from the relationship among their matching levels.

Figure 21B:
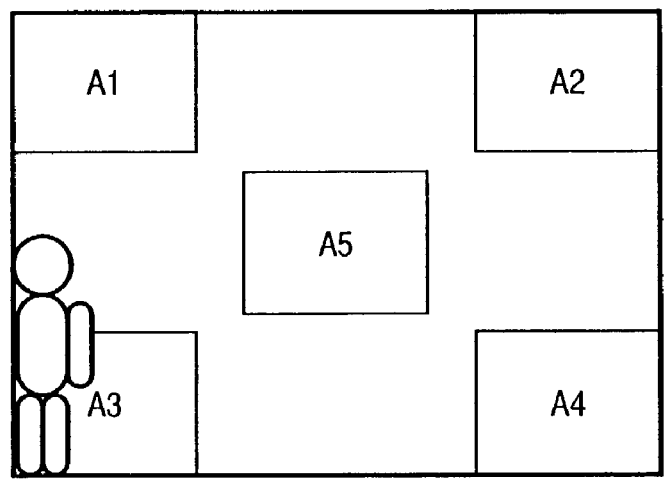

FIG. 21B shows an example wherein five small regions A1 to A5 are set on the display frame. When the matching levels of these five regions are calculated, regions A1, A2, A4, and A5 which include only pixels of the background portion assume nearly equal values, and only region A3 which includes pixels of an incoming object assumes a largely different value. Hence, when a matching level is determined using regions other than A3, simple (contributes to high-speed processes), high-precision matching level detection can be implemented.

As described above, according to the sixth embodiment, a plurality of background images are generated from one background image by filter processes, a background image with a highest matching level with the monitor image is selected from the plurality of background images, and a differential process is then executed. Hence, a high-precision detection process which is free from determination errors on the background portion and in which an incoming object is in focus can be done. Since the detected object is encoded using the high-precision detection process result, a high-efficiency monitoring system can be implemented.

<Seventh Embodiment>

The seventh embodiment will be described below. The fifth embodiment uses the focus lens position information in the background image generation process and background image select process, and the sixth embodiment implements generation and selection of a background image by image processes. However, in some cases, camera parameters may not be available upon selecting a background image, but camera control may be available upon generating a background image. In such case, a combination of the flow chart of FIG. 15 described in the fifth embodiment upon generating a background image, and the flow chart in FIG. 20A or 20B described in the sixth embodiment upon selecting a background image may be used.

As described above, according to the seventh embodiment, a plurality of background images are generated while changing the focal point position in the background image generation process, a background image with the highest matching level with the monitor image is selected from the plurality of background images in the background image select process, and a differential process is then executed. Hence, a high-precision detection process which is free from determination errors on the background portion and in which an incoming object is in focus can be done. Since the detected object is encoded using the high-precision detection process result, a high-efficiency monitoring system can be implemented.

As described above, according to the fifth to seventh embodiments, since a plurality of background images are generated in advance, a background image with the highest matching level with an input monitor image is selected from the plurality of background images, and a differential process is then executed, a high-precision image processing method and apparatus, which are free from determination errors on the background portion and can accurately adjust the focus on an incoming object, and a storage medium can be provided.

As described above, according to the fifth to seventh embodiments, the background can be identified with high precision while an object, which enters an image sensing range of image sensing means, is in focus.

<Eighth Embodiment>

The fifth to seventh embodiments are achieved to cope with any defocus of a camera, but the same problem is posed against brightness. In the eighth and subsequent embodiments, examples that can cope with a change in brightness will be explained. Of course, an invention that can cope with both focus and brightness may be achieved.

The eighth embodiment has as its object to provide an image processing apparatus and method, which can detect a clear image of an object to be detected, eliminate determination errors on the background portion, and can detect an incoming object with high precision while effectively utilizing an automatic exposure function of image sensing means, a computer program, and a computer readable storage medium.

Figure 25:
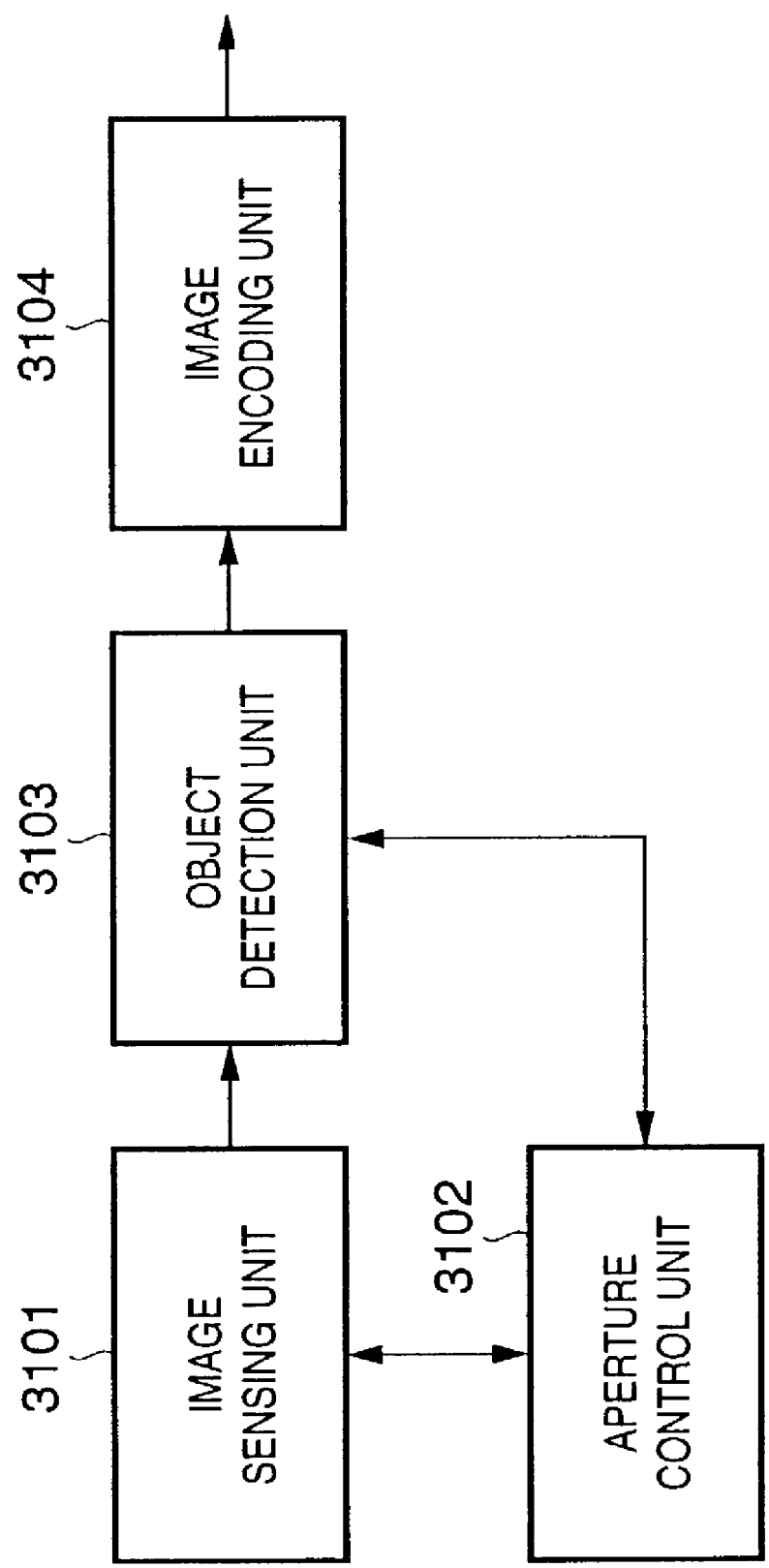
FIG. 25 is a block diagram showing the arrangement of an image processing apparatus in the eighth embodiment.

FIG. 25 is a block diagram showing the arrangement of an image processing apparatus according to the eighth embodiment of the present invention.

Referring to FIG. 25, an image sensing unit 3101 converts an optical image of an object into an electrical signal, and outputs it as a video signal of a predetermined format. An aperture control unit 3102 controls the aperture of the image sensing unit, and adjusts the brightness of an image to be sensed. A detailed explanation of the image sensing unit will be omitted since it is known to those who are skilled in the art. A video signal output from the image sensing unit is input to an object detection unit 3103. The object detection unit 3103 has functions of generation and selection of a background image, a differential process, and the like, and also a communication function with the aperture control unit 3102. The object detection unit 3103 outputs image data, and binary data as a detection result indicating whether or not an object is present. Details of the object detection unit 3103 will be explained later.

When these output data are encoded by an image encoding unit 3104, they can be communicated via a line with a narrow bandwidth, or can be recorded on a storage medium with a small capacity. As a method that can obtain high encoding efficiency as an encoding technique for a moving image, MPEG-4 visual encoding as the international standard is known.

The arrangement of the image encoding unit 3104 is the same as that in FIG. 22 explained in the fifth embodiment. The circuit shown in FIG. 22 receives two types of signals, i.e., an image signal including luminance and color difference components, and shape data (the binary data mentioned above) indicating the shape of an object to be encoded, and outputs a compressed bitstream. By combining the detection technique of the present invention and high-efficiency encoding technique, a monitor system that can assure high accuracy and high image quality can be realized.

Details of the process in the object detection unit 3103 will be explained below.

Figure 26:
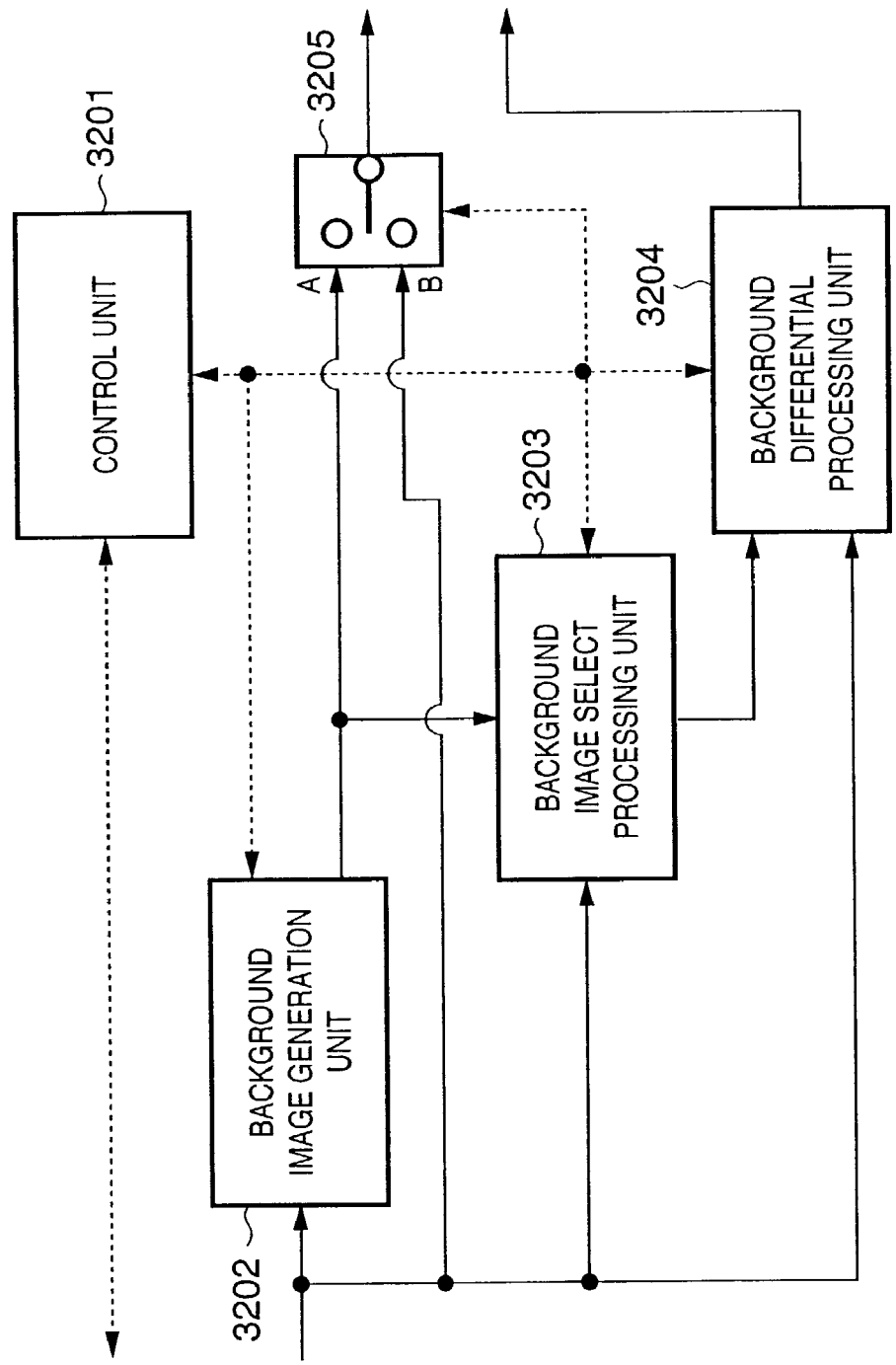
FIG. 26 is a block diagram of an object detection unit in the eighth embodiment.
Figure 27:
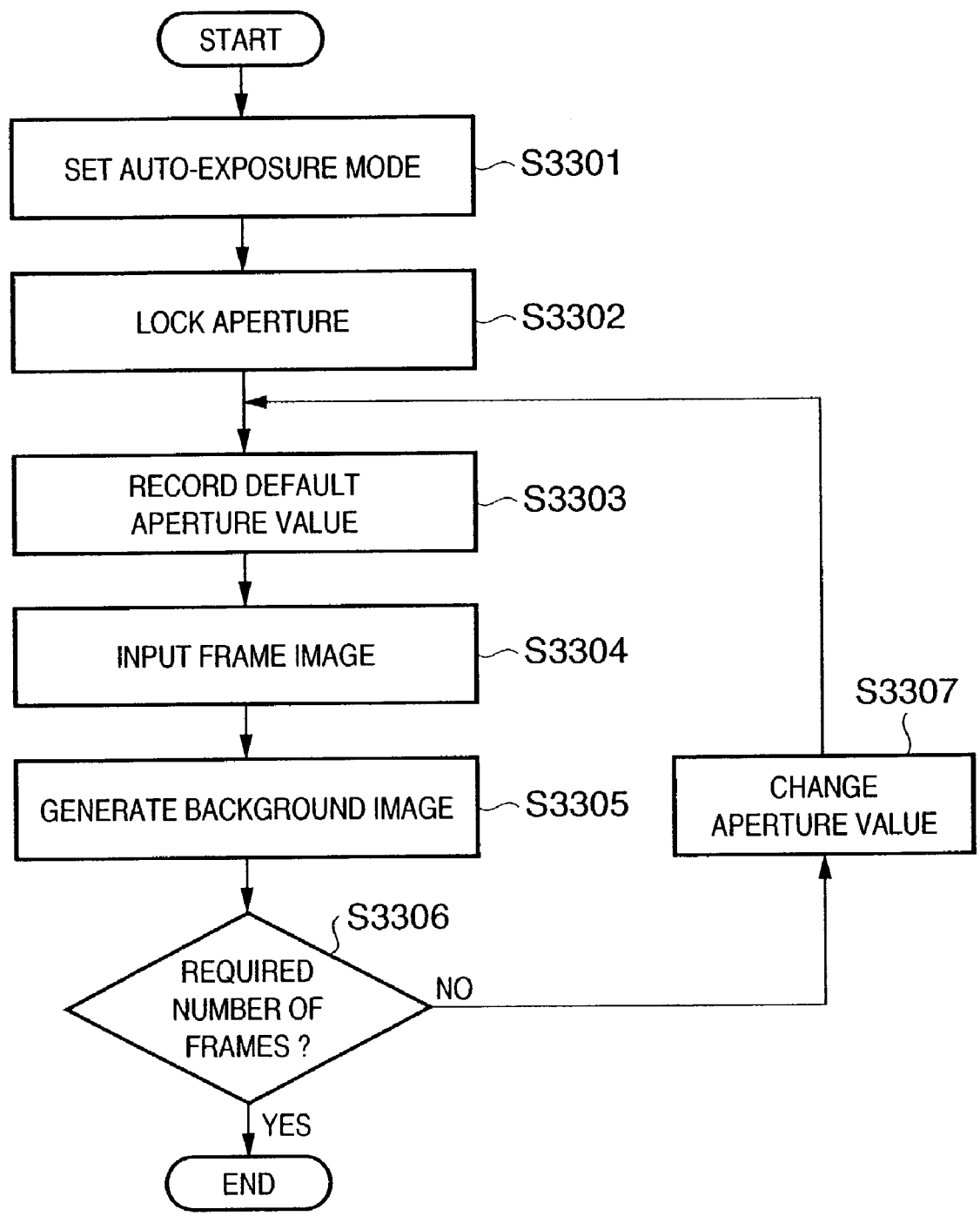
FIG. 27 is a flow chart of the background image generation process in the eighth embodiment.
Figure 29A:
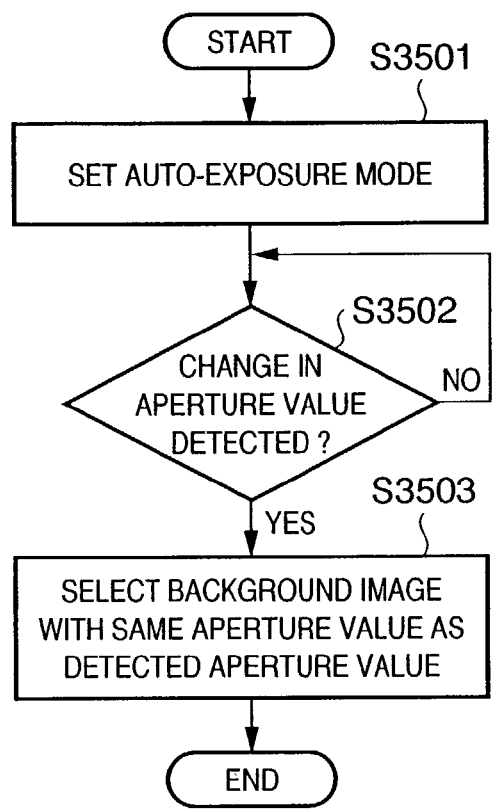
FIGS. 29A and 29B are flow charts of the background image select process in the eighth embodiment.
Figure 29B:
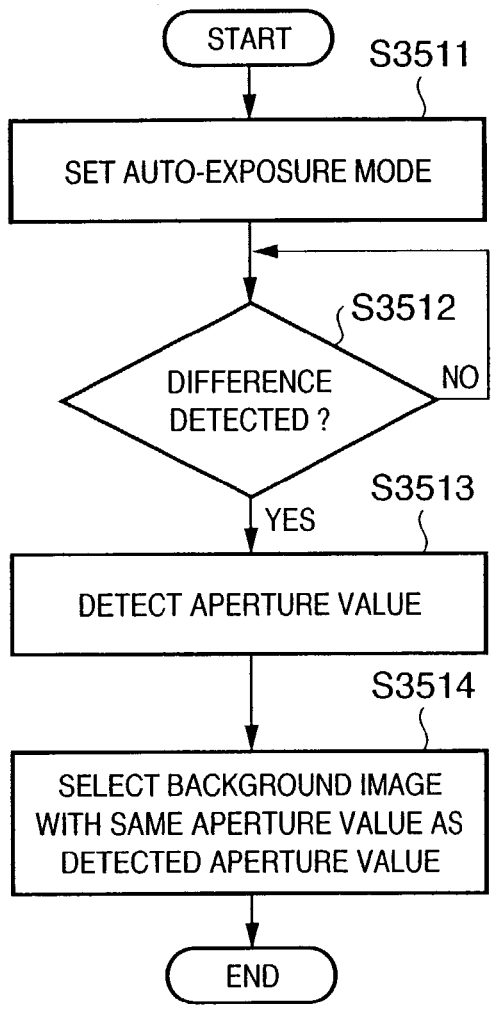

The eighth embodiment of the present invention will be described below using FIGS. 26 to 29B. FIG. 26 is a block diagram of the object detection process in the eighth embodiment, FIG. 27 is a flow chart of the background image generation process, FIGS. 28A to 28C show examples of generated background images, and FIGS. 29A and 29B are flow charts of the background image select method.

The background generation process will be explained first. In step S3301 in FIG. 27, exposure correction of the image sensing unit 3101 is set in an automatic mode to adjust the brightness of a background image input from the image sensing unit 3101. After the exposure correction, an aperture value at that time is locked (step S3302). The aperture control unit 3103 reads out that aperture value and records it on a memory or the like,(step S3303), and an image at that time is input (step S3304). In step S3305, a background image is generated for one frame from the input image. The input image at that time may be either only one frame or a frame generated by averaging a plurality of frames. In either case, data as a set of one aperture value and one background image is generated. Then, several data sets are prepared. For this purpose, a loop process is done in step S3306. If a required number of frames (background images) are not obtained yet, the locked aperture value is released, and the aperture value is locked after it is deliberately shifted. The flow returns to step S3303 to record the aperture value at that time, and a new background image is generated in steps S3304 and S3305. In this manner, the aperture values and background image data are recorded while slightly shifting the aperture value. After a required number of frames are obtained, a series of background image generation processes end.

FIGS. 28A to 28C show examples of background images generated by the aforementioned method. FIG. 28B shows an image which has optimal brightness to the background, FIG. 28A shows an image slightly brighter than FIG. 28B, and FIG. 28C shows an image slightly darker than FIG. 28B.

In the block diagram of FIG. 26, a control unit 3201 is a circuit for controlling respective blocks. Also, the control unit 3201 includes a communication function with the aperture control unit 3102, and exchanges commands that pertain to exposure. More specifically, automatic exposure ON and OFF commands, aperture value designation and acquisition commands, and the like are exchanged. An input signal is image data output from the image sensing unit 3101 and undergoes format conversion, a noise removal process, and the like as needed. Upon generating a background image, input data is input to a background image generation unit 3202. Also, the aperture value at that time is recorded together with image data via the control unit 3201. These data sets are stored in a background image select processing unit 3203. A memory, hard disk, and the like may be used as a storage medium. Upon recording a background image, the output operations of the background image select processing unit 3203 and a background differential processing unit 3204 are stopped in accordance with a signal from the control unit 3201. When a background image must be transmitted or recorded, a switch circuit 3205 on the output side is set at the side of contact A to output the image. Since an output image is image data for one frame, still image encoding such as JPEG may be used in place of MPEG-4 mentioned above. When only a detected object is to be recorded/transmitted, the need for sending the background image to the image encoding unit can be obviated.

A process for determining a background image to be selected upon detecting an object after these plurality of background images are prepared will be described below using the flow chart in FIG. 29A.

An auto-exposure mode is set in step S3501, and a change in aperture value is detected in step S3502. Before an object is detected, the aperture value remains optimized to the background, and no change in aperture value is detected. When an object has entered the monitor region, since an image that includes the object undergoes automatic exposure, a change in aperture value is detected. At this time, a background image having the same aperture value as the new aperture value detected is selected in step S3503. If a background image having the same aperture value is not found, a background image with the closest value is selected.

In this process, if an incoming object happens to have brightness that does not change the aperture value, the flow does not advance to step S3503, resulting an adverse consequence.

Another example that can solve such problem will be explained below using the flow chart in FIG. 29B.

The first step S3511 of setting the auto-exposure mode is the same as that in the above example. In step S3512, the difference is detected between the input image and background image. The background image used in this case is an image which is generated first and has an optimal exposure value. Therefore, nearly no difference value is generated before an object is detected. When an object has entered the monitoring region, since an image that includes the object undergoes automatic exposure, and the difference between that object and background is large, the sum total of difference values of a whole frame becomes large. At this time, an aperture value is detected in step S3513, and a background image having the same aperture value as that aperture value is selected in step S3514. If a background image having the same aperture value is not found, a background image with the closest value is selected. In this method, since a change in aperture value is detected by an image process, a communication time required to acquire the aperture value can be reduced, and the performance of the whole system can be improved.

Figure 34A:
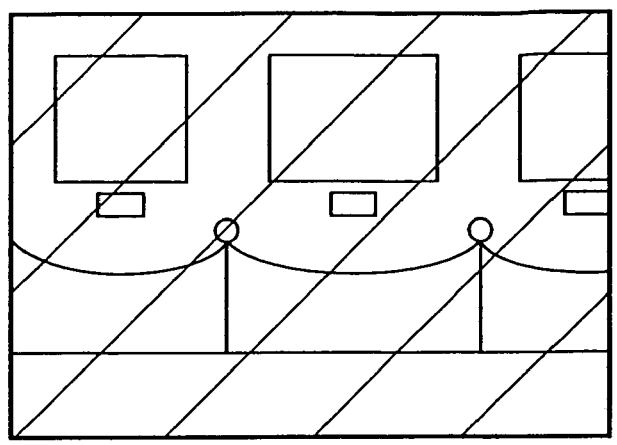
FIGS. 34A to 34C are views for explaining a problem in object detection based on a background differential process.
Figure 34B:
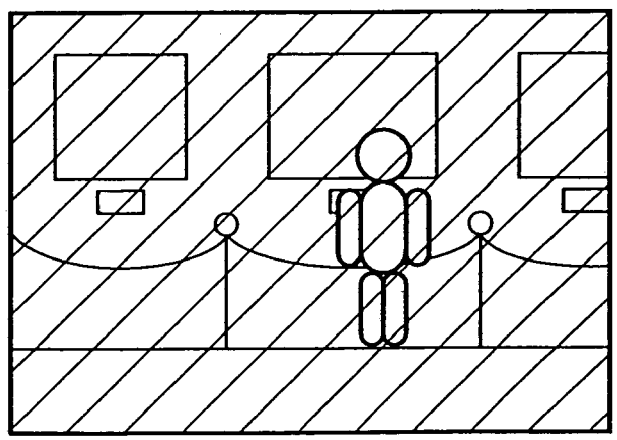
Figure 34C:
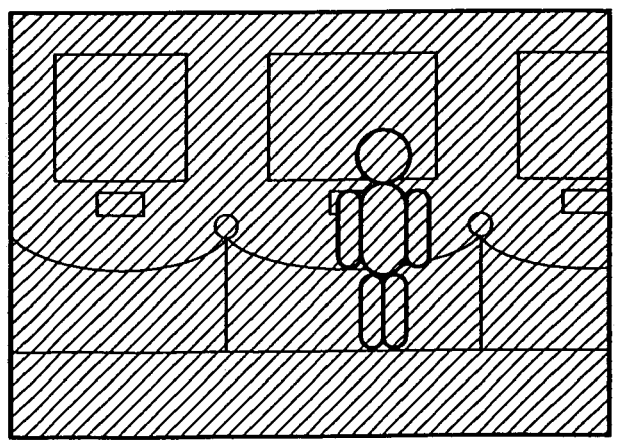

This process will be explained using examples of display images. Assume that the plurality of background images described using FIGS. 28A to 28C are prepared, and an image obtained when an object has entered is that shown in FIG. 34B. At this time, the image shown in FIG. 28A is selected as a background image, which is to undergo difference comparison, on the basis of the aperture value at that time. The comparison result between the pixel values of FIGS. 34B and 28A is the same as that between FIGS. 23A and 23B, as described above, and the result shown in FIG. 23C can be obtained.

The following explanation will be given using the block diagram of FIG. 26. Since the background image has already been generated, the output operation of the background image generation unit 3202 is stopped by the control unit 3201. The background image select processing unit 3203 obtains the aperture value via the control unit 3201. If a change in aperture value is detected, the unit 3203 selects a background image having the same aperture value as the detected aperture value, and outputs it to the background differential processing unit 3204. If no input image is used upon detecting a change in aperture value, the monitor image need not be input to the background image select processing unit 3203. This input is required when the process explained using the flow chart of FIG. 29B is done. The background differential processing unit 3204 executes comparison and determination processes between the selected new background image and input monitor image, and outputs the result as shape data. At this time, the switch circuit 3205 is set on the side of contact B, and a set of image data and shape data are sent to the image encoding unit 3104. Since MPEG-4 visual encoding encodes only an extracted portion of image data, data can be greatly compressed at a higher ratio than in a case wherein the entire image frame is encoded.

As described above, according to the eighth embodiment, since a background image having the same aperture value as that upon detecting an object is selected from a plurality of background images, and a differential process is executed, a high-precision detection process which is free from determination errors on the background portion and which can obtain an appropriate exposure value for an incoming object can be done. Since the detected object is encoded using the high-precision detection process result, a high-efficiency monitoring system can be implemented.

<Ninth Embodiment>

The ninth embodiment of the present invention will be described below. In the eighth embodiment, sets of aperture values and background image data are held. In the ninth embodiment, a case will be explained wherein the aperture value information cannot be obtained. Note that the overall arrangement of the image processing apparatus in the ninth embodiment is the same as that in FIG. 25.

The ninth embodiment will be described in detail below using FIGS. 28A to 28C and FIGS. 30 to 32B.

Figure 30:
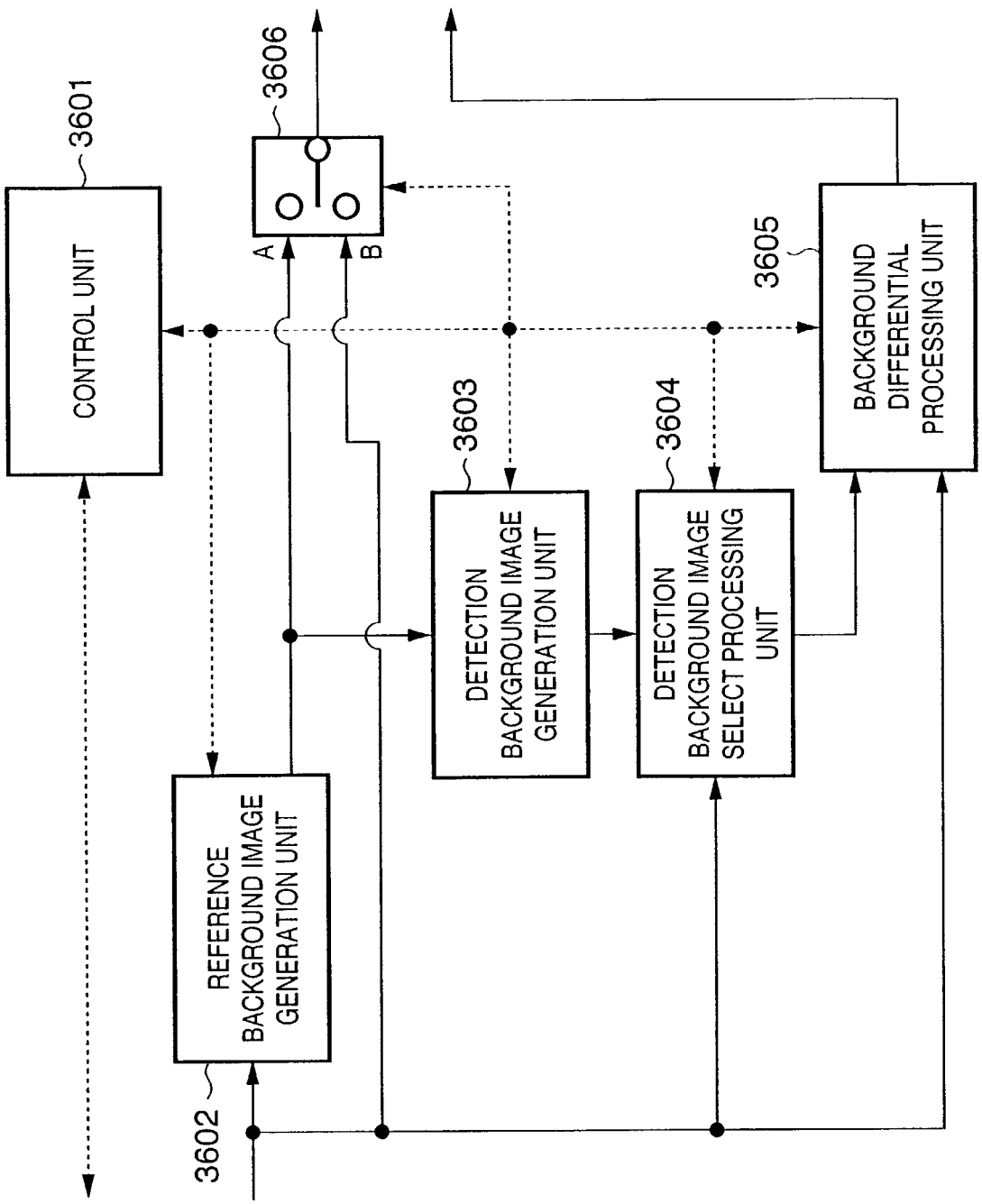
FIG. 30 is a block diagram of an object detection unit in the ninth embodiment.

FIG. 30 is a block diagram of the object detection process in the ninth embodiment, FIG. 31 is a flow chart of the background image generation process, and FIGS. 32A and 32B are flow charts of the background image select method.

The background generation process will be explained first. In step S3701 in FIG. 31, an automatic exposure correction mode is set to adjust the brightness of a background image input from the image sensing unit. After the exposure correction, the aperture value is locked (step S3702). In step S3703, a background image for one frame is generated based on the input image. The input image at that time may be only one frame or one frame generated by an average process of a plurality of frames. In this way, generation of the first background image is complete.

Step S3704 is the checking step of executing a loop process until a required number of frames (number of background images) are obtained. Second and subsequent background images are obtained by executing a luminance adjustment process for the image obtained in step S3702 described above in step S3705. If an RGB color space is used, the brightness is changed by increasing or decreasing three values at the same rate. If a YCbCr color space is used, the brightness is changed by increasing or decreasing only the Y value. After the background images for a required number of frames are generated in this way, the control leaves the loop in step S3704, thus ending a series of background image generation processes.

FIGS. 28A to 28C show examples of background images generated by the aforementioned method, as in the eighth embodiment. FIG. 28B shows an image which has optimal brightness to the background, FIG. 28A shows an image slightly brighter than FIG. 28B, and FIG. 28C shows an image slightly darker than FIG. 28B.

In the block diagram of FIG. 30, a control unit 3601 is a circuit for controlling respective blocks. Also, the control unit 3601 includes a communication function with the aperture control unit 3102, and exchanges commands that pertain to exposure. More specifically, automatic exposure ON and OFF commands, and the like are exchanged. Unlike in FIG. 26, aperture value setup and acquisition data and the like are not obtained. An input signal is image data output from the image sensing unit 3101 and undergoes format conversion, a noise removal process, and the like as needed. Upon generating a background image, input data is input to a reference background image generation unit 3602. The output from the reference background image generation unit 3602 is a background image for one frame, which has an optimal exposure value, and a detection background image generation unit 3603 generates a plurality of background images using this reference background image. The plurality of generated background images are stored in a detection background image select processing unit 3604. A memory, hard disk, or the like may be used as a storage medium. Upon generating a background image, the output operations of the detection background image select processing unit 3604 and a background differential processing unit 3605 are stopped in accordance with a signal from the control unit 3601. When a background image must be transmitted or recorded, a switch circuit 3606 on the output side is set at the side of contact A to output the image. Since the background image is image data for one frame, still image encoding such as JPEG may be used in place of MPEG-4 mentioned above. When only a detected object is to be recorded/transmitted, the need for sending the background image to the image encoding unit can be obviated.

A process for determining a background image to be selected upon detecting an object after these plurality of background images are prepared will be described below using the flow chart in FIG. 32A.

An auto-exposure mode is set in step S3801, and a difference is detected in step S3802. A background image used in this case is an image which is generated first, and has an optimal exposure value. Therefore, nearly no difference value is generated until an object is detected (an appropriate threshold value is set). When an object has entered the monitoring region, since an image that includes the object undergoes automatic exposure, a large difference value is detected. At this time, the background image and monitor image are compared to calculate a matching level in step S3803. A method of calculating the matching level uses, e.g., equation (3) explained in the sixth embodiment. In step S3805, the next background image is selected, and the flow returns to step S3803 to calculate the matching level with the input monitor image. It is checked by a loop process in step S3804 if matching levels with all the prepared background images have been calculated. Upon completion of calculation for all the background images, the flow advances to step S3806. In step S3806, a background image with the highest matching level is selected from all the background images for which the matching levels have been calculated. The selected background image is determined as an image for a differential process, thus ending a series of processes. In this method, since large difference values are generated on the entire first frame when an object has entered, a change in aperture value can be reliably detected even if aperture value information is not available.

Another method of selecting a background image will be explained below using the flow chart of FIG. 32B.

In step S3811, the aperture value optimal to the background is locked. In step S3812, the difference between the input image and background image is detected. Since the background image is an optimal exposure image, nearly no difference value is generated until an object is detected. When an object has entered the monitoring region, a large difference value is detected in a portion where the object is present (since exposure is locked in step S3811, the difference value purely depends on the region where the object is present). At this time, an auto-exposure mode is set in step S3813 to optimize the exposure value of the input monitor image. In step S3814, the background image and monitor image are compared to calculate a matching level. In step S3816, the next background image is selected, and the flow returns to step S3814 to calculate a matching level with the input monitor image. It is checked by a loop process in step S3815 if matching levels with all the prepared background images have been calculated. Upon completion of calculation for all the background images, the flow advances to step S3817. In step S3817, a background image with the highest matching level is selected from all the background images for which the matching levels have been calculated, thus ending a series of processes. In this method, since a background image has an optimal exposure value even in the first frame when the object has entered, high-precision shape data can be output.

Note that a large difference that can be detected in step S3812 means that an object is present near a pixel where that large difference is detected. In other words, a portion or region with a small difference has been detected at that time. Therefore, upon selecting a background image, only the region with a small difference may be taken into consideration, and a background image with the smallest difference may be selected, thus allowing more efficient selection.

This process will be explained using examples of display images. The following description is the same as that given in the eighth embodiment. Assume that the plurality of background images described using FIGS. 28A to 28C are prepared, and an image obtained when an object has entered is that shown in FIG. 34B. At this time, the image shown in FIG. 28A is selected as a background image, which is to undergo difference comparison, on the basis of the aperture value at that time. The comparison result between the pixel values of FIGS. 34B and 28A is the same as that between FIGS. 23A and 23B, as described above, and the result shown in FIG. 23C can be obtained.

The process explained so far will be described using the block diagram of FIG. 30. Since the background image has already been generated, the output operations of the reference background image generation unit 3602 and detection background image generation unit 3603 are stopped by the control unit 3601. The detection background image select processing unit 3604 measures the matching levels between the input monitor image and a plurality of background images, selects a background image with the highest matching level, and outputs it to the background differential processing unit 3605. The background differential processing unit 3605 executes comparison and determination processes between the selected background image and input monitor image, and outputs the result as shape data. At this time, the switch circuit 3606 is set on the side of contact B, and a set of image data and shape data are sent to the image encoding unit 3104. Since MPEG-4 visual encoding encodes only an extracted portion of image data, data can be greatly compressed at a higher ratio than in a case wherein the entire image frame is encoded.

Figure 33A:
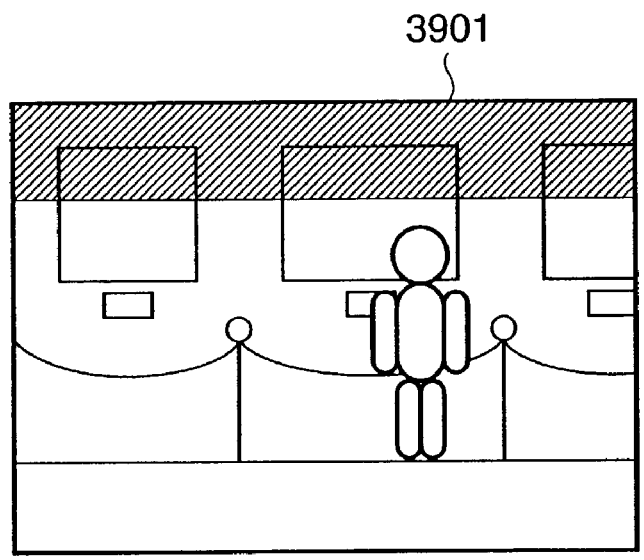
FIGS. 33A and 33B are views for explaining the background image select process in the ninth and 10th embodiments.
Figure 33B:
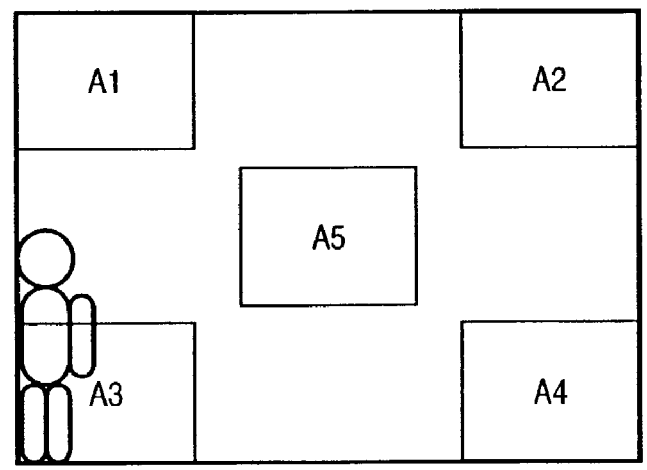

When all pixels undergo calculations, since an image includes pixels of an incoming object, the matching level between background portions does not become highest. In such case, a matching level may be detected using a portion of an image. When a region where no incoming object is displayed is known in advance, a matching level can be detected in that region. FIG. 33A shows this example, and since no object is displayed on a hatched region 3901 (relatively upper portion), this region is used to detect a matching level. When a region where no incoming object is displayed cannot be specified in advance, a plurality of small regions may be set, and a matching level can be obtained from the relationship among their matching levels. FIG. 33B shows an example wherein five small regions A1 to A5 are set on the display frame. When matching levels of these five regions are calculated, regions A1, A2, A4, and A5 which include only pixels of the background portion assume nearly equal values, and only region A3 which includes pixels of an incoming object assumes a largely different value. Hence, when a matching level is determined using regions other than A3, simple, high-precision matching level detection can be implemented.

As described above, according to the ninth embodiment, a plurality of background images are generated from one background image by luminance adjustment processes, a background image with a highest matching level with the monitor image is selected from the plurality of background images in the background image select process, and a differential process is then executed. Hence, a high-precision detection process which is free from determination errors on the background portion and can obtain an appropriate exposure value for an incoming object can be done. Since the detected object is encoded using the high-precision detection process result, a high-efficiency monitoring system can be implemented.

<10th Embodiment>

The 10th embodiment will be described below. The eighth embodiment uses the aperture value information in the background image generation process and background image select process, and the ninth embodiment implements generation and selection of a background image by image processes. However, in some cases, camera parameters may not be available upon selecting a background image, but camera control may be available upon generating a background image. In such case, a combination of the flow chart of FIG. 27 described in the eighth embodiment upon generating a background image, and the flow chart in FIG. 32A or 32B described in the ninth embodiment upon selecting a background image may be used.

As described above, according to the 10th embodiment, a plurality of background images are generated while changing the aperture value in the background image generation process, a background image with the highest matching level with the monitor image is selected from the plurality of background images in the background image select process, and a differential process is then executed. Hence, a high-precision detection process which is free from determination errors on the background portion and can obtain an appropriate exposure value for an incoming object can be done. Since the detected object is encoded using the high-precision detection process result, a high-efficiency monitoring system can be implemented.

[Description of 11th and 12th Embodiments]

In the above embodiments, a plurality of background images are prepared in advance, and a process is done using one of these images. An example wherein a background image is generated based on one background image and offset information will be explained as the 11th and 12th embodiments.

<11th Embodiment>

Figure 35:
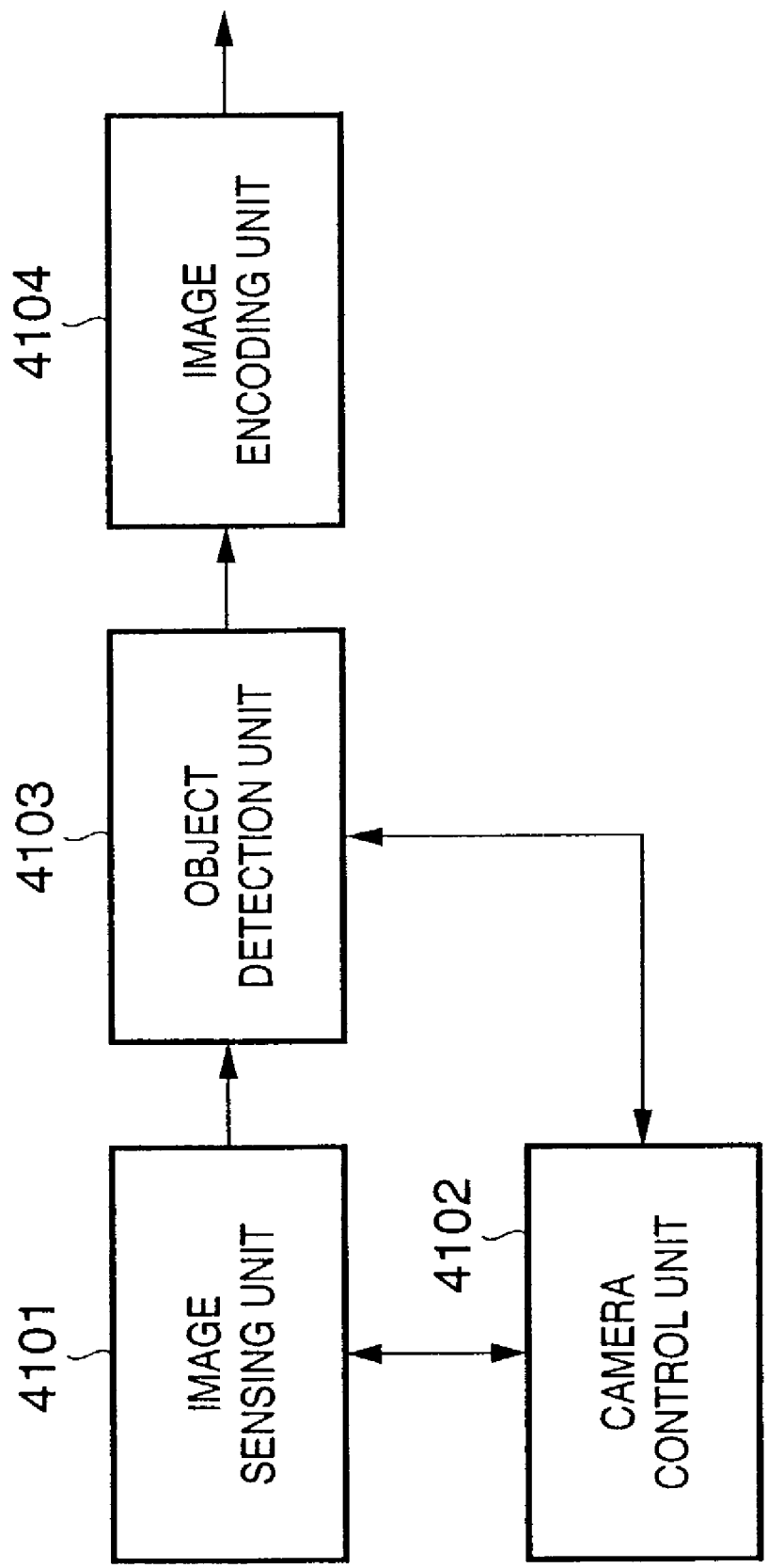
FIG. 35 is a block diagram showing the arrangement of an image processing apparatus in the 11th embodiment.

FIG. 35 is a block diagram showing the arrangement of an image processing apparatus according to the 11th embodiment. An image sensing unit 4101 converts an optical image of an object into an electrical signal, and outputs it as a video signal of a predetermined format. A camera control unit 4102 controls camera characteristics such as zoom, pan, tilt, focus, exposure, white balance, and the like. A detailed description of individual functions will be omitted since they are known to those who are skilled in the art. A video signal output from the image sensing unit 4101 is input to an object detection unit 4103. The object detection unit 4103 has functions of generation and selection of a background image, a differential process, and the like, and also a communication function with the camera control unit 4102. In this embodiment, information that pertains to an aperture value used to control exposure in the camera control is exchanged. The object detection unit 4103 outputs image data, and binary detection result data. Details of the object detection unit 4103 will be described later. When these output data are encoded by an image encoding unit 4104, they can be communicated via a line with a narrow bandwidth, or can be recorded on a storage medium with a small capacity. As a method that can obtain high encoding efficiency as an encoding technique for a moving image, MPEG-4 visual encoding as the international standard is known (see FIG. 22).

Figure 36:
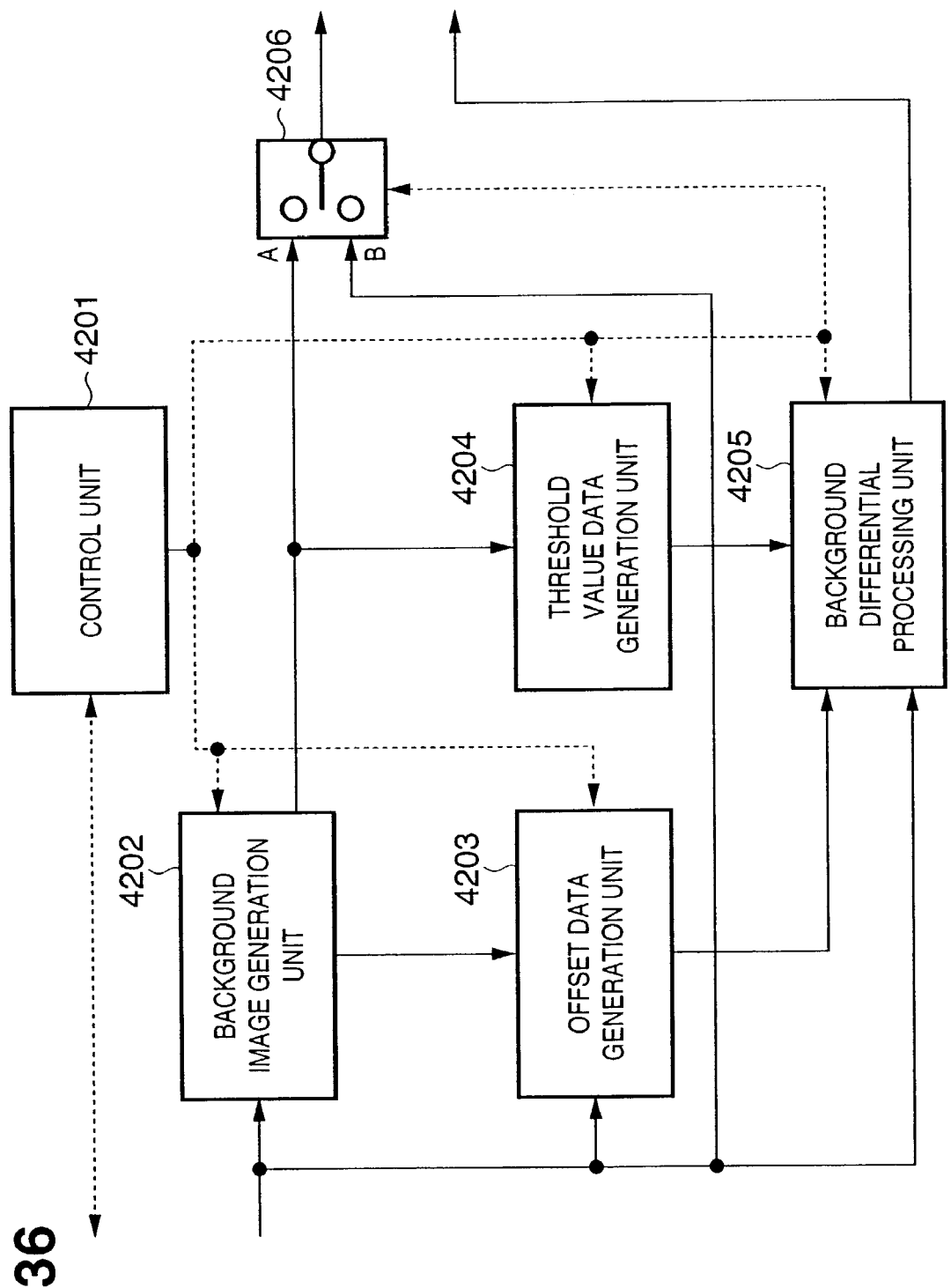
FIG. 36 is a block diagram showing the arrangement of an object detection unit in the 11th embodiment.

FIG. 36 is a detailed block diagram of the object detection unit 4103.

The flow of signal processes upon generation of a background image will be explained first. A control unit 4201 is a circuit for controlling respective blocks. Also, the control unit 4201 includes a communication function with an aperture control unit included in the camera control unit 4102, and exchanges commands that pertain to exposure. More specifically, automatic exposure ON and OFF commands, aperture value setup and acquisition commands, and the like are exchanged. An input signal is image data output from the image sensing unit and undergoes format conversion, a noise removal process, and the like as needed. Upon generating a background image, input data is input to a background image generation unit 4202. The generated background image is stored in an offset data generation unit 4203. At this time, the aperture value information acquired via the control unit 4201 is stored together. A memory, hard disk, or the like maybe used as a storage medium. Simultaneously with generation of a background image, a threshold value data generation unit 4204 generates threshold value data, and inputs the result to a background differential processing unit 4205. Upon generating a background image, the output operations of the offset data generation unit 4203 and background differential processing unit 4205 are stopped by a signal from the control unit 4201.

When a background image must be transmitted or recorded, a switch circuit 4206 on the output side is set at the side of contact A to output the image. Since the background image is image data for one frame, still image encoding such as JPEG may be used in place of MPEG-4 mentioned above. When only a detected object is to be recorded/transmitted, the need for sending the background image to the image encoding unit can be obviated.

Figure 37:
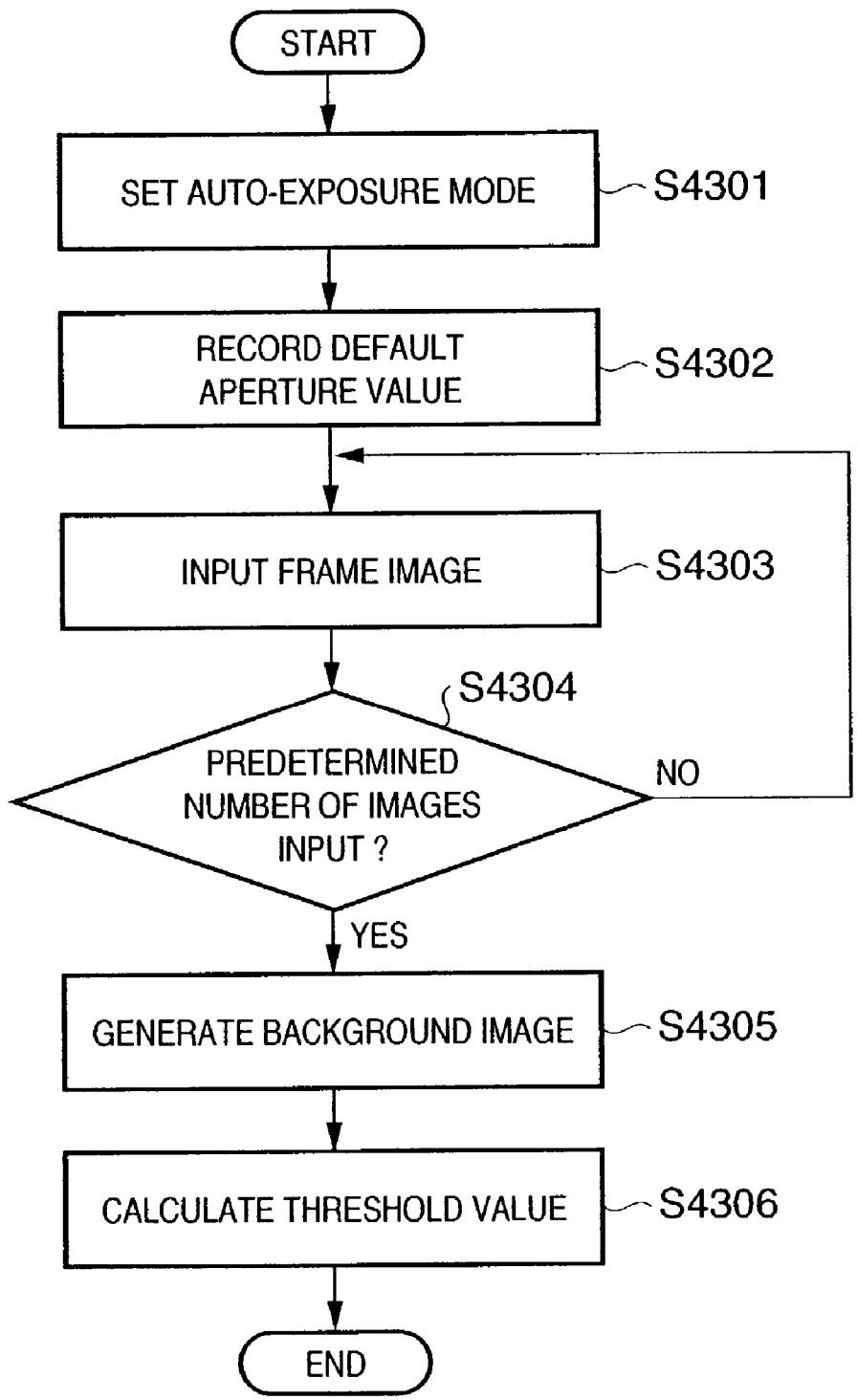
FIG. 37 is a flow chart showing the background image generation processing sequence in the 11th embodiment.

The background image generation sequence will be explained below using the flow chart of FIG. 37.

In step S4301, an auto-exposure mode is set to automatically adjust the exposure value of a background image input from the image sensing unit 4101. In step S4302, the aperture value at that time is stored in a memory or the like.

An image for one frame is input in step S4303, and this input step is repeated until it is determined in step S4304 that a predetermined number of images (the number of images required to generate a background image) are obtained.

After a required number of images are input, a background image which contains nearly no noise is generated in step S4305. More specifically, the average values of the input images at respective pixel positions are calculated to determine the pixel values at those pixel positions.

In step S4306, a threshold value is calculated. In equation (1) presented previously, the threshold value Th used to determine if the pixel of interest in one frame is that in a moving object is fixed for all pixels. However, in this embodiment, a threshold value is set at each pixel position. This is to consider generation of noise, as described above.

In this embodiment, each threshold value is determined as follows.

Let n be the number of images required to generate a background image, and P(x, y, i) be the pixel value at a pixel position (x, y) in the i-th frame. Then, a threshold value Th(x, y) at that pixel position (x, y) is calculated by:

$$Th(x, y) = MAX\{P(x, y, 1), P(x, y, 2), \ldots, P(x, y, n)\} - MIN\{P(x, y, 1), P(x, y, 2), \ldots, P(x, y, n)\} \quad (4)$$

where MAX( . . . ) is a function that returns a maximum value, and MIN( . . . ) is a function that returns a minimum value (these functions may be implemented by hardware using comparators, latches, and the like).

That is, equation (4) calculates or detects the fluctuation width of a given pixel with respect to the time axis. This calculation or detection process is executed for all pixels.

The control unit 4201 stores background image data calculated in this manner in the background image generation unit 4202, and stores the threshold values Th(x, y) in the threshold value data generation unit 4204.

The flow of signal processes upon execution of monitoring after the background image is prepared in practice is as follows.

When the control unit 4201 outputs a monitor operation signal, write access to the background image generation unit 4202 and threshold value data generation unit 4204 are disabled (their contents are held). input data is an image to be monitored, and is supplied to the offset data generation unit 4203 and background differential processing unit 4205. The offset data generation unit 4203 calculates offset data (difference) on the basis of a pixel (one or a plurality of pixels at positions where no object appears) at a predetermined position of the background image (image from the background image generation unit 4202), which is generated previously, and a pixel of the input monitor image at the same position, and adds that difference to each pixel of image data output from the background image generation unit 4202, thus generating a new background image. The unit 4203 outputs the new background image to the background differential processing unit 4205.

The background differential processing unit 4205 compares pixels of the input monitor image and offset background image, and the threshold values output from the threshold value data generation unit 4204 in synchronism with these pixels, and outputs comparison results as binary shape data. Upon execution of monitoring, the switch circuit 4206 is set at the side of contact B to output a set of image data and shape data to the image encoding unit 4104.

Figure 39:
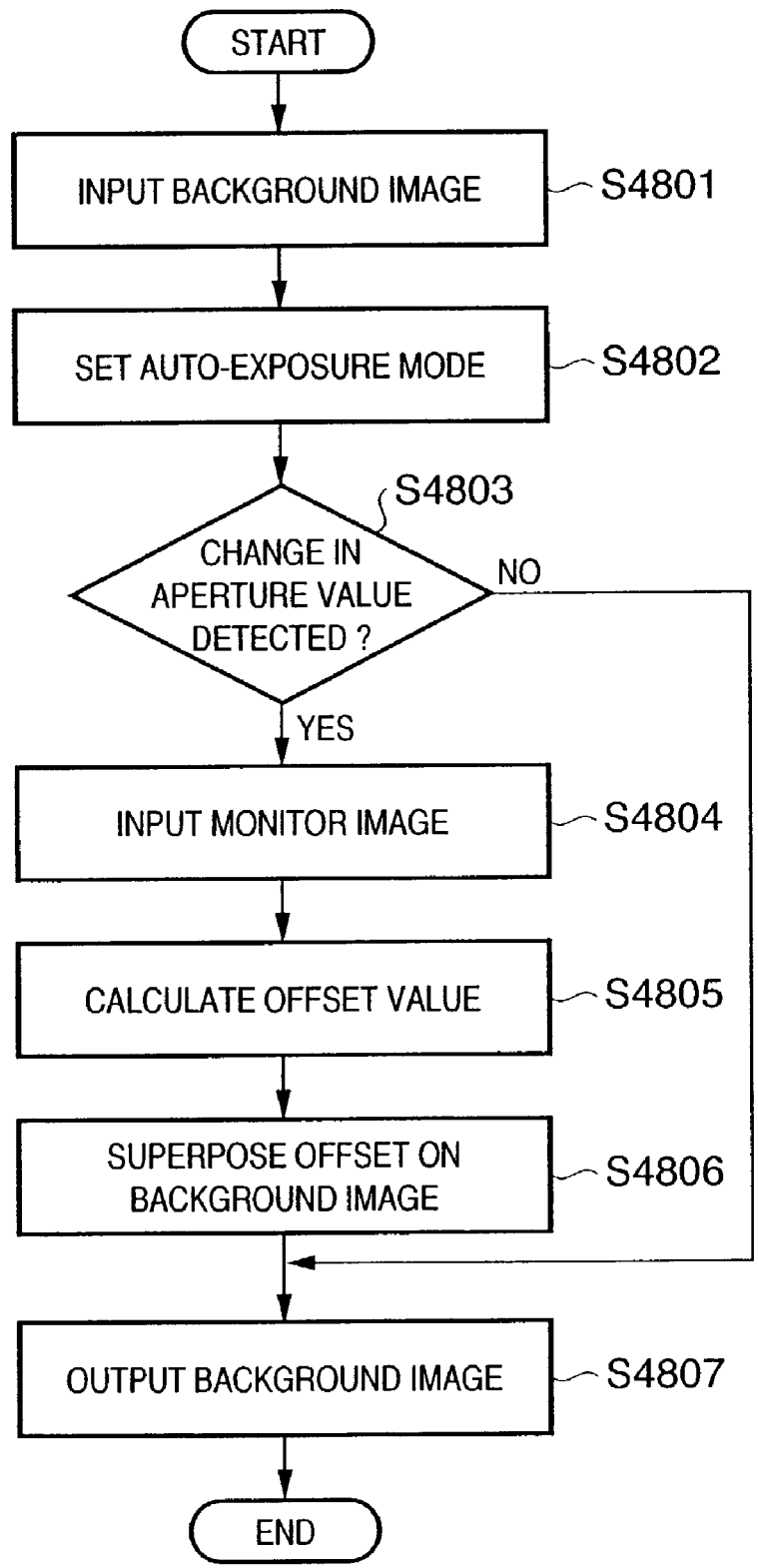
FIG. 39 is a flow chart showing the offset adding processing sequence in the 11th embodiment.

The offset data generation process will be described in detail below using the flow chart of FIG. 39.

In step S4801, a background image is input. At this time, an auto-exposure mode is set in step S4802. A change in aperture value is detected in step S4803. If the aperture value remains the same, the background image is output (step S4807), thus ending the process.

On the other hand, if a change in aperture value is detected, the flow advances to step S4804 to input a monitor image. In step S4805, an offset (difference) between the pixel value of the input image at a predetermined position, and the registered background image is calculated. In order to improve the reliability of the offset value to be calculated, differences between a plurality of pairs of pixels are calculated, and their average value is preferably used as a final difference value.

More specifically, the following process is done. Let Pc(x, y) be the luminance value of the input monitor image, and Pb(x, y) be the luminance value of the background image. Then, a simple difference value D(x, y) is given by:

$$D(x, y) = Pc(x, y) - Pb(x, y) \quad (5)$$

Therefore, an average value Davg of such differences is given by:

$$Davg = \Sigma D(x, y)/M \quad (6)$$

This Davg is used as an offset value to be obtained. Note that position (x, y) must fall within a region where an object never enters. That is, M indicates the number of pixels in that region.

After the difference value (Davg above) is calculated, that difference value is added (superposed) to respective pixels of image data output from the background image generation unit 4202, thus generating a new background image.

A luminance value Pbnew(x, y) of the new background image at a pixel position (x, y) is given by:

$$Pbnew(x, y) = Pb(x, y) + Davg \quad (7)$$

In step S4807, the sum Pbnew is output to the background differential processing unit 4205.

Figure 38A:
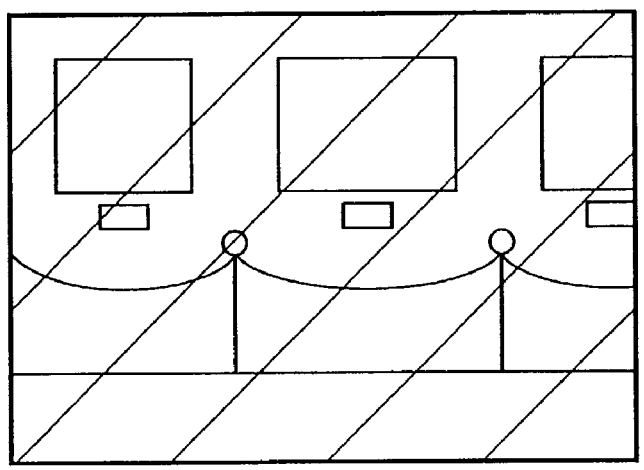
FIGS. 38A and 38B are views showing a background image in the 11th embodiment and that obtained by an offset adding process.
Figure 38B:
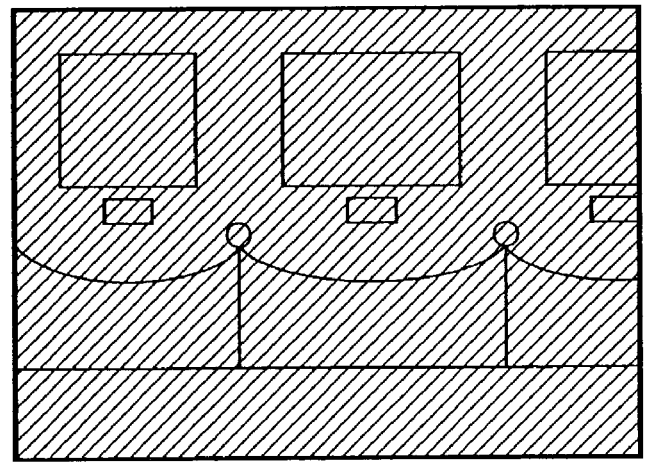
Figure 45A:
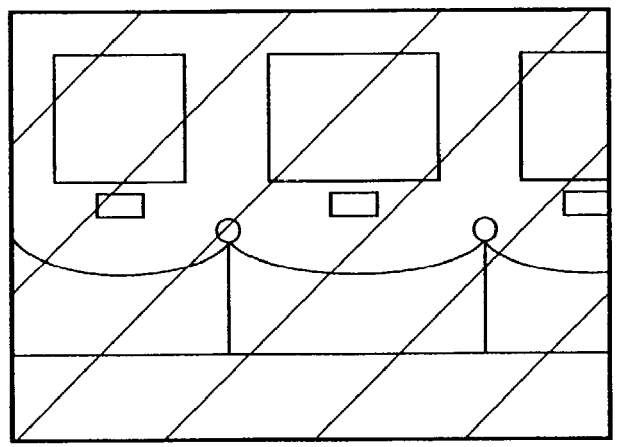
FIGS. 45A to 45C show an example of images obtained due to a change in exposure in object detection based on a background differential process.
Figure 45B:
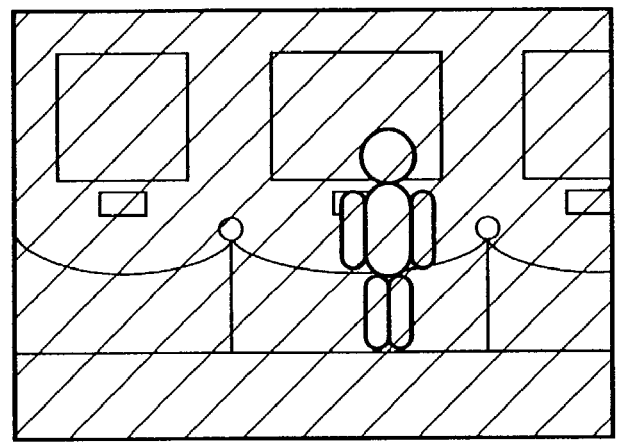
Figure 45C:
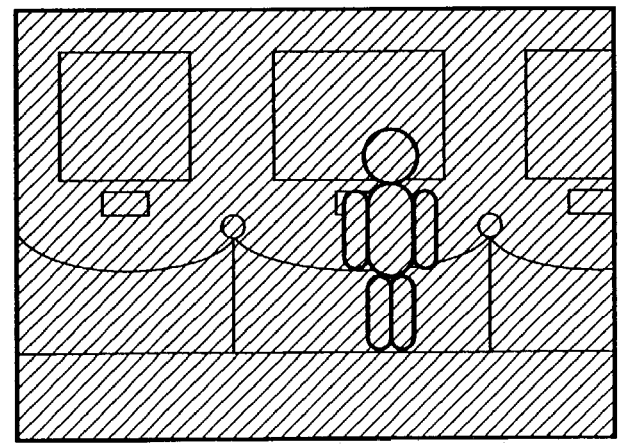

Note that the offset value Davg may assume either a positive or negative value. If the value is positive, a new background image becomes brighter; if it is negative, a new background image becomes darker. Therefore, if an image upon detecting an incoming object is as shown in FIG. 45B, a positive offset value is superposed on a background image in FIG. 45A, and an image shown in FIG. 38A is output as a new background image. On the other hand, if an image upon detecting an incoming object is as shown in FIG. 45C, a negative offset value is superposed on a background image in FIG. 45A, and an image shown in FIG. 38B is output as a new background image.

When the offset value is calculated using all pixels, since the image to be processed includes pixels of an incoming object, the value cannot often be accurately calculated. In such case, a region where no incoming object enters, e.g., an upper region of an image shown in FIG. 33A, is used.

Or a histogram of difference values maybe calculated. Upon calculating differences between background portions, the difference values may fall within a given distribution, and upon calculating the differences between the background and object, the difference values may assume large values. Hence, only difference values of a probable background portion are averaged by a binarization process on the basis of the histogram distribution.

As has been explained in the above embodiments, five small regions A1 to A5 shown in, e.g., FIG. 33B, are set, and variances are calculated for the difference values of the respective regions. When each small region does not include any incoming object, the variance becomes small. In the example in FIG. 33B, the variance of only region A3 becomes large, and those of other small regions A1, A2, A4, and A5 become small. When an offset value is determined using the difference values of only the regions with the small variances, the offset value that suffers less errors can be obtained. To simplify the process, the sum total of difference values may be used in place of the variance.

Figure 40:
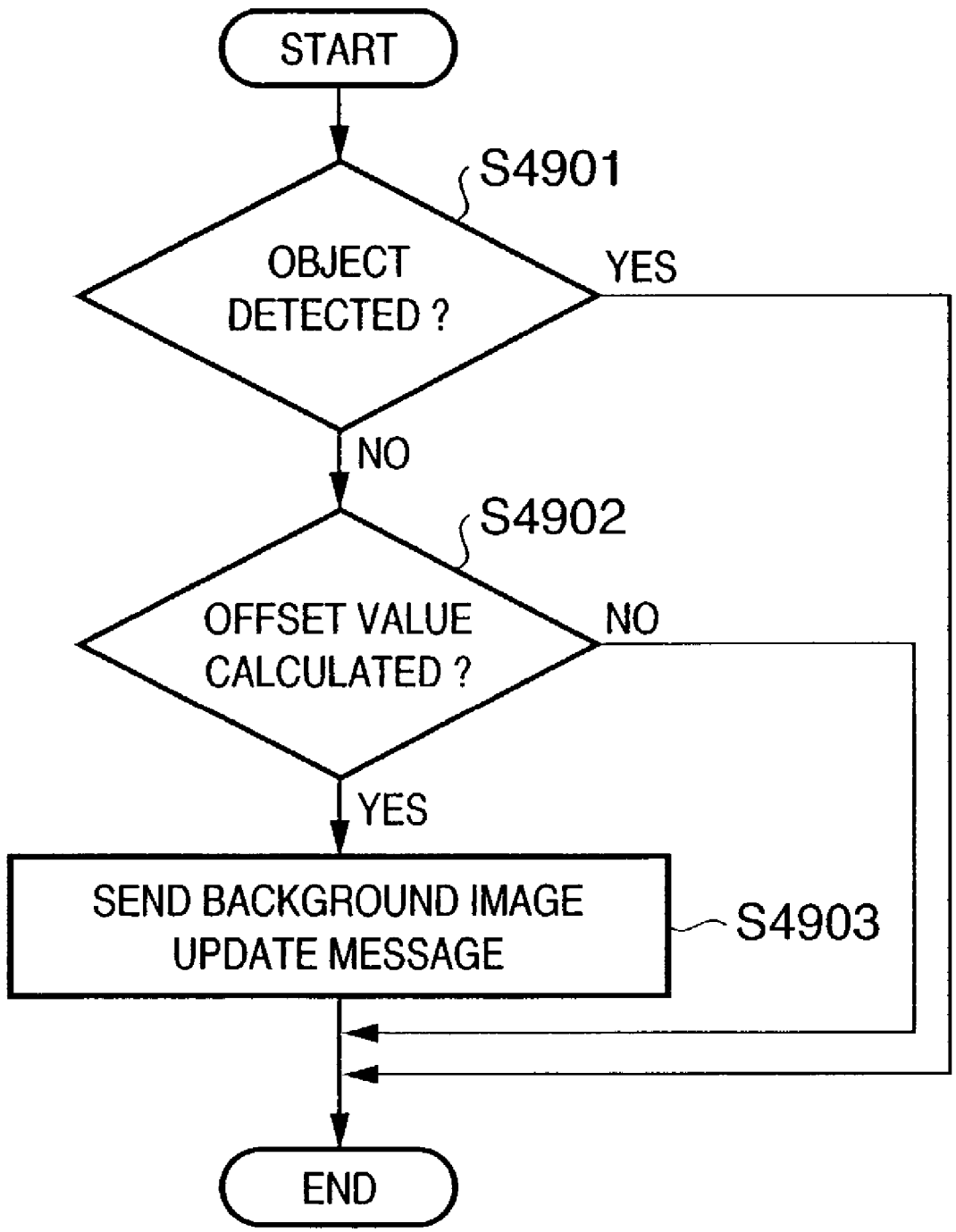
FIG. 40 is a flow chart showing the background image update processing sequence.

The notification sequence of update of a background image will be explained below using the flow chart of FIG. 40. This process is done upon execution of the background differential process. It is checked in step S4901 if an object is detected as a result of the background differential process. If no object is detected, it is checked if the offset value is superposed on the background image at that time (step S4902). If the offset value is to be superposed although no object is detected, since it is determined that the illumination condition has changed, it is preferable to generate a background image under the new illumination condition. In step S4903, a background image update message is sent to the control unit 4201. Upon receiving the background image update message, the control unit 4201 sets the system in the state of the aforementioned background image generation process, and starts the background image generation process. As described above, according to the 11th embodiment, the offset value to be superposed on the background image is set by detecting a change in exposure from the aperture value of the camera, and determination errors in a background portion in the differential process can be reduced. Also, whether a change in background image takes place due to a change in illumination condition or an incoming object is identified, and an accurate background image can always be prepared. Hence, a high-precision detection process that can set an appropriate exposure value for an incoming object can be implemented. Also, since the detected object is encoded using the high-precision detection process result, a high-efficiency monitoring system can be implemented.

<12th Embodiment>

The 12th embodiment will be described below using FIGS. 38A and 38B, and FIGS. 41 to 44. In the 11th embodiment, a change in exposure is detected from the aperture value information of the camera. In the 12th embodiment, a case will be exemplified below wherein no aperture value information is available.

Figure 41:
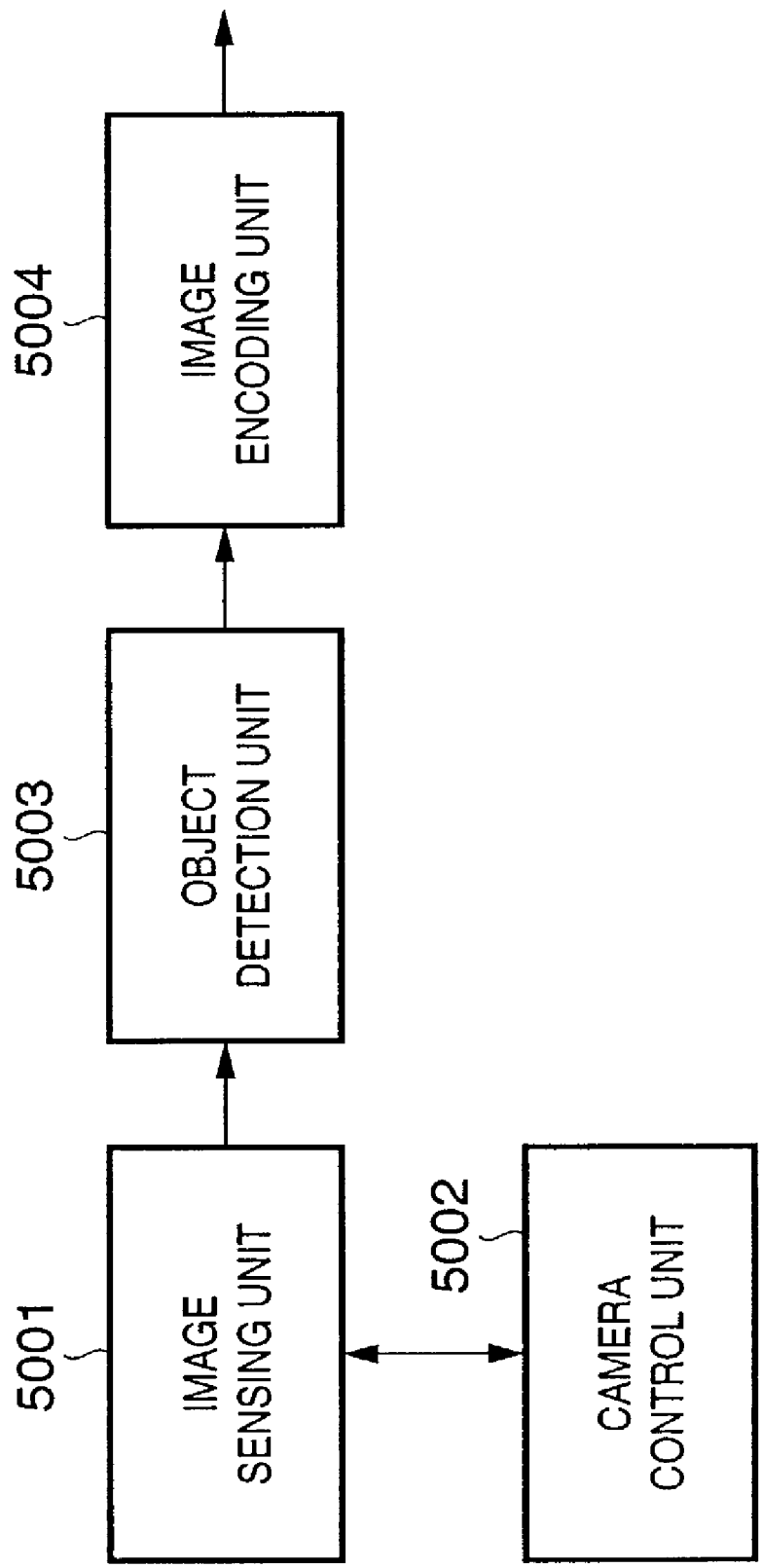
FIG. 41 is a block diagram showing the arrangement of an image processing apparatus in the 12th embodiment.

FIG. 41 is a block diagram showing the arrangement of an image processing apparatus of this embodiment. The difference from the block diagram of FIG. 35 explained in the 11th embodiment is that an object detection unit 5003 has no interface with a camera control unit 5002.

Figure 42:
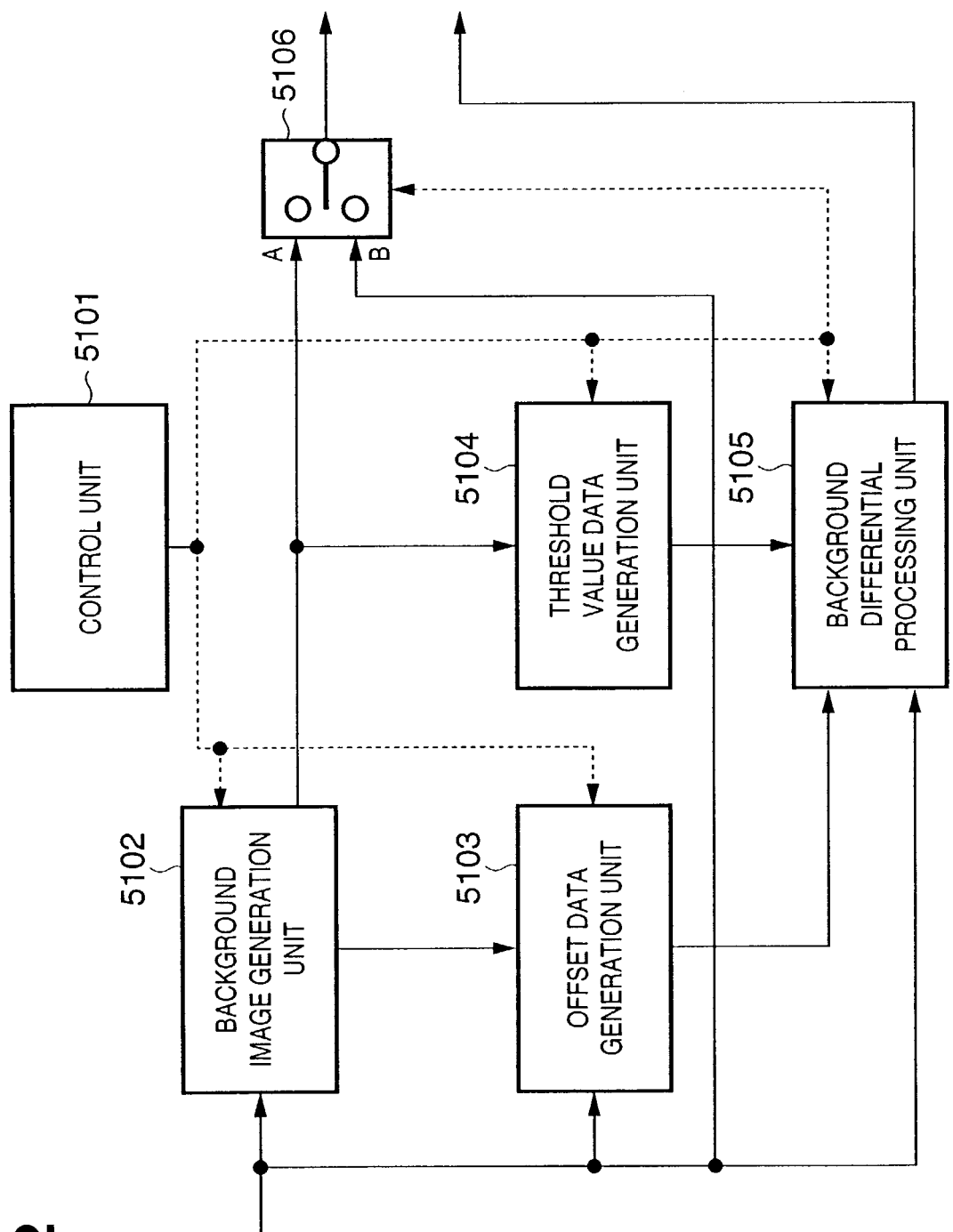
FIG. 42 is a block diagram showing the arrangement of an object detection unit in the 12th embodiment.

FIG. 42 is a detailed block diagram of the object detection unit 5003. The difference from the block diagram of FIG. 36 is that a control unit 5101 has no communication function with the camera control unit 5002.

The flow of signal processes upon generating a background image will be explained first. The control unit 5101 controls respective blocks. An input signal is image data output from the image sensing unit and undergoes format conversion, a noise removal process, and the like as needed.

In the background image generation process, input data is input to a background image generation unit 5102. The generated background image is stored in an offset data generation unit 5103. A memory, hard disk, or the like may be used as a storage medium. Simultaneously with generation of a background image, a threshold value data generation unit 5104 generates threshold value data, and inputs the result to a background differential processing unit 5105. In the background image generation process, the output operations of the offset data generation unit 5103 and background differential processing unit 5105 are stopped by a signal from the control unit 5101. When a background image must be transmitted or recorded, a switch circuit 5106 on the output side is set at the side of contact A to output the image. Since the background image is image data for one frame, still image encoding such as JPEG may be used in place of MPEG-4 mentioned above. When only a detected object is to be recorded/transmitted, the need for sending the background image to the image encoding unit can be obviated.

Figure 43:
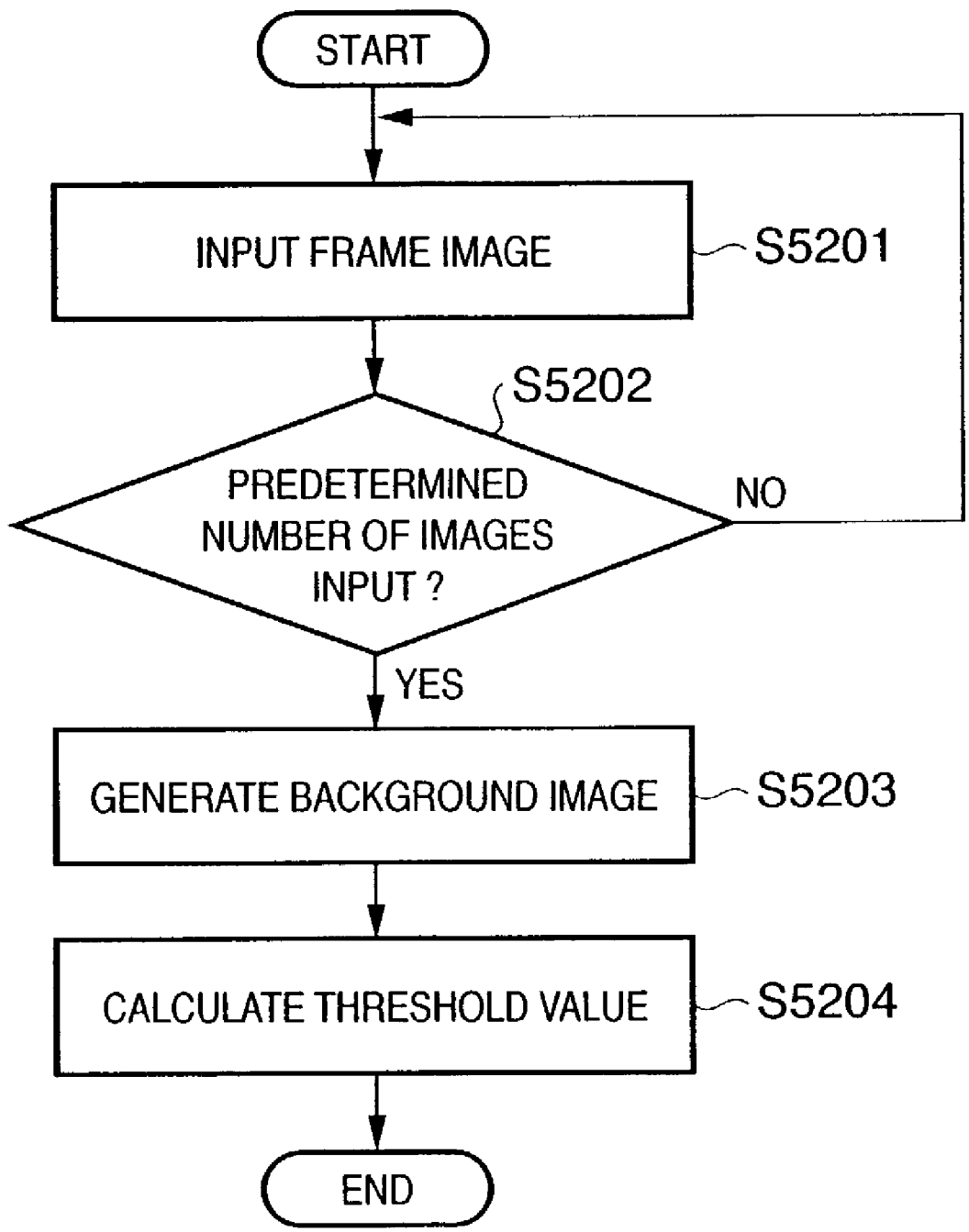
FIG. 43 is a flow chart showing the background image generation processing sequence in the 12th embodiment.

The background image generation sequence is as shown in the flow chart of FIG. 43. In this flow chart, the steps pertaining to camera control are omitted from the flow chart of FIG. 37 described in the 11th embodiment. Since the steps pertaining to the image process are the same as FIG. 37, a description thereof will be omitted.

The flow of signal processes upon execution of monitoring after the background image is prepared in practice will be described below using the block diagram of FIG. 42.

When the control unit 5101 outputs a monitor operation signal, write access to the background image generation unit 5102 and threshold value data generation unit 5104 are disabled. Input data is an image to be monitored, and is supplied to the offset data generation unit 5103 and background differential processing unit 5105. The offset data generation unit 5103 generates offset data based on the background image, which is generated previously, and the input monitor image as in the 11th embodiment, and superposes the offset data on the background image, thus generating a new background image. The unit 5103 outputs the new background image to the background differential processing unit 5105. The background differential processing unit 5105 compares the input monitor image and offset background image using threshold values output from the threshold value data generation unit 5104, and outputs comparison results as binary shape data. Upon execution of monitoring, the switch circuit 5106 is set at the side of contact B to output a set of image data and shape data to an image encoding unit 5004.

Figure 44:
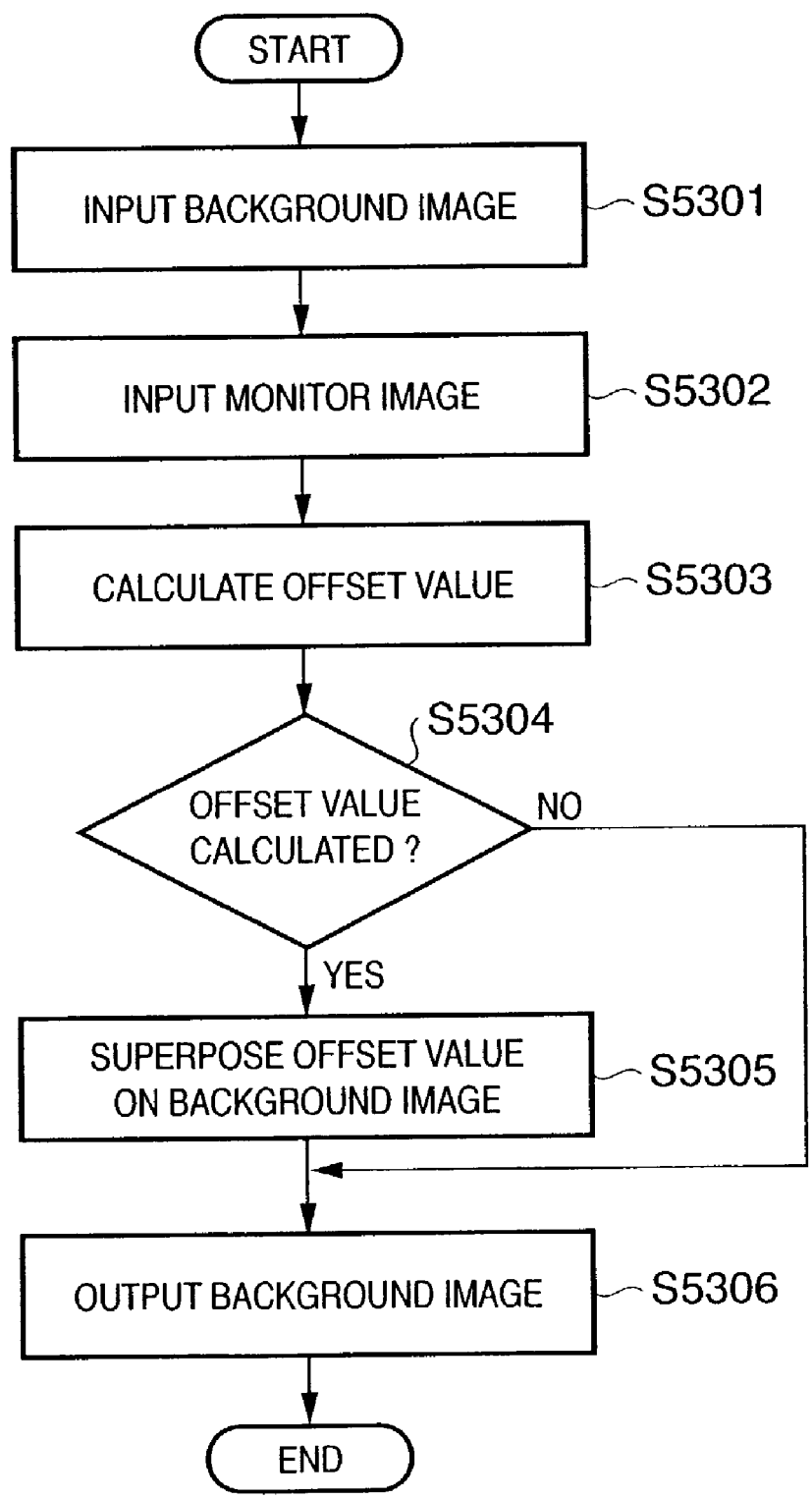
FIG. 44 is a flow chart showing the background image update processing sequence in the 12th embodiment.

The offset data generation process will be described in detail below using the flow chart of FIG. 44.

In step S5301, a background image is input. A monitor image is then input in step S5302. Unlike in the flow chart of FIG. 39 described in the 11th embodiment, the monitor image is input for each process. After the monitor image is input, an offset value between the monitor image and background image is calculated (step S5303). If no offset value is obtained, the control skips step S5305, and the input background image is output directly or with an offset value=0 in step S5306. If the offset value is obtained, the offset value is superposed on the background image in step S5305, and that image is output as a new background image in step S5306. In this embodiment, a change in exposure is detected based on the presence/absence of an offset value. The offset value generation method and background image update notification sequence are the same as those in the 11th embodiment.

As described above, according to the 12th embodiment, since a change in exposure is detected by the image process, the offset value to be superposed on the background image is set, and determination errors in the background portion in the differential process can be reduced. Also, whether a change in background image takes place due to a change in illumination condition or an incoming object is identified, and an accurate background image can always be prepared. Hence, a high-precision detection process that can set an appropriate exposure value for an incoming object can be implemented. Also, since the detected object is encoded using the high-precision detection process result, a high-efficiency monitoring system can be implemented.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like). Also, techniques described in the respective embodiments may be combined.

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code. As the storage medium for storing the program code, for example, a floppy disk, hard disk, ROM, RAM, magnetic tape, nonvolatile memory card, optical disk (CD-ROM, CD-R, DVD), magneto-optical disk (MO), and the like may be used.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit. When the present invention is applied to the storage medium, that storage medium stores the program codes corresponding to the aforementioned flow charts.

As described above, according to the embodiment of the present invention, since a plurality of background images are generated in advance, a background image, which has the highest matching level with an input monitor image, is selected from the plurality of background images upon monitoring, and the differential process is then executed, a high-precision image processing method and apparatus, which can remove discrimination errors in the background portion, and can set an appropriate exposure value for an incoming object, and a storage medium, can be provided.

According to another embodiment, the offset value to be superposed on the background image is set by detecting a change in exposure, and determination errors in the background portion in the differential process can be reduced. Also, whether a change in background image takes place due to a change in illumination condition or an incoming object is identified, and an accurate background image can always be prepared. Hence, a high-precision detection process that can set an appropriate exposure value for an incoming object can be implemented.

Also, an image processing method and apparatus which can implement a high-efficiency monitoring system by encoding the detected object using the high-precision detection process result, and a storage medium can be provided.

To restate, according to the eighth to 12th embodiments, a clear image of an object to be monitored can be detected, determination errors on the background portion can be reduced, and an incoming object can be detected with high precision while effectively utilizing an automatic exposure function of image sensing means.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for making predetermined image sensing means sense a scene in a fixed image sensing direction, and extracting an object from an image obtained by the image sensing means, comprising:
  image input means for inputting frame images which are sensed by the image sensing means and are sequential in a time axis direction in turn;
  smoothing means for smoothing the input frame images;
  background image determination means for determining the smoothed frame image as a background image;
  differential image generation means for generating a differential image between a predetermined smoothed frame image and the background image; and
  object region extraction means for extracting an object region where a predetermined object is sensed, on the basis of the differential image,
  wherein said object region extraction means comprises:
    comparison means for comparing a pixel value of the differential image with a predetermined threshold value;
    extraction means for extracting, as the object region, a region in the predetermined frame image corresponding to a set object region, on the basis of the comparison result with the threshold value;
    contour region setting means for setting a contour region with a predetermined width, which includes boundary pixels with a background region within the set object region;
    edge extraction means for extracting an edge contained in the contour region in the predetermined frame image; and
    contour correction means for correcting a contour of the object region on the basis of a shape of the extracted edge.

2. An image processing apparatus for making predetermined image sensing means sense a scene in a fixed image sensing direction, and extracting an object from an image obtained by the image sensing means, comprising:
  image input means for inputting frame images which are sensed by the image sensing means and are sequential in a time axis direction in turn;
  smoothing means for smoothing the input frame images;
  background image determination means for determining the smoothed frame image as a background image;
  differential image generation means for generating a differential image between a predetermined smoothed frame image and the background image;
  object region extraction means for extracting an object region where a predetermined object is sensed, on the basis of the differential image;
  sub-sampling means for decimating the number of pixels of each smoothed frame image to a predetermined value; and
  enlargement means for enlarging an object region set in the frame image, the number of pixels of which has been decimated, to an original size.

3. The apparatus according to claim 2, wherein said background image determination means comprises sub-sampling means for decimating the number of pixels of each smoothed frame image to a predetermined value.

4. The apparatus according to claim 2, wherein said smoothing means comprises sub-sampling means for decimating the number of pixels of each frame image to a predetermined value.

5. An image processing apparatus for making predetermined image sensing means sense a scene in a fixed image sensing direction, and extracting an object from an image obtained by the image sensing means, comprising:
  image input means for inputting frame images which are sensed by the image sensing means and are sequential in a time axis direction in turn;
  smoothing means for smoothing the input frame images;
  background image determination means for determining the smoothed frame image as a background image;
  differential image generation means for generating a differential image between a predetermined smoothed frame image and the background image;
  object region extraction means for extracting an object region where a predetermined object is sensed, on the basis of the differential image;
  arithmetic encoding means for arithmetically encoding data of the extracted object region;
  padding processing means for executing a padding process of the extracted object region;
  texture encoding means for entropy-encoding data of the object region that has undergone the padding process;
  header input means for inputting predetermined header information; and
  shaping means for encoding data of the extracted object region by a predetermined encoding method using the arithmetically encoded data of the object region, the entropy-encoded data of the object region, and the header information.

6. An image processing method for making predetermined image sensing means sense a scene in a fixed image sensing direction, and extracting an object from an image obtained by the image sensing means, comprising:
  an image input step of inputting frame images which are sensed by the image sensing means and are sequential in a time axis direction in turn;
  a smoothing step of smoothing the input frame images;
  a background image determination step of determining the smoothed frame image as a background image;
  a differential image generation step of generating a differential image between a predetermined smoothed frame image and the background image; and
  an object region extraction step of extracting an object region where a predetermined object is sensed, on the basis of the differential image,
  wherein said object region extraction step comprises:
    a comparison step of comparing a pixel value of the differential image with a predetermined threshold value;
    an extraction step of extracting, as the object region, a region in the predetermined frame image corresponding to a set object region, on the basis of the comparison result with the threshold value;
    a contour region setting step of setting a contour region with a predetermined width, which includes boundary pixels with a background region within the set object region;
    an edge extraction step of extracting an edge contained in the contour region in the predetermined frame image; and
    a contour correction step of correcting a contour of the object region on the basis of a shape of the extracted edge.

7. An image processing method for making predetermined image sensing means sense a scene in a fixed image sensing direction, and extracting an object from an image obtained by the image sensing means, comprising:
  an image input step of inputting frame images which are sensed by the image sensing means and are sequential in a time axis direction in turn;

a smoothing step of smoothing the input frame images;

a background image determination step of determining the smoothed frame image as a background image;

a differential image generation step of generating a differential image between a predetermined smoothed frame image and the background image;

an object region extraction step of extracting an object region where a predetermined object is sensed, on the basis of the differential image;

a sub-sampling step of decimating the number of pixels of each smoothed frame image to a predetermined value; and an enlargement step of enlarging an object region set in the frame image, the number of pixels of which has been decimated, to an original size.

8. The method according to claim 7, wherein said background image determination step comprises the sub-sampling step of decimating the number of pixels of each smoothed frame image to a predetermined value.

9. The method according to claim 7, wherein said smoothing step comprises the sub-sampling step of decimating the number of pixels of each frame image to a predetermined value.

10. An image processing method for making predetermined image sensing means sense a scene in a fixed image sensing direction, and extracting an object from an image obtained by the image sensing means, comprising:

an image input step of inputting frame images which are sensed by the image sensing means and are sequential in a time axis direction in turn;

a smoothing step of smoothing the input frame images;

a background image determination step of determining the smoothed frame image as a background image;

a differential image generation step of generating a differential image between a predetermined smoothed frame image and the background image;

an object region extraction step of extracting an object region where a predetermined object is sensed, on the basis of the differential image;

an arithmetic encoding step of arithmetically encoding data of the extracted object region;

a padding processing step of executing a padding process of the extracted object region;

a texture encoding step of entropy-encoding data of the object region that has undergone the padding process;

a header input step of inputting predetermined header information; and shaping step of encoding data of the extracted object region by a predetermined encoding method using the arithmetically encoded data of the object region, the entropy-encoded data of the object region, and the header information.

11. A computer program stored on a computer-readable medium which, when executed, performs a method for controlling an image processing apparatus for making predetermined image sensing means sense a scene in a fixed image sensing direction, and extracting an object from an image obtained by the image sensing means, the program comprising:

program code of an image input step of inputting frame images which are sensed by the image sensing means and are sequential in a time axis direction in turn;

program code of a smoothing step of smoothing the input frame images;

program code of a background image determination step of determining the smoothed frame image as a background image;

program code of a differential image generation step of generating a differential image between a predetermined smoothed frame image and the background image; and program code of an object region extraction step of extracting an object region where a predetermined object is sensed, on the basis of the differential images, wherein the program code of the object region extraction step comprises:

program code of a comparison step of comparing a pixel value of the differential image with a predetermined threshold value;

program code of an extraction step of extracting, as the object region, a region in the predetermined frame image corresponding to a set object region, on the basis of the comparison result with the threshold value;

a contour region setting step of setting a contour region with a predetermined width, which includes boundary pixels with a background region within the set object region;

an edge extraction step of extracting an edge contained in the contour region in the predetermined frame image; and a contour correction step of correcting a contour of the object region on the basis of a shape of the extracted edge.

12. A recording medium for storing a computer program of claim 11.

13. An image processing method of extracting an object from image data sensed by image sensing means having an adjustment function of an image sensing parameter, comprising:

a storage step of storing, in storage means, background image data sensed by the image sensing means using a plurality of image sensing parameters;

a selection step of selecting one of the background image data stored in the storage means; and an extraction step of extracting an object other than a background in image data sensed by the image sensing means on the basis of the background image selected in said selection step.

14. The method according to claim 13, wherein said storage step includes the step of storing the image sensing parameters and background image data in correspondence with each other in the storage means.

15. The method according to claim 14, wherein said selection step includes the step of receiving parameter information associated with an image sensing parameter of the image sensing means, and selecting the background image data on the basis of the received parameter information.

16. The method according to claim 13, wherein the selection step includes the calculation step of calculating a matching level between the image data obtained by the image sensing means, and the plurality of background image data stored in the storage means, and includes the step of selecting background image data which has a maximum matching level calculated in said calculation step.

17. The method according to claim 16, wherein said calculation step includes the step of calculating differences for a plurality of local regions, which are set in advance in a field angle.

18. The method according to claim 13, wherein said extraction step includes the step of generating binary information used to identify for each pixel if a pixel of interest is a background pixel or a pixel of an object other than the background pixel.

19. The method according to claim 18, further comprising the encoding step of encoding information data of the object obtained in said extraction step.

20. The method according to claim 19, wherein said encoding step includes the step of encoding by MPEG-4.

21. The method according to claim 13, wherein the image sensing parameter is a parameter associated with focus control or a parameter associated with aperture control.

22. A computer program stored on a computer-readable medium which, when executed, performs an image process for extracting an object from image data sensed by image sensing means having an adjustment function of an image sensing parameter, the program comprising:
   program code of a storage step of storing, in storage means, background image data sensed by the image sensing means using a plurality of image sensing parameters;
   program code of a selection step of selecting one of the background image data stored in the storage means; and
   program code of an extraction step of extracting an object other than a background in image data sensed by the image sensing means on the basis of the background image selected in the selection step.

23. A computer readable storage medium storing a computer program of claim 22.

24. An image processing method of extracting an object from image data sensed by image sensing means having an adjustment function of an image sensing parameter, comprising:
   a storage step of storing, in storage means, background image data sensed by the image sensing means;
   a detection step of detecting a size of a difference between image data sensed by the image sensing means, and the background image data stored in the storage means;
   a correction step of correcting the background image data in accordance with the size of the difference detected in said detection step; and
   an extraction step of extracting an object other than a background in image data sensed by the image sensing means on the basis of the background image corrected in said correction step.

25. The method according to claim 24, wherein said storage step includes the step of storing background image data obtained by averaging a plurality of background image data sensed by the image sensing means.

26. The method according to claim 24, wherein said extraction step includes:
   the step of detecting a fluctuation width of each pixel with respect to a time axis from a plurality of background image data sensed by the image sensing means, and generating the fluctuation width as threshold value information, and
   the extraction step includes the step of extracting the object other than the background from the image data sensed by the image sensing means on the basis of the threshold value information and the corrected background image data.

27. The method according to claim 24, wherein said detection step includes the step of calculating differences for a plurality of predetermined local regions, which are set in advance in a field angle.

28. The method according to claim 24, wherein said extraction step includes the step of generating binary information used to identify for each pixel if a pixel of interest is a background pixel or a pixel of an object other than the background pixel.

29. The method according to claim 28, further comprising the encoding step of encoding information data of the object obtained in said extraction step.

30. The method according to claim 29, wherein said encoding step includes the step of encoding by MPEG-4.

31. The method according to claim 24, wherein the image sensing parameter is a parameter associated with focus control or a parameter associated with aperture control.

32. A computer program stored on a computer-readable medium which, when executed, performs an image process for extracting an object from image data sensed by image sensing means having an adjustment function of an image sensing parameter, the program comprising:
   program code of a storage step of storing, in storage means, background image data sensed by the image sensing means;
   program code of a detection step of detecting a size of a difference between image data sensed by the image sensing means, and the background image data stored in the storage means;
   program code of a correction step of correcting the background image data in accordance with the size of the difference detected in the detection step; and
   program code of an extraction step of extracting an object other than a background in image data sensed by the image sensing means on the basis of the background image corrected in the correction step.

33. A computer readable storage medium storing a computer program of claim 32.

34. A computer program stored on a computer-readable medium which, when executed, performs an image processing method for making predetermined image sensing means sense a scene in a fixed image sensing direction, and extracting an object from an image obtained by the image sensing means, the program comprising:
   program code of an image input step of inputting frame images which are sensed by the image sensing means and are sequential in a time axis direction in turn;
   program code of a smoothing step of smoothing the input frame images;
   program code of a background image determination step of determining the smoothed frame image as a background image;
   program code of a differential image generation step of generating a differential image between a predetermined smoothed frame image and the background image; and
   program code of an object region extraction step of extracting an object region where a predetermined object is sensed, on the basis of the differential image;
   program code of a sub-sampling step of decimating the number of pixels of each smoothed frame image to a predetermined value; and
   program code of an enlargement step of enlarging an object region set in the frame image, the number of pixels of which has been decimated, to an original size.

35. A computer program stored on a computer-readable medium which, when executed, performs an image processing method for making predetermined image sensing means sense a scene in a fixed image sensing direction, and extracting an object from an image obtained by the image sensing means, the program comprising:
   program code of an image input step of inputting frame images which are sensed by the image sensing means and are sequential in a time axis direction in turn;
   program code of a smoothing step of smoothing the input frame images;

program code of a background image determination step of determining the smoothed frame image as a background image;

program code of a differential image generation step of generating a differential image between a predetermined smoothed frame image and the background image;

program code of an object region extraction step of extracting an object region where a predetermined object is sensed, on the basis of the differential image, the arithmetic encoding step of arithmetically encoding data of the extracted object region;

program code of a padding processing step of executing a padding process of the extracted object region;

program code of a texture encoding step of entropy-encoding data of the object region that has undergone the padding process;

program code of a header input step of inputting predetermined header information; and program code of a shaping step of encoding data of the extracted object region by a predetermined encoding method using the arithmetically encoded data of the object region, the entropy-encoded data of the object region, and the header information.

36. A recording medium for storing a computer program of claim 34.

37. A recording medium for storing a computer program of claim 35.

* * * * *

UNITED STATES PATENT AND TRADEMARK OFFICE
CERTIFICATE OF CORRECTION

| | |
|---|---|
| PATENT NO. | : 7,162,101 B2 |
| APPLICATION NO. | : 10/293432 |
| DATED | : January 9, 2007 |
| INVENTOR(S) | : Osamu Itokawa et al. |

It is certified that error appears in the above-identified patent and that said Letters Patent is hereby corrected as shown below:

COLUMN 9

Line 37, "S53) The" should read --S53). The--.

COLUMN 10

Line 15, "S62) In" should read --S62). In--.

COLUMN 12

Line 64, "S205) As" should read --S205). As--.

COLUMN 16

Line 61, "MPEG-4mentioned" should read --MPEG-4 mentioned--.

COLUMN 19

Line 38, "Instep" should read --In step--.

COLUMN 29

Line 28, "maybe" should read --may be--.

COLUMN 30

Line 27, "held). input" should read --held). ¶ Input--.

UNITED STATES PATENT AND TRADEMARK OFFICE
CERTIFICATE OF CORRECTION

PATENT NO. : 7,162,101 B2
APPLICATION NO. : 10/293432
DATED : January 9, 2007
INVENTOR(S) : Osamu Itokawa et al.

It is certified that error appears in the above-identified patent and that said Letters Patent is hereby corrected as shown below:

<u>COLUMN 37</u>

Line 48, "shaping" should read --a shaping--.

Signed and Sealed this

Second Day of September, 2008

JON W. DUDAS
*Director of the United States Patent and Trademark Office*